United States Patent
Iseda et al.

(10) Patent No.: US 11,781,037 B2
(45) Date of Patent: Oct. 10, 2023

(54) HIGH-DURABILITY ANTIFOGGING COATING FILM AND COATING COMPOSITION

(71) Applicant: ASAHI KASEI KABUSHIKI KAISHA, Tokyo (JP)

(72) Inventors: Kazuya Iseda, Tokyo (JP); Kentaro Shiraishi, Tokyo (JP); Mifuyu Niwa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 686 days.

(21) Appl. No.: 16/971,842

(22) PCT Filed: Feb. 21, 2019

(86) PCT No.: PCT/JP2019/006639
§ 371 (c)(1),
(2) Date: Aug. 21, 2020

(87) PCT Pub. No.: WO2019/163918
PCT Pub. Date: Aug. 29, 2019

(65) Prior Publication Data
US 2021/0079256 A1 Mar. 18, 2021

(30) Foreign Application Priority Data

Feb. 23, 2018 (JP) .............................. 2018-031041
Sep. 6, 2018 (JP) .............................. 2018-167161
Dec. 27, 2018 (JP) .............................. 2018-243924

(51) Int. Cl.
 B32B 15/04 (2006.01)
 B32B 17/06 (2006.01)
 C09D 175/04 (2006.01)
 C09D 7/61 (2018.01)
 C09D 7/47 (2018.01)
 C03C 17/00 (2006.01)
 C03C 17/30 (2006.01)
 C09D 5/02 (2006.01)
 B32B 17/10 (2006.01)

(52) U.S. Cl.
 CPC ............ *C09D 175/04* (2013.01); *B32B 17/10* (2013.01); *C03C 17/009* (2013.01); *C03C 17/30* (2013.01); *C09D 5/024* (2013.01); *C09D 7/47* (2018.01); *C09D 7/61* (2018.01); *C03C 2217/75* (2013.01)

(58) Field of Classification Search
 CPC .................. C03C 2217/75; C03C 17/009
 USPC ........................................................ 428/432
 See application file for complete search history.

(56) References Cited

U.S. PATENT DOCUMENTS

| | | | | |
|---|---|---|---|---|
| 5,585,186 A * | 12/1996 | Scholz | .................. | C03C 17/009 428/452 |
| 11,041,076 B2 * | 6/2021 | Iseda | ......................... | C09D 5/16 |
| 2003/0203991 A1* | 10/2003 | Schottman | ............... | C09D 7/61 523/334 |
| 2006/0047064 A1* | 3/2006 | Murata | .............. | C08G 18/4018 524/589 |
| 2007/0077399 A1* | 4/2007 | Borowiec | .............. | C08J 7/0427 428/195.1 |
| 2007/0129478 A1* | 6/2007 | Nakamura | ............... | C09D 7/67 427/407.1 |
| 2007/0212571 A1* | 9/2007 | Inoguchi | ............... | C03C 17/009 516/111 |

(Continued)

FOREIGN PATENT DOCUMENTS

CN 104725640 A 6/2015
EP 3 263 614 A1 1/2018

(Continued)

OTHER PUBLICATIONS

Burunkaya et al., "Hydrophilic hybrid $SiO_2$:polyethylene glycol-3-isocyanato-propyltrietoxysilane nanocomposite films," Thin Solid Films (2012), vol. 522, pp. 238-246.
Extended European Search Report dated Oct. 14, 2021, in European Patent Application No. 19757270.4.
Jena et al., "Highly branched graphene siloxane polyurethane-urea (PU-urea) hybrid coatings," Progress in Organic Coatings (2017), vol. 111, pp. 343-353.
Lin, B. and Zhou, S., "Poly(ethylene glycol)-grafted silica nanoparticles for highly hydrophilic acrylic-based polyurethane coatings," Progress in Organic Coatings (2017), vol. 106, pp. 145-154.

(Continued)

Primary Examiner — Lauren R Colgan
(74) Attorney, Agent, or Firm — Birch, Stewart, Kolasch & Birch, LLP

(57) ABSTRACT

The problem addressed by the present invention is to provide an antifogging coating film having excellent antifogging property, antifogging persistence, persistence of appearance, and elution resistance. The coating film according to the present invention contains a metal oxide (A) and a hydrophilic compound (B); the height of the eluate by a coating film surface elution test is 1.0 μm or less; this test is carried out by placing 10 μL of deionized water on the coating film, allowing the film to stand for 24 hours in a 23° C., 50% RH environment, measuring the eluate height of 20 locations selected randomly within a 10 $cm^2$ range on the coating film surface, and determining the maximum height; and the water contact angle measured after subjecting the coating film to a moisture resistance test by exposure for 24 hours in an 85° C., 85% RH environment followed by standing for one hour in a 23° C., 50% RH environment, is less than 40°. Preferably, the elution level per coating film unit volume by a coating film total elution test is 40 $mg/cm^3$ or less, and this test is carried out by immersing the coating film in 23° C. deionized water for 24 hours, then measuring the weight of the coating film eluate recovered from the deionized water.

29 Claims, No Drawings

(56) References Cited

U.S. PATENT DOCUMENTS

| | | | |
|---|---|---|---|
| 2008/0090019 A1 | 4/2008 | Sepeur et al. | |
| 2008/0160289 A1* | 7/2008 | Lin | C09C 1/3081 |
| | | | 428/327 |
| 2012/0285528 A1* | 11/2012 | Takanohashi | C08G 77/20 |
| | | | 977/773 |
| 2014/0335360 A1* | 11/2014 | Jing | G02B 27/0006 |
| | | | 428/423.1 |
| 2016/0130463 A1* | 5/2016 | Sugihara | C09D 7/45 |
| | | | 428/335 |
| 2018/0065147 A1 | 3/2018 | Iseda et al. | |
| 2019/0055410 A1* | 2/2019 | Iseda | C09D 1/00 |
| 2019/0100674 A1 | 4/2019 | Hama et al. | |

FOREIGN PATENT DOCUMENTS

| | | |
|---|---|---|
| JP | 55-99987 A | 7/1980 |
| JP | 2003-55611 A | 2/2003 |
| JP | 2011-63746 A | 3/2011 |
| JP | 4812902 B1 | 11/2011 |
| JP | 2014-148042 A | 8/2014 |
| WO | WO 2010/104146 A1 | 9/2010 |
| WO | WO 2012/161330 A1 | 11/2012 |
| WO | WO 2013/089927 A1 | 6/2013 |
| WO | WO 2015/008672 A1 | 1/2015 |
| WO | WO 2016/208735 A1 | 12/2016 |
| WO | WO 2017/159564 A1 | 9/2017 |
| WO | WO 2018/092543 A1 | 5/2018 |

OTHER PUBLICATIONS

Toselli et al., "Sol-gel derived hybrid coatings for the improvement of scratch resistance of polyethylene," J. Sol-Gel Sci. Technol. (2007), vol. 43, pp. 73-83.

International Search Report, issued in PCT/JP2019/006639, PCT/ISA/210, dated May 14, 2019.

Written Opinion of the International Searching Authority, issued in PCT/JP2019/006639, PCT/ISA/237, dated May 14, 2019.

International Preliminary Report on Patentability and English translation of the Written Opinion of the International Searching Authority, dated Aug. 27, 2020, for International Application No. PCT/JP2019/006639.

Submission of Publications (third party observations) filed May 27, 2021, in Japanese Patent Application No. 2020-501048.

European Office Action for European Application No. 19 757 270.4, dated Oct. 27, 2021.

* cited by examiner

HIGH-DURABILITY ANTIFOGGING COATING FILM AND COATING COMPOSITION

TECHNICAL FIELD

The present invention relates to an antifogging coating film and a coating composition. The present invention particularly relates to a coating composition for forming an antifogging coating film having excellent antifogging properties, antifogging persistence, persistence of appearance, elution resistance, and an effect of suppressing water droplet marks, and such an antifogging coating film.

BACKGROUND ART

Resin formed articles are widely used as substitutes for glass plates in terms of weight reduction or formability. As the purpose of use, resin formed articles are used in a wide range of fields such as automotive parts, home electric appliance parts, housing, containers, films, and sheets. In particular, transparent plastics are used for, for example, various windows, optical lenses, mirrors, spectacles, goggles, sound insulation walls, lenses for traffic lamps, lenses for head lamps, curve mirrors, windshields and face plates. However, in resin substrates such as plastics, in a case where the temperature of one surface of the substrate is equal to or lower than the dew point due to difference in temperature and humidity with the outside air, or in a case where a sudden temperature and humidity change occurs, dew condenses on the substrate surface, and fine water droplets adhere to the surface, so that transmitted light may be scattered. In such a case, the transparency of the resin formed article is lost, and so-called fogging occurs.

As a method for preventing this fogging, the following methods have been proposed.

(1) A method of preparing a coating film of a water-absorbing compound on the surface of a substrate.

(2) A method of preparing a coating film of a hydrophilic compound such as a surfactant on the surface of the substrate to impart hydrophilicity to the surface of the substrate.

Specifically, as the method (1), Patent literature 1 proposes, for example, an antifogging article which has a water-absorptive crosslinked resin layer formed of a cured epoxide resin or a urethane resin and in which the water-absorbing layer contains metal oxide fine particles. Patent Literature 2 proposes an antifogging article including a water-absorbing layer containing a cured epoxy resin and a polyoxyethylene alkyl ether surfactant.

However, in these methods, although antifogging properties can be maintained to a certain level, when moisture more than the water-absorbing capacity aggregates and adheres to the article, fogging occurs. Thus, there is a disadvantage that it is necessary to increase the film thickness in order to develop high antifogging persistence.

As the method (2), Patent Literatures 3 and 4 disclose a hydrophilic and antifouling coating film characterized in that the surface of a coating film is colloidal silica. Specifically, Patent Literature 3 discloses an antifouling coating film containing colloidal silica and a nonionic surfactant, and Patent Literature 4 discloses an antifouling coating film containing polymer particles and colloidal silica. However, the coating films of these literatures are characterized in that colloidal silica is unevenly distributed on the outermost surface of the coating film. Thus, although the initial hydrophilicity and the antifogging properties are excellent, under harsh environments such as high temperature and high humidity environment, the antifogging properties may deteriorate due to, for example, adsorption of foreign substances to the coating film surface.

Further, Patent Literature 5 discloses an antifogging coating film which includes a metal oxide and a hydrophilic compound, and in which the surface of the metal oxide is coated with the hydrophilic compound. This Patent Literature discloses an antifogging coating film in which antifogging properties and antifogging persistence are improved by coating the surface of the metal oxide with the hydrophilic compound. According to the antifogging coating film of the Patent Literature, it is necessary to sufficiently increase the amount of the hydrophilic compound with respect to the amount of the metal oxide in order to obtain high antifogging properties. On the other hand, there is a dilemma that, in a case where such an antifogging coating film is exposed to a harsh environment such as high temperature and high humidity environment, presence of excessive hydrophilic compound that have not been covered to the metal oxide, may cause poor appearance such as whitening (generation of water droplet marks) due to elution of the hydrophilic compound on the coating film surface and further, elution from the entire coating film.

CITATION LIST

Patent Literature

PATENT LITERATURE 1: WO 2012/161330
PATENT LITERATURE 2: WO 2015/008672
PATENT LITERATURE 3: JP-B-4812902
PATENT LITERATURE 4: WO 2010/104146
PATENT LITERATURE 5: WO 2017/159564

SUMMARY OF INVENTION

Technical Problem

An object of the present invention is to provide a novel coating film not existing in the conventional art. In view of the above-described problems of the prior art, an object of the present invention is to provide an antifogging coating film which preferably has excellent antifogging properties, retains favorable antifogging properties, appearance and adhesion, and has excellent elution resistance (generation of water droplet marks is suppressed) even when exposed to a harsh environment such as high temperature and high humidity environment.

Solution to Problem

As a result of intensive studies to solve the above problems, the present inventors have completed the present invention.

That is, aspects of the present invention are as follows.

[1].

A coating film including a metal oxide (A), and a hydrophilic compound (B), in which a height of an eluate in a coating film surface elution test is 1.0 µm or less, the coating film surface elution test is carried out by placing 10 µL of deionized water on the coating film, allowing the coating film to stand in a 23° C., 50% RH environment for 24 hours, measuring heights of the eluate at 20 locations selected randomly within a 10 cm² range on a surface of the coating film, and determining a maximum height, and a water contact angle measured after subjecting the coating film to a moisture resistance test, in which the coating film is exposed to an 85° C., 85% RH environment for 24 hours and then allowed to stand in a 23° C., 50% RH environment for 1 hour, is less than 40°.

[2].

The coating film according to [1], in which an elution level per coating film unit volume in a coating film total elution test is 40 mg/cm$^3$ or less, and the coating film total elution test is carried out by immersing the coating film in deionized water at 23° C. for 24 hours and measuring a weight of an eluate of the coating film recovered from the deionized water.

[3].

The coating film according to [1], in which an elution level per coating film unit volume in a coating film total elution test is 40 mg/cm$^3$ or less, and the coating film total elution test is carried out by immersing the coating film in deionized water at 80° C. for 24 hours and measuring a weight of an eluate of the coating film recovered from the deionized water.

[4].

The coating film according to any one of [1] to [3], in which a value of a water contact angle is less than 40°.

[5].

The coating film according to any one of [1] to [4], in which the metal oxide (A) has a hydroxy group.

[6].

The coating film according to any one of [1] to [5], in which the metal oxide (A) is silica.

[7].

The coating film according to any one of [1] to [6], in which the hydrophilic compound (B) is bonded to a surface of the metal oxide via a non-covalent bond and/or a covalent bond.

[8].

The coating film according to any one of [1] to [7], further including an isocyanate compound (C).

[9].

The coating film according to any one of [1] to [8], in which the hydrophilic compound (B) is at least one selected from the group consisting of a nonionic compound, an anionic compound, and a zwitterionic compound.

[10].

The coating film according to any one of [1] to [9], in which the hydrophilic compound (B) has a carbon-oxygen bond in the molecule.

[11].

The coating film according to any one of [1] to [10], in which the hydrophilic compound (B) has an alkylene glycol moiety in the molecule.

[12].

The coating film according to any one of [1] to [10], in which the hydrophilic compound (B) is bonded to each other via a urethane bond and/or a siloxane bond.

[13].

The coating film according to any one of [1] to [12], in which the isocyanate compound (C) is a water-dispersible isocyanate compound.

[14].

The coating film according to any one of [1] to [13], in which the isocyanate compound (C) has an alkoxysilane moiety and/or a siloxane moiety in the molecule.

[15].

The coating film according to any one of [1] to [14], in which the isocyanate compound (C) is a blocked isocyanate.

[16].

The coating film according to any one of [1] to [15], further including polymer particles (D).

[17].

The coating film according to any one of [1] to [16], in which ΔHAZE is less than 1.0, the ΔHAZE being a difference between a HAZE of the coating film after being subjected to a moisture resistance test in which the coating film is exposed to an environment of 85° C., 85% RH for 24 hours and then allowed to stand in an environment of 23° C., 50% RH for 1 hour, and a HAZE of the coating film before the moisture resistance test.

[18].

A coating composition for producing the coating film according to any one of [1] to [17], in which the metal oxide (A) is constituted by an alkoxysilane and/or a hydrolysate or a condensate of alkoxysilane.

[19].

A coating composition for producing the coating film according to any one of [1] to [17], in which the metal oxide (A) is silicone particles and/or acrylic silicone particles.

[20].

A coating composition for producing the coating film according to any one of [1] to [17], in which the hydrophilic compound (B) contains an alkoxysilane and/or a silanol group in the molecule.

[21].

A coating composition for producing the coating film according to any one of [1] to [17], in which the hydrophilic compound (B) has a polyalkylene oxide chain in the molecule and contains a primary aliphatic hydroxy group at one end of the polyalkylene oxide chain and an alkoxysilane and/or a silanol group at the other end.

[22].

A coating composition for producing the coating film according to any one of [1] to [17], the coating composition containing a metal oxide (A), a hydrophilic compound (B), and optionally an isocyanate compound (C) and/or polymer particles (D) and/or water.

[23].

The coating composition according to [18] to [22], in which the hydrophilic compound (B) has three or more functional groups capable of reacting with an isocyanate group in the molecule.

[24].

The coating composition according to [18] to [22], in which an HLB value of the hydrophilic compound (B) determined by a Griffin method is 10 or more.

[25].

A laminate including a resin substrate and/or a glass substrate, and the coating film according to any one of [1] to [17].

[26].

Use of the coating film according to any one of [1] to [17] for imparting antifogging properties to a resin substrate and/or a glass substrate.

[27].

The coating film according to any one of [1] to [17], in which the coating film is used as an antifogging coating film.

[28].

The coating film according to any one of [1] to [17], in which the coating film is used as a coating film for an automotive exterior part.

[29].

The coating film according to any one of [1] to [17], in which the coating film is used as a coating film for a lamp cover.

Advantageous Effects of Invention

According to the present invention, a novel coating film not existing in the prior art is provided. Further, according to the present invention, it is possible to provide a coating film that preferably has excellent antifogging properties, retains favorable antifogging properties, appearance, and adhesion, and has excellent elution resistance (generation of water droplet marks is suppressed) even when exposed to a harsh environment such as high temperature and high humidity environment.

DESCRIPTION OF EMBODIMENTS

Hereinafter, a mode for carrying out the present invention (hereinafter abbreviated as "embodiment") will be described in detail. The present invention is not limited to the following embodiments, and various modifications may be made within the gist of the present invention.

Each of components for the present invention will be described below.

The coating film according to an embodiment is formed by, for example, applying a coating composition (may be abbreviated as "aqueous dispersion"), dispersed in a solvent such as water, onto a substrate and drying the coating composition. Accordingly, the coating film and the coating composition basically have the same components and the same proportions thereof except for the solvent. That is, the coating film according to the present invention has the properties and the amount ratio possessed by components of the coating composition described below, unless otherwise noted. Accordingly, the features of the coating composition will be mainly described below.

The coating composition according to an embodiment contains a component (A): a metal oxide, and a component (B): a hydrophilic compound.

These components will be described in detail.

Component (A): Metal Oxide

From the viewpoint of interaction with the component (B), examples of the metal oxide used for the component (A) include silicon dioxide, aluminum oxide, antimony oxide, titanium oxide, indium oxide, tin oxide, zirconium oxide, lead oxide, iron oxide, calcium silicate, magnesium oxide, niobium oxide, and cerium oxide. Among them, silicon dioxide (silica) having many surface hydroxy groups, aluminum oxide (alumina), antimony oxide, and complex oxides thereof are preferred from the viewpoint of the strength of the interaction. Note that, as the component (A), two or more of the above-descried metal oxides may be used in combination.

Further, as the metal oxide used for the component (A), a compound (hereinafter, may be simply referred to as "photocatalyst") exhibiting photocatalytic activity and/or hydrophilicity by light irradiation may be used from the viewpoint of imparting antifouling properties. By using the compound exhibiting photocatalytic activity by light irradiation as the component (A), the surface of a coating film formed from the coating composition can exhibit excellent activity of decomposing contaminant organic substances and contamination resistance. Herein, the "hydrophilicity" of a coating film means that the contact angle (water contact angle) of water (23° C.) with respect to the surface of an object to be measured is preferably 60° or lower, more preferably 30° or lower, and further preferably 20° or lower. A method of measuring the water contact angle will be described later in Examples. The "compound exhibiting hydrophilicity by light irradiation" as used herein is distinguished from the hydrophilic compound of the component (B) which originally has hydrophilicity.

More specifically, $TiO_2$, $ZnO$, $SrTiO_3$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $RuO_2$, $CeO_2$, or the like can be used as the photocatalyst. Further, layered oxides having at least one element selected from Ti, Nb, Ta, and V can be used as the photocatalyst (see, for example, JP-A-62-74452, JP-A-02-172535, JP-A-07-24329, JP-A-08-89799, JP-A-08-89800, JP-A-08-89804, JP-A-08-198061, JP-A-09-248465, JP-A-10-99694, and JP-A-10-244165). Among these photocatalysts, $TiO_2$ (titanium oxide) is preferable because it is nontoxic and excellent in chemical stability. As the titanium oxide, any of an anatase type titanium oxide, a rutile type titanium oxide, and a brookite type titanium oxide can be used.

As the metal oxide used for the component (A), a conductive metal oxide can be used from the viewpoint of exhibiting antistatic properties or the like of the coating film formed from the coating composition. As the conductive metal oxide, indium oxide doped with tin (ITO), tin oxide doped with antimony (ATO), tin oxide, zinc oxide, or the like can be used, for example.

The component (A) is used as a raw material of the coating composition in the form of, for example, powder, a dispersion, or a sol. Here, the dispersion or the sol means a state where the component (A) is dispersed in water and/or a hydrophilic organic solvent in the form of primary particles and/or secondary particles at a concentration of 0.01 to 80 mass %, and preferably 0.1 to 50 mass %. Examples of the hydrophilic organic solvent that can be used include alcohols such as ethylene glycol, butyl cellosolve, n-propanol, isopropanol, n-butanol, ethanol, and methanol; ketones such as acetone, methyl ethyl ketone, and methyl isobutyl ketone; ethers such as tetrahydrofuran, and dioxane; amides such as dimethylacetamide, and dimethylformamide; dimethylsulfoxide; nitrobenzene; N-methylpyrrolidone; and a mixture of two or more thereof.

The metal oxide used for the component (A) may also be silicone particles and/or acrylic silicone particles.

As an example, silicone particles may also be formed from a later-described component (d1) of the polymer particles (D), and acrylic silicone particles may also be formed from components (d1) and (d2). Further, silicone particles may also contain polyalkylene glycol containing an alkoxysilane and/or a silanol group in the molecule described later. At that time, the moiety of alkoxysilane and/or silanol may be the metal oxide (A), and the moiety of polyalkylene glycol may be the hydrophilic compound (B). Alternatively, the metal oxide (A) and/or the hydrophilic compound (B) may be separately added.

The number average particle size of the component (A) observed in the powder, the dispersion, or the sol (may be a mixture of primary particles and secondary particles or either one of the primary particles and secondary particles) is preferably 1 nm to 400 nm, more preferably 1 nm to 100 nm, even more preferably 3 nm to 80 nm, and particularly preferably 4 nm to 50 nm. The number average particle size in a specific range herein is usually maintained even in a formed coating film. The number average particle size of the component (A) can contribute to, for example, the optical properties of a coating film formed using the resulting coating composition. In particular, by controlling the number average particle size to 100 nm or less, the transparency of the resulting coating film can be greatly improved. Note that the number average particle size herein of the component (A) (hereinafter, may be simply abbreviated as "particle size") is a value measured in accordance with the method described in Examples described later.

In an embodiment, the metal oxide (A) is preferably silica from the viewpoint of handling. Silica contains silicon dioxide as a fundamental unit and may be prepared by a sol-gel method, or a commercially available product may be used. In a case where silica is prepared by a sol-gel method, Werner Stober et al; J. Colloid and Interface Sci., 26, 62 to 69 (1968), Rickey D. Badley et al; Lang muir 6, 792 to 801 (1990); Journal of the Japan Society of Colour Material, 61[9] 488 to 493 (1988) and the like can be used as a reference. Among them, colloidal silica is a dispersion of silica in water or a water-soluble solvent, and is preferable from the viewpoint of handling. The number average particle size of silica is 1 to 400 nm, preferably 1 to 100 nm, and more preferably 1 to 50 nm. When the number average particle size is 1 nm or more, the storage stability of the coating composition tends to be favorable. Meanwhile, when the number average particle size is 400 nm or less, the transparency tends to be favorable.

Silica having a number average particle size within the above-described range can be used in the state of an aqueous dispersion in any case where it is an acidic, basic, or cationic silica. The liquid property can be appropriately selected according to the stable region of the hydrophilic compound (B) to be mixed. The shape of silica may be either spherical or moniliform. In a case where silica and a hydrophilic compound are bonded via a non-covalent bond, the pH is preferably 10 or less because the non-covalent bond becomes strong. Examples of the acidic silica using water as a dispersion medium include commercially available products such as SNOWTEX (registered trademark)-OXS, SNOWTEX-OS, SNOWTEX-O, SNOWTEX-OL, SNOWTEX-OYL, SNOWTEX-OUP, SNOWTEX-PS-SO, and SNOWTEX-PS-MO available from Nissan Chemical Industries, Ltd.; Adelite (registered trademark) AT-20Q available from Adeka Corporation; and Crebosol (registered trademark) 20H12, and Crebosol 30CAL25 available from Clariant Japan K.K.

Examples of the basic silica include silica stabilized with the addition of an alkaline metal ion, an ammonium ion, or an amine. For example, it is possible to use SNOWTEX-20, SNOWTEX-30, SNOWTEX-C, SNOWTEX-C30, SNOWTEX-CM40, SNOWTEX-N, SNOWTEX-N30, SNOWTEX-K, SNOWTEX-XL, SNOWTEX-YL, SNOWTEX-ZL, SNOWTEX PS-M, and SNOWTEX PS-L available from Nissan Chemical Industries, Ltd. Alternatively, Adelite AT-20, Adelite AT-30, Adelite AT-20N, Adelite AT-30N, Adelite AT-20A, Adelite AT-30A, Adelite AT-40, and Adelite AT-50 available from Adeka Corporation can also be used. Further, Crebosol 30R9, Crebosol 30R50, Crebosol 50R50, and the like available from Clariant Japan K.K.; and Ledoux (registered trademark) HS-40, Ledoux HS-30, Ledoux LS, Ledoux SM-30, and the like available from W.R. Grace & Co. can also be used.

As the cationic silica, for example, SNOWTEX-AK, SNOWTEX-AK-L, and SNOWTEX-AK-YL available from Nissan Chemical Industries, Ltd. can be used.

Examples of the colloidal silica using a water-soluble solvent as a dispersion medium include MA-ST-M (number average particle size: 20 nm to 25 nm, dispersed in methanol), IPA-ST (number average particle size: 10 nm to 15 nm, dispersed in isopropyl alcohol), EG-ST (number average particle size: 10 nm to 15 nm, dispersed in ethylene glycol), EG-ST-ZL (number average particle size: 70 nm to 100 nm, dispersed in ethylene glycol), and NPC-ST (number average particle size: 10 nm to 15 nm, dispersed in ethylene glycol monopropyl ether) available from Nissan Chemical Industries, Ltd.

Note that the silica may be used singly or in combinations of two or more. The silica may also contain, as a component to be used in a small amount, alumina, sodium aluminate, and the like. Furthermore, silica may contain, as a stabilizer, an inorganic base (for example, sodium hydroxide, potassium hydroxide, lithium hydroxide, and ammonia), an organic base (for example, tetramethylammonium), and the like.

Component (B): Hydrophilic Compound

The coating composition contains hydrophilic compound(s) used for a component (B) in order to, for example, improve the dispersibility of the component (A), improve the antifogging persistence, moisture resistance, persistence of appearance, elution resistance (suppression of elution on the coating film surface and further, elution from the entire coating film), and an effect of suppressing water droplet marks of the coating film due to immobilization on the surface of component (A) via a non-covalent bond and/or a covalent bond, and improve the film-forming property of the coating film.

To improve the coating film performance, the component (B) needs to be immobilized to the component (A) via either a non-covalent bond or a covalent bond. However, they are preferably immobilized via two types of bonds from the viewpoint of elution resistance and moisture resistance.

As the hydrophilic compound used for the component (B), a compound soluble and/or dispersible in water can be used from the viewpoint of the dispersion stability of the coating composition. The compound may have a hydrophobic group in addition to a hydrophilic group as long as it is soluble and/or dispersible in water. Also, in a case where the component (B) is immobilized to the component (A) via a non-covalent bond, it is preferable that the component (B) contains a site of interaction with the metal oxide (A) from the viewpoint of the durability of the coating film. Examples of such an interaction site include a hydroxy group, an amino group, an amide group, a carboxyl group, a silanol group, a sulfo group, a polyoxyalkylene moiety, an ammonium salt moiety, a pyridinium salt moiety, an imidazolium salt moiety, and an alkoxysilane moiety.

As an embodiment, the hydrophilic compound (B) may be at least one selected from the group consisting of a nonionic compound, an anionic compound, and a zwitterionic compound. As the nonionic compound, the anionic compound and the zwitterionic compound, any of publicly known compounds having these ionic properties can be used.

Examples of the nonionic compound include a compound having, as a hydrophilic moiety, a hydroxy group, a carboxyl group, an amide group, an amino group, or an alkylene oxide moiety.

Examples of the anionic compound include a compound having a carboxylic acid moiety, a sulfonic acid moiety, a phosphoric acid moiety, or a boronic acid moiety.

Examples of the zwitterionic compound include a compound having, in the same molecule, anionic sites such as a carboxylic acid moiety, a sulfonic acid moiety, a phosphoric acid moiety, or boronic acid, and cationic sites such as a quaternary ammonium moiety, an imidazolium moiety, a pyridinium moiety, a sulfonium moiety, or a phosphonium moiety.

As an embodiment, the hydrophilic compound (B) may have one or two or more functional groups capable of reacting with an isocyanate group (a group possessed by the isocyanate compound (C)) in the molecule. Examples of the functional group capable of reacting with an isocyanate group include a hydroxy group, an amino group, an amide group, a carboxyl group, a silanol group, and a sulfo group.

Among them, the hydrophilic compound (B) is preferably a hydrophilic compound having at least one hydroxy group in the molecule. A hydrophilic compound having two or more hydroxy groups in the molecule is more preferable. In a case where the hydrophilic compound (B) has two or more hydroxy groups in the molecule, a two-dimensional and/or three-dimensional crosslinked body is formed by reaction with the isocyanate compound (C). Thus, this is more preferable from the viewpoint of the durability of the resulting coating film (for example, the antifogging persistence, persistence of appearance, elution resistance, and effect of suppressing water droplet marks of the coating film in the case of exposure to a high temperature and high humidity environment).

By using a hydrophilic compound having a site of interaction with the metal oxide (A), the hydrophilic compound is immobilized on the surface of the metal oxide (A) (for example, silica) via a non-covalent bond and/or a covalent bond. Thus, the antifogging persistence, persistence of appearance, elution resistance, and effect of suppressing water droplet marks of the coating film in the case of exposure to a high temperature and high humidity environment is improved.

Further, by using a hydrophilic compound having one or two or more functional groups capable of reacting with an isocyanate group in the molecule, the hydrophilic compound is immobilized in a coating film, and whereby elution due to contact with water can be prevented.

Specifically, examples of the hydrophilic compound (B) having, in the molecule, two or more functional groups which are the interaction sites and are capable of reacting with an isocyanate group are not particularly limited, and examples thereof include alkylene glycol moiety-containing polymers such as polyoxyalkylene glycol, polyoxyalkylene phenyl ether, polyoxyalkylene alkyl aryl ether, polyoxyalkylene sorbitan fatty acid ester, polyoxyethylene oxypropylene block copolymer, polyoxyethylene oxypropylene oxyethylene triblock copolymer, polyoxypropylene oxyethylene oxypropylene triblock copolymer, and fatty acid polyoxyalkylene sorbitan; polyvinyl alcohol; polyhydroxyalkyl (meth)acrylate; and copolymers of hydroxyalkyl (meth)acrylate with alkyl (meth)acrylate. These may be used singly or in combination of two or more. The number of carbon atoms of "alkylene" and "alkyl" is not particularly limited, but for example, 1 to 10, more preferably 2 to 6, and most preferably 2 or 3.

These hydrophilic compound (B) are suitably used in a coating composition containing the isocyanate compound (C) (and a coating film formed from the coating composition), but may also be used in a coating composition not containing the isocyanate compound (C) (and a coating film formed from the coating composition).

Among these hydrophilic compounds (B), a hydrophilic compound (B) containing a polyalkylene oxide having three or more functional groups capable of reacting with the isocyanate compound (C) is preferred from the viewpoints of immobilization of a coating film on the silica surface, initial antifogging properties, improvement of antifogging persistence, persistence of appearance, elution resistance, and an effect of suppressing water droplet marks. Examples of the polyalkylene oxide having three or more functional groups capable of reacting with the isocyanate compound (C) include glycerol ethoxylate, trimethylolpropane ethoxylate, and fatty acid polyoxyalkylene sorbitans. Examples of the fatty acid polyoxyalkylene sorbitan include mono fatty acid polyoxyalkylene sorbitans. Specific examples of the mono fatty acid polyoxyalkylene sorbitan include polyoxyethylene sorbitan monolaurate. Examples of the fatty acid herein include lauric acid, stearic acid, and oleic acid, but are not particularly limited thereto.

When the coating composition has three or more functional groups capable of reacting with the isocyanate compound (C), it is more preferred from the viewpoint of the durability of the coating film. When the coating composition contains a hydrophilic compound (B) having four or more functional groups capable of reacting with the isocyanate compound (C), a three-dimensional crosslinked structure can be formed even when the reaction ratio with the isocyanate compound (C) is less than 100%, and it is therefore more preferred from the viewpoint of the durability of the coating film. Examples of such a compound include 4-branched polyalkylene glycols, 8-branched polyalkylene glycols, and hyperbranched polymers.

The hydrophilic compound (B) having four or more functional groups capable of reacting with the isocyanate compound (C), such as mono fatty acid polyoxyalkylene sorbitans, or 4-branched polyalkylene glycols, 8-branched polyalkylene glycols, and hyperbranched polymers can also be used for not only a coating composition containing the isocyanate compound (C) (and a coating film formed from the coating composition), but also a coating composition not containing the isocyanate compound (C) (and a coating film formed from the coating composition).

As an embodiment, the hydrophilic compound (B) may have one or two or more functional groups capable of forming a covalent bond with the metal oxide (A) in the molecule. Examples of the functional group capable of forming a covalent bond with the metal oxide (A) include a hydroxy group, a silanol group, an alkoxysilane group, and an isocyanate group. By using a hydrophilic compound having one or two or more functional groups capable of forming a covalent bond with the metal oxide (A), the hydrophilic compound is immobilized in a coating film via a covalent bond and can remain in the coating film without being released from the coating film even in the case of being contact with water or being exposed to a harsh environment such as high temperature and high humidity.

Examples of the hydrophilic compound (B) include polyalkylene oxides containing an alkoxysilane and/or a silanol group in the molecule.

Examples of the polyalkylene oxide containing an alkoxysilane and/or a silanol group in the molecule include polyoxyalkylene alkyl ether, polyoxyalkylene phenyl ether, and polyoxyalkylene alkylaryl ether, having one hydroxy group in the molecule; polyoxyalkylene glycol having two hydroxy groups in the molecule; fatty acid polyoxyalkylene sorbitans having three hydroxy groups in the molecule; glycerol ethoxylate; trimethylolpropane ethoxylate; 4-branched polyalkylene glycols having four hydroxy groups in the molecule; 8-branched polyalkylene glycols having eight hydroxy groups in the molecule and the like; and reacted products with a silane coupling agent having a functional group capable of reacting with a hydroxy group.

Examples of the silane coupling agent having a functional group capable of reacting with a hydroxy group include 3-isocyanatepropyltriethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, and 3-trimethoxysilylpropyl succinic anhydride. Among them, an isocyanate silane coupling agent such as 3-isocyanatepropyltriethoxysilane is preferable in terms of reactivity.

In the reaction of a polyoxyalkylene alkyl ether having one hydroxy group in the molecule or the like with an isocyanate silane coupling agent, a catalyst may be optionally added. Examples of the catalyst include, but are not particularly limited to, tin compounds such as dibutyltin dilaurate, dibutyltin diacetate, dioctyltin dilaurate, dimethyltindineodecanoate, and tin bis(2-ethylhexanoate); zinc compounds such as zinc 2-ethyl hexanoate, and zinc naphthenate; titanium compounds such as titanium 2-ethyl hexanoate, and titanium diisopropoxy bis(ethylacetonato); cobalt compounds such as cobalt 2-ethyl hexanoate, and cobalt naphthenate; bismuth compounds such as bismuth 2-ethyl hexanoate, and bismuth naphthenate; zirconium compounds such as zirconium tetraacetylacetonate, zirconyl 2-ethyl hexanoate, and zirconyl naphthenate; and amine compounds.

Among these hydrophilic compounds (B), a polyalkylene oxide having a branched polyalkylene oxide chain in the molecule and containing a primary aliphatic hydroxy group and an alkoxysilane and/or a silanol group at an end of the polyalkylene oxide chain is preferred from the viewpoints of initial antifogging properties, adhesion, durability, elution resistance, and an effect of suppressing water droplet marks. Such a hydrophilic compound (B) can be synthesized by, for example, reaction of a polyalkylene oxide having two or more, more preferably three or more hydroxy groups in the molecule with a silane coupling agent having a functional group capable of reacting with a hydroxy group. The introduction ratio of the silane coupling agent to the hydroxy groups of the hydrophilic compound (B) can be measured by NMR or the like. The introduction ratio is preferably 10% or more, more preferably 20% or more, and even more preferably 30% or more from the viewpoint of an effect of suppressing water droplet marks. Further, the upper limit of the introduction ratio is preferably 100% or less, more preferably 95% or less, and even more preferably 90% or less from the viewpoint of adhesion.

The molecular weight of the hydrophilic compound (B) is preferably 400 or more, more preferably 1,000 or more, and even more preferably 2,000 or more from the viewpoint of moisture resistance.

The mass ratio ((mass of B)/(mass of A)) of the hydrophilic compound (B) to the metal oxide (A) is preferably 0.005 or more, more preferably 0.01 or more, and even more preferably 0.03 or more from the viewpoint of moisture resistance. Also, the mass ratio is preferably 1 or less, more preferably 0.7 or less, and even more preferably 0.5 or less from the viewpoints of elution resistance, and suppression of generation of water droplet marks.

As an embodiment, in a case where particles are used as the metal oxide (A), the ratio of number of molecules of the hydrophilic compound (B) to the surface area of the metal oxide (A) ((number of molecules of B)/(surface area ($nm^2$) of A)) is $0.01/nm^2$ or more, more preferably $0.05/nm^2$ or more, and even more preferably $0.1/nm^2$ or more from the viewpoint of moisture resistance. Also, the ratio is preferably $4.0/nm^2$ or less, more preferably $3.0/nm^2$ or less, and even more preferably $2.0/nm^2$ or less from the viewpoints of elution resistance, and suppression of generation of water droplet marks.

In general, in a coating film obtained by coating a coating composition containing a metal oxide and water, the metal oxide component is present on the outermost surface of the coating film. Accordingly, for example, in the case of using the above-described coating composition containing silica, the silica component is present on the outermost surface of the coating film. When such a coating film is exposed to a high temperature and high humidity environment, contamination due to adsorption of foreign substances or the like occurs, and thus antifogging properties are deteriorated.

On the other hand, in the case of a coating film containing many hydrophilic compounds, in a high temperature and high humidity environment, uneven distribution of excessive hydrophilic compounds that are not immobilized to the metal oxide (A) may occur in the coating film. Such uneven distribution causes poor appearance such as whitening of the coating film (elution on the coating film surface and further, elution from the entire coating film, and generation of water droplet marks due to elution).

To suppress elution (generation of water droplet marks due to elution) on the coating film surface in a case where the coating film is exposed to a high humidity environment, the height of an eluate of the coating film of the present invention in a coating film surface elution test is 1.0 μm or less. When the height of an eluate on the coating film surface is 1.0 μm or less, even in a case where the coating film is exposed to a high humidity environment, uneven distribution of the hydrophilic compounds present around the coating film surface is suppressed, and thus appearance of the coating film is favorably maintained (elution on the coating film surface and generation of water droplet marks are suppressed).

Here, the coating film surface elution test is carried out by placing 10 μL of deionized water on the coating film, allowing the coating film to stand in an environment of 23° C., 50% RH for 24 hours, measuring the heights of the eluate at 20 locations selected randomly within a 10 $cm^2$ range of the coating film surface, and determining the maximum height.

The height of the eluate in the coating film surface elution test is preferably 0.5 μm or less, more preferably 0.4 μm or less, and even more preferably 0.3 μm or less, still even more preferably 0.2 μm or less, and most preferably 0.1 μm or less.

Further, to suppress generation of water droplet marks on the coating film surface in a case where the coating film is exposed to a high humidity environment, in the coating film of the present invention, it is desirable that no water droplet marks is generated in a water droplet mark test; preferably, change in interference color is suppressed; or more preferably, appearance is not completely changed.

Herein, the water droplet mark test can be carried out as follows. The surface of a coating film formed on a substrate is exposed to steam at a distance of 5 cm from the water surface of 80° C. hot water in an environment of 23° C., 50% RH in a range of 50 $cm^2$ for 90 seconds. Then, the coating film was allowed vertically stand and dried at room temperature. Subsequently, the appearance of the coating film is visually observed. Alternatively, the surface of a coating film formed on a substrate is exposed to steam at a distance of 5 cm from the water surface of 80° C. hot water in an environment of 23° C., 50% RH in a range of 50 $cm^2$ for 10 seconds. Then, the coating film is allowed to vertically stand and dried at room temperature, and this operation is repeated 10 times. Subsequently, the appearance of the coating film is visually observed.

To suppress elution (generation of water droplet marks due to elution) from the entire coating film in a case where the coating film is exposed to a high temperature and high humidity environment, in the coating film of the present invention, the elution level in elution in water per coating film unit volume in a coating film total elution test is preferably 40 mg/cm$^3$ or less. When the elution level in water per coating film unit volume in the coating film total elution test is 40 mg/cm$^3$ or less, even in a case where the coating film is exposed to high temperature and high humidity, uneven distribution of the hydrophilic compounds in the coating film is suppressed, and thus appearance of the coating film is favorably maintained (elution from the entire coating film and generation of water droplet marks are suppressed).

Here, the coating film total elution test is carried out by immersing the coating film in deionized water at 23° C. for 24 hours, and then measuring the weight of the coating film eluate recovered from the deionized water.

The elution level in the coating film total elution test is more preferably 30 mg/cm$^3$ or less, even more preferably 20 mg/cm$^3$ or less, still even more preferably 10 mg/cm$^3$ or less, and most preferably 5 mg/cm$^3$ or less.

In another embodiment, a coating film total elution test (2) can be carried out by immersing the coating film in deionized water at higher than 23° C. (for example, 30° C., 40° C., 50° C., or 80° C.) for 24 hours, and then measuring the weight of the coating film eluate recovered from the deionized water.

The elution level in the coating film total elution test (2) is preferably 40 mg/cm$^3$ or less, more preferably 30 mg/cm$^3$ or less, even more preferably 20 mg/cm$^3$ or less, still even more preferably 10 mg/cm$^3$ or less, and most preferably 5 mg/cm$^3$ or less.

In the coating film of the present invention, a water contact angle measured after subjecting the coating film to a moisture resistance test, in which the coating film is exposed to an environment of 85° C., 85% RH for 24 hours and then allowed to stand in an environment of 23° C., 50% RH for 1 hour, is less than 40°. The water contact angle is preferably less than 30°, and more preferably less than 20°.

As an alternative moisture resistance test, in the coating film of the present invention, a water contact angle measured after subjecting the coating film to a moisture resistance test, in which a coating film is exposed to an environment of 50° C., 95% RH for 240 hours (in a lower temperature and high humidity environment for a long period of time) and then allowed to stand in an environment of 23° C., 50% RH for 1 hour, is preferably less than 40°, and more preferably less than 30°.

In the coating film of the present invention, the height of the eluate in the coating film surface elution test is 1.0 μm or less and the water contact angle is less than 40°; and preferably, the height of the eluate in the coating film surface elution test is 0.5 μm or less and the water contact angle is less than 40°; or the height of the eluate in the coating film surface elution test is 0.4 μm or less and the water contact angle is less than 40°; or the height of the eluate in the coating film surface elution test is 0.3 μm or less and the water contact angle is less than 40°, or the height of the eluate in the coating film surface elution test is 0.2 μm or less and the water contact angle is less than 40°; or the height of the eluate in the coating film surface elution test is 0.1 μm or less and the water contact angle is less than 40°; or the height of the eluate in the coating film surface elution test is 1.0 μm or less and the water contact angle is less than 30°; or the height of the eluate in the coating film surface elution test is 0.5 μm or less and the water contact angle is less than 30°; or the height of the eluate in the coating film surface elution test is 0.4 μm or less and the water contact angle is less than 30°; or the height of the eluate in the coating film surface elution test is 0.3 μm or less and the water contact angle is less than 30°; or the height of the eluate in the coating film surface elution test is 0.2 μm or less and the water contact angle is less than 30°; or the height of the eluate in the coating film surface elution test is 0.1 μm or less and the water contact angle is less than 30°; or the height of the eluate in the coating film surface elution test is 1.0 μm or less and the water contact angle is less than 20°; or the height of the eluate in the coating film surface elution test is 0.5 μm or less and the water contact angle is less than 20°; or the height of the eluate in the coating film surface elution test is 0.4 μm or less and the water contact angle is less than 20°; or the height of the eluate in the coating film surface elution test is 0.3 μm or less and the water contact angle is less than 20°; or the height of the eluate in the coating film surface elution test is 0.2 μm or less and the water contact angle is less than 20°; or the height of the eluate in the coating film surface elution test is 0.1 μm or less and the water contact angle is less than 20°.

In an embodiment, in the coating film of the present invention, an elemental concentration ratio (C1s/M) of a C element to a metal element, which is obtained from a C1s spectrum and a metal (M) spectrum derived from a metal oxide in an elemental analysis of the surface using XPS, may be in a range of 0.1 to 5, but is not particularly limited thereto. When C1s/M is 0.1 or more, the degree of exposure of the metal oxide on the coating film surface becomes smaller, contamination due to foreign substances is suppressed in the case of exposure to a high temperature and high humidity environment, and thus the antifogging properties are maintained at a desired level. When C1s/M is 5 or less, the amount of an organic component not immobilized on the surface of the metal oxide becomes smaller, and thus persistence of appearance, elution resistance and an effect of suppressing water droplet marks can be maintained at a desired level.

Further, when the relative elemental concentration of a C element obtained from the C1s spectrum derived from carbon-oxygen bonds and/or carbon-nitrogen bonds in the elemental analysis of the surface using XPS is in a range of 5 to 50 atomic %, the antifogging properties and hydrophilicity of the coating film can be further improved. When the relative elemental concentration is 5 atomic % or more, the density of the hydrophilic group on the coating film surface becomes larger, and hydrophilicity and antifogging properties of the coating film can be improved. When the relative elemental concentration is 50 atomic % or less, solubility in water is maintained in a desired range, and the elution resistance and the effect of suppressing water droplet marks of the coating film can be improved.

In the elemental analysis of the coating film surface using XPS, the lower limit of C1s/M is more preferably 0.3 or more, and even more preferably 0.4 or more. The upper limit thereof is more preferably 8 or less. In other words, C1s/M may be in a range of 0.2 to 8, in a range of 0.3 to 10, in a range of 0.3 to 8, in a range of 0.4 to 10, or in a range of 0.4 to 8.

Further, in the elemental analysis of the coating film surface using XPS, the lower limit of the relative elemental concentration of the C1s spectrum derived from carbon-oxygen bonds and/or carbon-nitrogen bonds is more preferably 10 atomic % or more. The upper limit thereof is more preferably 40 atomic % or less. In other words, the relative elemental concentration of the C1s spectrum derived from carbon-oxygen bonds and/or carbon-nitrogen bonds may be in a range of 5 to 40 atomic %, in a range of 10 to 50 atomic %, or in a range of 10 to 40 atomic %.

The elemental analysis of the coating film surface using XPS can be carried out, for example, by using the following device under the following measurement conditions.

For example, Verasa probe II available from ULVAC-PHI, Inc. may be used, and monoAlK■ (15 kV×3.3 mA) may be used as an excitation source. A mask of 1 mm×2 mm is placed on a surface of a coating film of a measurement sample to set a measurement range.

A photoelectron takeoff angle is 45° and for a take-in area, a survey scan is 0 to 1,100 eV, and a narrow scan is C1s, N1s, Si2p, and O1s. For pass energy, a survey scan is 117.5 eV, and a narrow scan is 46.95 eV In an embodiment, in the coating film, a method of suppressing the height of an eluate in the coating film surface elution test within a range of 1.0 μm or less, or a method of suppressing the height of an eluate in the coating film surface elution test to 1.0 μm or less and also suppressing the level of elution in water per coating film unit volume in the coating film total elution test to a range of 40 mg/cm$^3$ or less can be achieved by covering a surface of the metal oxide (A) contained in the coating film with a component containing a site of interaction with the metal oxide (typically, the above-described compounds mentioned as the hydrophilic compound (B)).

In the method of covering a surface of the metal oxide (A) with an organic component such as the hydrophilic compound (B) via a non-covalent bond, for example, the content of the organic component is preferably such that the coverage ratio (P) of (B) to (A) calculated from the number average particle size ($D_A$) of the metal oxide (A), the density ($\rho_A$), the weight ratio ($W_B$) of (B) to (A), the average particle size ($D_B$) of the hydrophilic compound (B), and the density ($\rho_B$) of the component (B) is controlled to a range of 1% or more and less than 100% from the viewpoints of the antifogging persistence, persistence of appearance, elution resistance, and effect of suppressing water droplet marks of the coating film. The coverage ratio (P) is more preferably 3% or more and less than 70%, and even more preferably 5% or more and less than 50%.

$$P(\%) = \frac{100 \times D_A \rho_A W_B}{4 D_B \rho_B} \quad \text{[Equation 1]}$$

Incidentally, the average particle size ($D_B$) of the hydrophilic compound (B) can be calculated from the molecular weight and density of the hydrophilic compound (B). When the coverage ratio (P) is 1% or more, the exposure amount of the metal oxide on the coating film surface becomes smaller, antifogging properties can be maintained even in case of exposure to a high temperature and high humidity environment.

When the coverage ratio (P) is less than 100%, uneven distribution of the hydrophilic compounds (B), which are not immobilized on the surface of the metal oxide, on the coating film surface, and elution in water are suppressed. Thus, the persistence of appearance and elution resistance of the coating film, and an effect of suppressing water droplet marks can be adjusted to a desired level.

Here, the weight ratio ($W_B$) of the hydrophilic compound (B) to the metal oxide (A) depends on the particle sizes of the metal oxide (A) and the hydrophilic compound (B). When the particle size of the metal oxide (A) is 1 to 400 nm, $0.00008 < W_B < 3$ is required for the coverage ratio of 1% or more and less than 100%.

Examples of the method of covering a surface of the metal oxide (A) with an organic component such as the hydrophilic compound (B) via a covalent bond include reacting an organic compound having reactivity with a functional group on the surface of the metal oxide in advance. For example, in a case where colloidal silica is used as the metal oxide, a hydrophilic compound having a functional group that reacts with a silanol group on the surface of colloidal silica can be used. Examples of such a functional group include an alkoxy group, a silanol group, a hydroxy group, an amino group, an oxime group, and an acetoxy group.

The hydrophilic compound (B) preferably has an HLB value (hydrophilic-lipophilic balance) of 10 or more as determined by a Griffin method. The HLB value determined by a Griffin method is an indicator of the hydrophilic ratio of a hydrophilic compound, and an HLB value of 10% or more corresponds to a hydrophilic ratio of a hydrophilic compound of 50% or more. When the HLB value is 10 or more, the solubility in water is maintained at a predetermined level, so that the hydrophilic compound is uniformly dispersed in an aqueous solution, and the appearance of the resulting coating film is favorably maintained, which is preferable. Further, when the HLB value is 10 or more, sufficiently high hydrophilicity can be maintained even in a case where the hydrophilic compound is immobilized on the surface of the metal oxide, so that the antifogging properties of the coating film become preferred.

Component (C): Isocyanate Compound

The coating composition for forming the coating film according to the present invention may contain an isocyanate compound as a component (C) in addition to components (A) and (B). It is preferable that the coating composition (and the coating film of the present invention formed from the coating composition) further contains an isocyanate compound as a component (C) from the viewpoint of improving adhesion to a substrate and scratch resistance.

The isocyanate compound (C) in the present invention refers to a compound having at least one or more isocyanate group in one molecule. The isocyanate compound (C) may be a compound having two or more isocyanate groups in one molecule.

Examples of the isocyanate compound (C) include aliphatic diisocyanates such as 1,4-tetramethylene diisocyanate, ethyl(2,6-diisocyanato)hexanoate, 1,6-hexamethylene diisocyanate, 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, and 2-isocyanatoethyl (2,6-diisocyanato)hexanoate; alicyclic diisocyanates such as 1,3- or 1,4-bis(isocyanatomethylcyclohexane), 1,3- or 1,4-diisocyanatocyclohexane, 3,5,5-trimethyl(3-isocyanatomethyl)cyclohexyl isocyanate, dicyclohexylmethane-4,4'-diisocyanate, and 2,5- or 2,6-diisocyanatomethylnorbornane; alicyclic triisocyanates such as 2,5- or 2,6-diisocyanatomethyl-2-isocyanate propylnorbornane; aralkylene diisocyanates such as m-xylylene diisocyanate and α,α,α'α'-tetramethyl-m-xylylene diisocyanate; aromatic diisocyanates such as m- or p-phenylene diisocyanate, tolylene-2,4- or 2,6-diisocyanate, diphenylmethane-4,4'-diisocyanate, naphthalene-1,5-diisocyanate, diphenyl-4,4'-diisocyanate, 4,4'-diisocyanato-3,3'-dimethyldiphenyl, 3-methyl-diphenylmethane-4,4'-diisocyanate, and diphenyl ether-4,4'-diisocyanate; aromatic triisocyanates such as triphenylmethane triisocyanate and tris(isocyanatophenyl)thiophosphate; diisocyanates or polyisocyanates having an urethodione structure obtained by cyclodimerization of isocyanate groups of the diisocyanate or triisocyanate as described above; polyisocyanates having an isocyanurate structure obtained by cyclotrimerization of isocyanate groups of the diisocyanate or triisocyanate as described above; polyisocyanates having a biuret structure obtained by reacting the diisocyanate or triisocyanate as described above with water; polyisocyanates having an oxadiazinetrione structure obtained by reacting the diisocyanate or triisocyanate as described above with carbon dioxide; polyisocyanates having an allophanate structure obtained by reacting the diisocyanate or triisocyanate as described above with various alcohols; and polyisocyanates obtained by reacting the diisocyanate or triisocyanate as described above with an active hydrogen-containing compound such as a polyhydroxy compound, a polycarboxy compound, and a polyamine compound. Examples of the isocyanate compound having an alkoxysilane moiety and/or a siloxane moiety in the molecule include 3-isocyanatepropyltriethoxysilane or the like, and/or hydrolytic condensates of 3-isocyanatepropyltriethoxysilane or the like. They may be used singly or in combinations of two or more. The isocyanate compound may be a blocked polyisocyanate obtained by reacting an isocyanate group with a blocking agent.

Examples of the blocking agent include, but are not particularly limited to, oxime compounds, alcohol compounds, acid amide compounds, acid imide compounds, phenol compounds, amine compounds, active methylene compound, imidazole compounds, and pyrazole compounds. Examples of the oxime compound include, but are not particularly limited to, formaldoxime, acetaldoxime, acetoxime, methyl ethyl ketoxime, and cyclohexanone oxime. Examples of the alcohol compound include, but are not particularly limited to, methanol, ethanol, 2-propanol, n-butanol, sec-butanol, 2-ethyl-1-hexanol, 2-methoxyethanol, 2-ethoxyethanol, and 2-butoxyethanol. Examples of the acid amide compound include, but are not particularly limited to, acetanilide, amide acetate, ε-caprolactam, δ-valerolactam, and γ-butyrolactam. Examples of the acid imide compound include, but are not particularly limited to, succinimide and maleimide. Examples of the phenol compound include, but are not particularly limited to, phenol, cresol, ethylphenol, butylphenol, nonylphenol, dinonylphenol, styrenated phenol, and hydroxy benzoate. Examples of the amine compound include, but are not particularly limited to, diphenylamine, aniline, carbazole, di-n-propylamine, diisopropylamine, and isopropylethylamine. Examples of the active methylene compound include, but are not particularly limited to, dimethyl malonate, diethyl malonate, methyl acetoacetate, ethyl acetoacetate, and acetylacetone. Examples of the imidazole compound include, but are not particularly limited to, imidazole, and 2-methylimidazole. Examples of the pyrazole compound include, but are not particularly limited to, pyrazole, 3-methylpyrazole, and 3,5-dimethylpyrazole.

Also, among the polyisocyanate compounds, an aliphatic or alicyclic diisocyanate, or triisocyanate, an aralkylene diisocyanate or a polyisocyanate derived therefrom is particularly preferred from the viewpoints of weather resistance and pot life. As the polyisocyanate, those having, in the molecule, a biuret structure, an isocyanurate structure, a urethane structure, a urethodione structure, an allophanate structure, or the like are preferable. Polyisocyanates having a biuret structure are often excellent in adhesion. Polyisocyanates having an isocyanurate structure are often excellent in weather resistance. Polyisocyanates having a urethane structure prepared by using an alcohol compound having a long side chain are often excellent in elasticity and extensibility. Polyisocyanates having an urethodione structure or an allophanate structure have often a low viscosity.

From the viewpoint of water dispersibility, the isocyanate compound (C) used in the present invention is preferably a hydrophilic polyisocyanate composition (c1) obtained by reacting a polyisocyanate compound having two or more isocyanate groups in one molecule with a hydroxy group-containing hydrophilic compound having a nonionic and/or ionic hydrophilic group in a manner that the equivalent ratio of isocyanate group/hydroxy group is in a range of 1.05 to 1,000. The equivalent ratio is more preferably in a range of 2 to 200, and even more preferably in a range of 4 to 100. When the equivalent ratio is 1.05 or more, the content of the isocyanate group in the hydrophilic polyisocyanate composition (c1) becomes equal to or higher than a predetermined level, so that the number of crosslinking points in a crosslinkable aqueous coating composition increases, and the curing rate becomes larger, or the strength of a coating such as a coating film is improved, which is preferable. When the equivalent ratio is 1,000 or less, hydrophilicity is exhibited, which is preferable.

As the hydrophilic polyisocyanate composition (c1) as described above, those in which a hydrophilic group is introduced by a conventionally known method can be used without any particular limitation. Examples thereof include a reaction product of a compound represented by the general formula $R^1O(R^2O)_n$—H (where $R^1$ represents an alkyl group having 1 to 30 carbon atoms or a group containing two or more aromatic rings, $R^2$ represents an alkylene group having 1 to 5 carbon atoms, and n is an integer from 2 to 250) and a polyisocyanate compound, a reaction product of a vinyl polymer having a hydrophilic group and a hydroxy group and a polyisocyanate compound, and a reaction product of an emulsifier obtained by reacting an alkoxypolyalkylene glycol with dialkanolamine and a polyisocyanate compound. Among them, since the reaction product of the compound represented by the general formula $R^1O$—$(R^2O)_n$—H (where $R^1$ represents an alkyl group having 1 to 30 carbon atoms or a group containing two or more aromatic rings, $R^2$ represents an alkylene group having 1 to 5 carbon atoms, and n is an integer from 2 to 250) and the polyisocyanate compound, the reaction product of the vinyl polymer having a hydrophilic group and a hydroxy group and the polyisocyanate compound are excellent in water dispersibility, and therefore it is particularly preferable.

Examples of the compound represented by the general formula $R^1O$—$(R^2O)_n$—H (where $R^1$ represents an alkyl group having 1 to 30 carbon atoms or a group containing two or more aromatic rings, $R^2$ represents an alkylene group having 1 to 5 carbon atoms, and n is an integer from 2 to 250) include alkoxypolyalkylene glycols such as polymethylene glycol monomethyl ether, polyethylene glycol monomethyl ether, polyethylene glycol monoethyl ether, polyethylene glycol monopropyl ether, polyethylene glycol monolauryl ether, polyoxyethylene-oxypropylene (random and/or block) glycol monomethyl ether, and polyoxyethylene-oxytetramethylene (random and/or block) glycol polybutylene glycol monomethyl ether, and nonionic surfactants having a group containing two or more aromatic rings such as a (mono- to penta-) styrenated phenyl group, a mono (or di, tri) styryl-methyl-phenyl group, a tribenzyl phenyl group, and a β-naphthyl group. Among them, polyethylene glycol monomethyl ether and a nonionic surfactant having a (mono- to penta-) styrenated phenyl group are preferable from the viewpoints of self-emulsification ability and pot life.

Among the compounds represented by the general formula $R^1O$—$(R^2O)_n$—H (where R' represents an alkyl group having 1 to 30 carbon atoms or a group containing two or more aromatic rings, $R^2$ represents an alkylene group having 1 to 5 carbon atoms, and n is an integer from 2 to 250), those having a molecular weight of preferably 100 to 10,000, more preferably 300 to 5,000 can be preferably used.

Examples of the hydrophilic group of the vinyl polymer having a hydrophilic group and a hydroxy group include various publicly known anionic groups, cationic groups, and nonionic groups, and nonionic groups are preferable. When the hydrophilic group is a nonionic group, the pot life of the coating composition is markedly prolonged, and the particle size of polyisocyanate oil droplets is reduced, so that the water resistance of a coating film to be formed can be further improved.

Specific examples of the vinyl polymer having a hydrophilic group and a hydroxy group include an acrylic polymer, a fluoroolefin polymer, a vinyl ester polymer, an aromatic vinyl polymer, and a polyolefin polymer. Among them, an acrylic polymer is preferable from the viewpoint of the weather resistance of a coating film to be formed.

A polymerization method for obtaining an acrylic polymer suitable as the vinyl polymer having a hydrophilic group and a hydroxy group is not particularly limited, and examples thereof include suspension polymerization, emulsion polymerization, and solution polymerization. Preferably, the acrylic polymer is obtained by solution polymerization of an ethylenically unsaturated monomer (i) having a hydrophilic group and an ethylenically unsaturated monomer (ii) having a hydroxy group. If necessary, other ethylenically unsaturated monomers (iii) copolymerizable with them can also be used.

Examples of the ethylenically unsaturated monomer (i) having a hydrophilic group include alkoxypolyalkylene glycol (meth)acrylates such as methoxypolyethylene glycol (meth)acrylate, ethoxypolyethylene glycol (meth)acrylate, and butoxy polyethylene glycol(meth)acrylate; polyalkylene glycol di(meth)acrylates such as polyethylene glycol di(meth)acrylate; (meth)acrylamide monomers; and anionic vinyl monomers. Ethylenically unsaturated monomers having both a hydrophilic group and a hydroxy group in the molecule like polyalkylene glycol (meth)acrylates can also be used. They may be used singly or in combinations of two or more.

Examples of the other ethylenically unsaturated monomers (iii) copolymerizable with these include (meth)acrylic esters, aromatic vinyl compounds, vinyl cyanides, carbonyl group-containing vinyl monomers, olefins, dienes, haloolefins, vinyl ethers, and allyl esters. They may be used singly or in combinations of two or more.

As the vinyl polymer containing a hydrophilic group and a hydroxy group, those having a weight average molecular weight (GPC method in terms of polystyrene) of preferably 2,000 to 100,000, more preferably 3,000 to 50,000 can be suitably used.

For example, in the case of the hydrophilic compound (B) having a hydroxy group, the content of the hydrophilic compound (B) relative to the isocyanate compound (C) in the coating composition is preferably such that the ratio of number of moles of hydroxy groups contained in the hydrophilic compound (B) to number of moles of isocyanate groups contained in the isocyanate compound (C) (X=number of moles of isocyanate group/number of moles of hydroxy group) is 0.02 or more. X is more preferably 0.1 or more from the viewpoint of adhesion between a coating film to be formed and a substrate, and even more preferably 0.15 or more from the viewpoint of the scratch resistance of the coating film. From the viewpoint of stability (resistance to gelation and increase in viscosity) of the coating composition, X is preferably 10 or less, and from the viewpoints of low water contact angle and high transparency (low HAZE) of a coating film to be formed, X is more preferably 5 or less. The ratio (X) may be 0.02 or more and 10 or less, 0.02 or more and 5 or less, 0.1 or more and 10 or less, 0.1 or more and 5 or less, 0.15 or more and 10 or less, or 0.15 or more and 5 or less.

In an embodiment, the mass ratio (mass of (C)/mass of (A+B)) of the isocyanate compound (C) to the metal oxide (A) and the hydrophilic compound (B) is preferably 0.001 or more, more preferably 0.01 or more, and even more preferably 0.05 or more from the viewpoint of adhesion. Further, the mass ratio is preferably 1.0 or less, more preferably 0.5 or less, and even more preferably 0.3 or less from the viewpoints of antifogging properties and transparency.

Further, the viscosity of the isocyanate compound (C) is preferably 1 to 50,000 mPa·s (20° C.), more preferably 1 to 20,000 mPa·s (20° C.), and even more preferably 10 to 10,000 mPa·s (20° C.). The viscosity of the isocyanate compound (C) may also be 10 to 50,000 mPa·s (20° C.), 10 to 20,000 mPa·s (20° C.), or 10 to 10,000 mPa·s (20° C.). The viscosity of the polyisocyanate compound (C) of 50,000 mPa·s or less is preferred because dispersion of the polyisocyanate compound (C) in water is easy. The viscosity herein can be measured with a commonly used E type viscometer. In an embodiment, the viscosity is measured at a rotation speed of 2.5 rpm at 25° C. using an E type viscometer (RE-80U, available from Toki Sangyo Co., Ltd.).

Water or a solvent may be mixed in the isocyanate compound (C). Examples of the solvent include aliphatic hydrocarbon solvents such as hexane, heptane, and octane; alicyclic hydrocarbon solvents such as cyclohexane, and methylcyclohexane; ketone solvents such as acetone, methyl ethyl ketone, methyl isobutyl ketone, and cyclohexanone; ester solvents such as methyl acetate, ethyl acetate, butyl acetate, isobutyl acetate, methyl lactate, and ethyl lactate; aromatic solvents such as toluene, xylene, diethyl benzene, mesitylene, anisole, benzyl alcohol, phenyl glycol, and chloro benzene; glycol solvents such as ethylene glycol monoethyl ether acetate, 3-methyl-3-methoxy butyl acetate, dipropylene glycol monomethyl ether, and propylene glycol monomethyl ether; ether solvents such as diethyl ether, tetrahydrofuran, and dioxane; halogenated hydrocarbon solvents such as dichloromethane, 1,2-dichloroethane, and chloroform; pyrrolidone solvents such as N-methyl-2-pyrrolidone; amide solvents such as N, N-dimethylacetamide, and N,N-dimethylformamide; sulfoxide solvents such as dimethylsulfoxide; lactone solvents such as γ-butyrolactone; amine solvents such as morpholine; and a mixture thereof. These solvents may be used singly or in combination of two or more.

Component (D): Polymer Particles

The coating composition for forming the coating film according to the present invention may contain polymer particles as a component (D) in addition to the components (A) and (B). Further, the coating composition may contain polymer particles as a component (D) in addition to the components (A), (B), and (C).

The coating composition (and the coating film of the present invention formed from the coating composition) preferably further contains polymer particles as a component (D). In an embodiment, the component (D) is polymer particles obtained by polymerizing a polymerization stock solution containing a component (d1): a hydrolyzable silicon compound, a component (d2): a vinyl monomer containing at least one functional group selected from the group consisting of a hydroxy group, a carboxyl group, an amide group, an amino group, and an ether group, a component (d3): an emulsifier, and a component (d4): water.

In an embodiment, the component (A) interacts with the component (D) and can act as a curing agent for the component (D). Examples of the interaction include formation of a hydrogen bond between a hydroxy group generally contained in the component (A) and a functional group selected from the group consisting of a hydroxy group, a carboxyl group, an amide group, an amino group, and an ether group contained in the component (D), and condensation (chemical bonding) between the hydroxy group generally contained in the component (A) and a polymerization product of the component (d1) constituting the component (D). It is preferable that the component (A) forms a continuous layer between particles of the component (D) while interacting with the component (D). With this, the adhesion, water resistance, and weather resistance of the resulting coating film can be further improved.

As the component (d1), a compound represented by Formula (4) below or a condensation product thereof, a silane coupling agent or the like can be used.

$$SiW_xR_y \qquad (4)$$

(In Formula (4), W represents at least one group selected from an alkoxy group having 1 to 20 carbon atoms, a hydroxy group, an acetoxy group having 1 to 20 carbon atoms, a halogen atom, a hydrogen atom, an oxime group having 1 to 20 carbon atoms, an enoxy group, an aminoxy group, and an amide group, R represents at least one hydrocarbon group selected from a linear or branched alkyl group having 1 to 30 carbon atoms, a cycloalkyl group having 5 to 20 carbon atoms, and an aryl group having 6 to 20 carbon atoms that is not substituted or substituted with an alkyl group having 1 to 20 carbon atoms, an alkoxy group having 1 to 20 carbon atoms, or a halogen atom, x is an integer of 1 or more and 4 or less, and y is an integer of 0 or more and 3 or less, and x+y=4.)

Note that the silane coupling agent means a compound in which a functional group having reactivity with an organic substance such as a vinyl polymerizable group, an epoxy group, an amino group, a methacryl group, a mercapto group, or an isocyanate group exists in the molecule.

Specific examples of the compound represented by Formula (4) include tetraalkoxysilanes such as tetramethoxysilane, tetraethoxysilane, tetra-n-propoxysilane, tetraisopropoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, allyltrimethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-(meth)acryloyloxypropyltri-n-propoxysilane, 3-(meth)acryloyloxypropyltriisopropoxysilane, 3-ureidopropyltrimethoxysilane, and 3-ureidopropyltriethoxysilane; dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, diisopropyldimethoxysilane, diisopropyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane, and 3-(meth)acryloyloxypropylmethyldimethoxysilane; and monoalkoxysilanes such as trimethylmethoxysilane, and trimethylethoxysilane. These may be used singly or two or more types thereof may be mixed and used.

As the component (d1), a silicon alkoxide having a phenyl group (for example, phenyltrimethoxysilane, phenyltriethoxysilane, and diphenyldimethoxysilane) can be used. A silicon alkoxide having a phenyl group is preferably used because polymerization stability in the presence of water and an emulsifier becomes favorable.

Further, the component (d1) may also be used in combination with a silane coupling agent having a thiol group or a hydrolyzable silicon compound having a vinyl polymerizable group as a component (d1-1). These are preferably used because the long-term antifouling properties of the resulting coating film become favorable. As the silane coupling agent having a thiol group, for example, 3-mercaptopropyltrimethoxysilane, 3-mercaptopropyltriethoxysilane, or the like can be used.

Examples of the component (d1-1) that can be used include a silane coupling agent having a vinyl polymerizable group such as 3-(meth)acryloxypropyltrimethoxysilane, 3-(meth)acryloxypropyltriethoxysilane, 3-(meth)acryloyloxypropylmethyldimethoxysilane, 3-(meth)acryloyloxypropyltri-n-propoxysilane, 3-(meth)acryloyloxypropyl triisopropoxysilane, vinyltrimethoxysilane, vinyltriethoxysilane, allyltrimethoxysilane, and 2-trimethoxysilyl ethyl vinyl ether.

These silane coupling agents can form a chemical bond via copolymerization or chain transfer reaction with the component (d2) described later. Thus, in a case where a silane coupling agent having a vinyl polymerizable group or a thiol group is mixed or complexed with the component (d1), a polymerization product of the component (d1) and a polymerization product of the component (d2) described later can be complexed by a chemical bond. Note that the "vinyl polymerizable group" of the component (d1-1) is, for example, a vinyl group and an allyl group, and among them, 3-(meth)acryloxypropyl group is preferable.

The component (d1) may also include a cyclic siloxane oligomer as the component (d1-2). By using the component (d1-2), the flexibility of a composite obtained from the coating film and the substrate is increased, which is preferable.

As the cyclic siloxane oligomer, a compound represented by Formula (5) can be used.

$$(R'_2SiO)_m \qquad (5)$$

(In Formula (5), R' represents at least one selected from the group consisting of a hydrogen atom, a linear or branched alkyl group having 1 to 30 carbon atoms, a cycloalkyl group having 5 to 20 carbon atoms, and an aryl group having 6 to 20 carbon atoms that is unsubstituted or substituted with an alkyl group having 1 to 20 carbon atoms, an alkoxy group having 1 to 20 carbon atoms, or a halogen atom, m is an integer, and $2 \leq m \leq 20$.)

Among the cyclic siloxane oligomers, a cyclic dimethylsiloxane oligomer such as octamethylcyclotetrasiloxane is preferable in terms of reactivity or the like.

In a case where the component (d1) is used as a condensation product, the weight average molecular weight in terms of polystyrene (according to a GPC method) of the condensation product is preferably 200 to 5,000, and more preferably 300 to 1,000. The ratio (d1)/(D) of the mass of the component (d1) of the polymerization stock solution to the mass of the polymer particles of the component (D) is preferably 0.01/100 to 80/100, and more preferably 0.1/100 to 70/100 from the viewpoint of polymerization stability. Meanwhile, the ratio (d1-1)/(D) of the mass of the component (d1-1) of the polymerization stock solution to the mass of the polymer particles of the component (D) is preferably 0.01/100 to 20/100, and more preferably 0.5/100 to 10/100 from the viewpoint of polymerization stability.

Further, the mass ratio (d1-1)/(d2) of the component (d1-1) of the polymerization stock solution to the component (d2) is preferably 0.1/100 to 100/100, and more preferably 0.5/100 to 50/100 from the viewpoint of polymerization stability. Meanwhile, the ratio (d1-2)/(D) of the mass of the component (d1-2) of the polymerization stock solution to the mass of the polymer particles of the component (D) is preferably 0.01/100 to 20/100, and more preferably 0.5/100 to 5/100 from the viewpoint of hydrophilicity. The mass ratio (d1-2)/(d2) of the component (d1-2) of the polymerization stock solution to the component (d2) is preferably 0.5/100 to 50/100, and more preferably 1.0/100 to 20/100 from the viewpoint of polymerization stability.

Next, examples of the hydroxy group-containing vinyl monomer as the component (d2) include hydroxyalkyl (meth)acrylates such as 2-hydroxyethyl(meth)acrylate, 2-hydroxypropyl(meth)acrylate, and 4-hydroxybutyl(meth)acrylate; hydroxy group-containing vinyl ethers such as 2-hydroxyethylvinyl ether, and 4-hydroxybutylvinyl ether; hydroxy group-containing allyl ethers such as 2-hydroxyethyl allyl ether; monoesters of a polyoxyalkylene glycol obtained from a polyether polyol such as polyethylene glycol and an unsaturated carboxylic acid such as (meth)acrylic acid; adducts of the hydroxy group-containing monomer as described above and a lactone such as ε-caprolactone; adducts of an epoxy group-containing unsaturated monomer such as glycidyl(meth)acrylate and an acid such as acetic acid; and hydroxy group-containing vinyl monomers such as adducts of an unsaturated carboxylic acid such as (meth)acrylic acid and a monoepoxy compound (except for α-olefin epoxide) such as "Cardura-E" (trade name, available from Shell in Netherland).

Examples of the carboxyl group-containing vinyl monomer as the component (d2) include unsaturated carboxylic acids such as (meth)acrylic acid, 2-carboxyethyl(meth)acrylate, crotonic acid, itaconic acid, maleic acid, and fumaric acid; monoesters (half esters) of an unsaturated dicarboxylic acid and a saturated monovalent alcohol such as monomethyl itaconate, mono-n-butyl itaconate, monomethyl maleate, mono-n-butyl maleate, monomethyl fumalate, and mono-n-butyl fumalate; monovinyl esters of a saturated dicarboxylic acid such as monovinyl adipate, and monovinyl succinate; an addition reaction product between a saturated polycarboxylic acid anhydride such as succinic anhydride, glutaric anhydride, phthalic anhydride, and trimellitic anhydride, and the hydroxy group-containing vinyl monomer as described above; and monomers obtained by addition reaction of the carboxyl group-containing monomer as described above and a lactone.

As the amide group-containing vinyl monomer as the component (d2), for example, an N-alkyl or an N-alkylene-substituted (meth)acrylamide can be used. More specifically, examples of the amide group-containing vinyl monomer that can be used include N-methylacrylamide, N-methylmethacryl amide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrroli dine, N-methacryloylpyrrolidine, N-acryloylpiperidine, N-methacryloylpiperidine, N-acryloylhexahydroazepine, N-acryloylmorpholine, N-methacryloylmorpholine, N-vinylpyrrolidone, N-vinylcaprolactam, N,N'-methylenebisacryl amide, N,N'-methylene bismethacrylamide, N-vinylacetamide, diacetoneacrylamide, diacetonemethacrylamide, N-methylolacryl amide, and N-methylolmethacrylamide.

Examples of the amino group-containing vinyl monomer as the component (d2) include tertiary amino group-containing (meth)acrylates such as 2-dimethylaminoethyl (meth)acrylate, 2-diethylaminoethyl(meth)acrylate, 2-di-n-propylaminoethyl(meth)acrylate, 3-dimethylaminopropyl (meth)acrylate, 4-dimethylaminobutyl(meth)acrylate, and N-[2-(meth)acryloyloxy]ethylmorpholine; tertiary amino group-containing aromatic vinyl monomers such as vinylpyridine, N-vinylcarbazole, and N-vinylquinoline; tertiary amino group-containing (meth)acrylamides such as N-(2-dimethyl amino)ethyl(meth)acryl amide, N-(2-diethylamino)ethyl(meth)acryl amide, N-(2-di-n-propylamino) ethyl(meth)acrylamide, N-(3-dimethylamino)propyl(meth) acrylamide, N-(4-di methylamino)butyl(meth)acrylamide, and N-[2-(meth)acrylamide] ethylmorpholine; tertiary amino group-containing crotonic acid amides such as N-(2-dimethylamino)ethylcrotonic acid amide, N-(2-diethylamino)ethyl crotonic acid amide, N-(2-di-n-propylamino) ethylcrotonic acid amide, N-(3-dimethylamino) propylcrotonic acid amide, and N-(4-dimethylamino) butylcrotonic acid amide; and tertiary amino group-containing vinyl ethers such as 2-dimethylaminoethyl vinyl ether, 2-diethylaminoethyl vinyl ether, 3-dimethylaminopropyl vinyl ether, and 4-dimethylaminobutyl vinyl ether.

Examples of the ether group-containing vinyl monomer as the component (d2) include vinyl monomers such as vinyl ethers having a polyether chain in a side chain, such as a polyoxyethylenealkyl ether, a polyoxyethylenealkylphenyl ether, a higher fatty acid ester of a polyoxyethylene, and a polyoxyethylene-polyoxypropylene block copolymer, allyl ethers, and (meth)acrylates. Specifically, for example, BLEMMER PE-90, PE-200, PE-350, PME-100, PME-200, PME-400, and AE-350 (each of which available from NOF Corporation); and MA-30, MA-50, MA-100, MA-150, RA-1120, RA-2614, RMA-564, RMA-568, RMA-1114, and MPG130-MA (each of which available from Nippon Nyukazai Co., Ltd.) can be used. Here, the number of oxyethylene units of the polyoxyethylene chain is preferably 2 to 30. When the number of oxyethylene units is 2 or more, suitable flexibility can be obtained in a coating film, and when the number is 30 or less, excessive softening of the coating film is suppressed, and thus blocking resistance is maintained.

A vinyl monomer as the component (d2) preferably has a secondary and/or tertiary amide group from the viewpoint of further improving hydrogen bonding to other components.

The ratio (d2)/(D) of the mass of the component (d2) of the polymerization stock solution to the mass of the polymer particles of the component (D) is preferably 0.1/1 to 0.5/1, and more preferably 0.2/1 to 0.4/1 from the viewpoint of polymerization stability. The ratio (d2)/(A) of the mass of the component (d2) of the polymerization stock solution to the mass of the metal oxide of the component (A) is preferably 0.1/1 to 1/1, and more preferably 0.2/1 to 0.8/1 from the viewpoints of hydrogen bonding to the component (A) and blending stability.

Next, examples of the emulsifier that can be used as the component (d3) include an acidic emulsifier such as alkylbenzene sulfonic acid, alkyl sulfonic acid, alkylsulfosuccinic acid, polyoxyethylenealkyl sulfuric acid, polyoxyethylene alkylarylsulfuric acid, and polyoxyethylene distyrylphenylether sulfonic acid; an anionic surfactant such as an alkaline metal (Li, Na, K, or the like) salt of an acidic emulsifier, an ammonium salt of an acidic emulsifier, and fatty acid soap; a cationic surfactant of a quaternary ammonium salt, a pyridinium salt, and an imidazolinium salt such as alkyltrimethylammonium bromide, alkylpyridinium bromide, and imidazolinium laurate; and a nonionic surfactant such as a polyoxyethylene alkylaryl ether, a polyoxyethylene sorbitan fatty acid ester, a polyoxyethylene oxypropylene block copolymer, and polyoxyethylene distyryl phenyl ether. They may be used singly or in combinations of two or more.

As the component (d3), a reactive emulsifier having a radical polymerizable double bond is preferably used from the viewpoints of improving water dispersion stability of the resulting component (D) and improving long-term antifouling properties of the resulting coating film. As the reactive emulsifier, more specifically, for example, a vinyl monomer having a sulfonic acid group or a sulfonate group, a vinyl monomer having a sulfuric acid ester group, or an alkali metal salt or ammonium salt thereof; a vinyl monomer having a nonionic group such as polyoxyethylene and a vinyl monomer having a quaternary ammonium salt can be used.

Examples of the vinyl monomer having a sulfonic acid group or a sulfonate group include a compound having a radical polymerizable double bond and having a substituent selected from the group consisting of an alkyl group having 1 to 20 carbon atoms, an alkyl ether group having 2 to 4 carbon atoms, a polyalkyl ether group having 2 to 4 carbon atoms, a phenyl group, a naphthyl group and a succinic acid group, which are partly substituted with a substituent such as an ammonium salt, sodium salt or potassium salt of a sulfonic acid group; and a vinyl sulfonate compound having a vinyl group to which a substituent such as an ammonium salt, a sodium salt or potassium salt of a sulfonic acid group is bonded.

Examples of the vinyl monomer having a sulfuric acid ester group include a compound having a radical polymerizable double bond and a substituent selected from the group consisting of an alkyl group having 1 to 20 carbon atoms, an alkyl ether group having 2 to 4 carbon atoms, a polyalkyl ether group having 2 to 4 carbon atoms, a phenyl group, and a naphthyl group, which are partly substituted with a substituent such as an ammonium salt, a sodium salt, or a potassium salt of a sulfonic acid ester group.

As the compound having a succinic acid group partly substituted with a substituent such as an ammonium salt, a sodium salt, or a potassium salt of a sulfonic acid group, an allyl sulfosuccinate can be used specifically. More specifically, ELEMINOL JS-2 (trade name) (available from Sanyo Chemical Industries, Ltd.) and Latemul S-120, S-180A, and S-180 (trade names) (available from Kao Corp.) can be used.

As the compound having an alkyl ether group having 2 to 4 carbon atoms or a polyalkyl ether group having 2 to 4 carbon atoms, which is partly substituted with a group such as an ammonium salt, a sodium salt, or a potassium salt of a sulfonic acid group, for example, Aqualon HS-10 or KH-1025 (trade name) (available from DKS Co. Ltd.) and ADEKA REASOAP SE-1025N or SR-1025 (trade name) (available from Adeka Corporation) can be used specifically.

Specific examples of the vinyl monomer having a nonionic group include α-[1-[(allyloxy)methyl]-2-(nonylphenoxy)ethyl]-(o-hydroxypolyoxyethylene (trade name: ADEKA REASOAP NE-20, NE-30, NE-40, and the like, available from Adeka Corporation) and polyoxyethylene alkylpropenyl phenyl ether (trade name: Aqualon RN-10, RN-20, RN-30, RN-50, and the like, available from DKS Co. Ltd.).

The amount of the component (d3) used in the polymerization stock solution is preferably 10 parts by mass or less, and more preferably 0.001 to 5 parts by mass per 100 parts by mass relative to the polymer particles of the component (D) from the viewpoint of polymerization stability.

In an embodiment, the component (D) of the coating film is polymer particles obtained by polymerizing a polymerization stock solution containing the components (d1) to (d3) described above and water as a component (d4). Note that the amount of the component (d4) used as the content in the polymerization stock solution is preferably 30 to 99.9 mass % from the viewpoint of polymerization stability. In addition to the components (d1) to (d4), various components can be further added to the polymerization stock solution. For example, as the component (d5), another vinyl monomer copolymerizable with the component (d2) may be mixed in the polymerization stock solution. Use of the component (d5) is suitable from the viewpoint of controlling the properties of a polymerization product to be produced (glass transition temperature, molecular weight, hydrogen bonding ability, polarity, dispersion stability, weather resistance, compatibility with a polymerization product of the hydrolyzable silicon compound (d1), and the like).

As the component (d5), an acrylate, a methacrylate, an aromatic vinyl compound, and vinyl cyanides can be used, for example, and in addition, monomers containing a functional group, such as an epoxy group-containing vinyl monomer, a carbonyl group-containing vinyl monomer, and an anionic vinyl monomer can be used. The proportion of the component (d5) in the total vinyl monomers in the polymerization stock solution is preferably in a range of 0.001 to 30 mass %, and more preferably 0.05 to 10 mass %. It is preferable that the proportion of the component (d5) is set within these ranges of mass % from the viewpoint of controlling the properties of the polymerization product to be produced (glass transition temperature, molecular weight, hydrogen bonding ability, polarity, dispersion stability, weather resistance, compatibility with a polymerization product of the hydrolyzable silicon compound (d1), and the like).

Also, a chain transfer agent may be added to the polymerization stock solution. Examples of the chain transfer agent that can be used include alkyl mercaptans such as n-octyl mercaptan, n-dodecyl mercaptan, and t-dodecyl mercaptan; aromatic mercaptans such as benzyl mercaptan, and dodecyl benzyl mercaptan; and a thiocarboxylic acid such as thiomalic acid, a salt thereof or alkyl esters thereof, or polythioles, diisopropyl xanthogen disulfide, di(methylenetrimethylolpropane) xanthogen disulfide, thioglycol, and an allyl compound such as a dimer of α-methylstyrene. The amount of the chain transfer agent used is preferably 0.001 to 30 parts by mass, and more preferably 0.05 to 10 parts by mass relative to 100 parts by mass of the total vinyl monomers from the viewpoint of polymerization stability.

Further, a dispersion stabilizer may be mixed in the polymerization stock solution. Examples of the dispersion stabilizer that can be used include water-soluble oligomers selected from the group consisting of polycarboxylic acid and sulfonic acid, and synthetic or naturally occurring water-soluble or water dispersible polymer substances such as polyvinyl alcohol, hydroxyethyl cellulose, starch, maleinized polybutadiene, maleinized alkyd resin, polyacrylic acid (salt), polyacrylamide, and water-soluble or water dispersible acrylic resin. They may be used singly or as a mixture of two or more. The amount of the dispersion stabilizer used in the polymerization stock solution is preferably 10 parts by mass or less, and more preferably 0.001 to 5 parts by mass relative to 100 parts by mass of the polymer particles (D).

Polymerization of the polymerization stock solution is preferably performed in the presence of a polymerization catalyst. Examples of the polymerization catalyst for the component (d1) that can be used include acidic compounds such as hydrogen halides such as hydrochloric acid and hydrofluoric acid, carboxylic acids such as acetic acid, trichloroacetic acid, trifluoroacetic acid, and lactic acid, sulfonic acids such as sulfuric acid and p-toluene sulfonic acid, acidic emulsifiers such as alkylbenzenesulfonic acid, alkylsulfonic acid, alkylsulfosuccinic acid, polyoxyethylene alkyl sulfuric acid, polyoxyethylene alkylaryl sulfuric acid, and polyoxyethylene distyryl phenyl ether sulfonic acid, acidic or weak acidic inorganic salt, phthalic acid, phosphoric acid, and nitric acid; basic compounds such as sodium hydroxide, potassium hydroxide, sodium methylate, sodium acetate, tetramethylammonium chloride, tetramethylammonium hydroxide, tributyl amine, diazabicycloundecene, ethylene diamine, diethylene triamine, ethanol amines, γ-aminopropyltrimethoxysilane, and γ-(2-aminoethyl)-aminopropyltrimethoxysilane; and tin compounds such as dibutyltin octylate and dibutyltin dilaurate. Among them, a polymerization catalyst for the hydrolyzable silicon compound (d1) is preferably an acidic emulsifier having an action of not only a polymerization catalyst but also an emulsifier, particularly, an alkylbenzenesulfonic acid having 5 to 30 carbon atoms (dodecylbenzene sulfonic acid and the like).

As the polymerization catalyst for the component (d2), a radical polymerization catalyst is suitable, which causes radical decomposition by heat or a reducible substance and the like and thus causes addition polymerization of a vinyl monomer. Examples of such a radical polymerization catalyst preferably include a water-soluble or oil soluble persulfate, a peroxide and an azobis compound. More specifically, potassium persulfate, sodium persulfate, ammonium persulfate, hydrogen peroxide, t-butyl hydroperoxide, t-butyl peroxybenzoate, 2,2-azobisisobutyronitrile, 2,2-azobis(2-diaminopropane)hydrochloride, and 2,2-azobis(2,4-dimethylvaleronitrile) can be used, for example.

The amount of the polymerization catalyst used in the polymerization stock solution is preferably 0.001 to 5 parts by mass relative to 100 parts by mass of the total vinyl monomers. In a case where promotion of the polymerization rate and the polymerization at a low temperature such as a temperature equal to or lower than 70° C. are desired, it is advantageous to use a reducing agent such as sodium bisulfite, ferrous chloride, ascorbate, and Rongalite in combination with a radical polymerization catalyst.

In an embodiment, although polymerization of the component (d1) and polymerization of the component (d2) can be separately performed, such polymerizations are preferably performed simultaneously because micro organic/inorganic complexation can be achieved by hydrogen bonding and the like.

As a method for obtaining the component (D) of the coating film according to an embodiment, so-called emulsion polymerization is suitable in which the component (d1) and the component (d2) are polymerized in the presence of a sufficient amount of water for the emulsifier to form a micelle. In the emulsion polymerization method, for example, the component (d1) and the component (d2) and, as necessary, the component (d3) are added dropwise directly or in an emulsion state, at one time, separately, or continuously, to a reactor and polymerized in the presence of a polymerization catalyst, at a pressure of preferably atmospheric pressure to 10 MPa, as necessary at a reaction temperature of approximately 30 to 150° C. Polymerization may be performed, depending on the case, at a pressure equal to or higher than the above-described range or a temperature equal to or lower than the range. The polymerization stock solution is preferably prepared by blending the respective components (d1) to (d4) so that the total mass of the solid contents is in the range of 0.1 to 70 mass %, and preferably 1 to 55 mass % from the viewpoint of polymerization stability.

Further, when the emulsion polymerization is performed, a seed polymerization method is preferably employed from the viewpoint of appropriately increasing or controlling the particle size. The seed polymerization method is a method of placing emulsion particles (seed particles) in an aqueous phase in advance, and then performing polymerization. The pH of the polymerization system when the seed polymerization method is performed is preferably 1.0 to 10.0, and more preferably 1.0 to 6.0. The pH during the polymerization can be controlled by using a pH buffer such as disodium phosphate, borax, sodium bicarbonate, and ammonia.

To obtain the component (D), a method can also be employed in which the component (d1) and the component (d2) are polymerized in the presence of the component (d3) and component (d4) required for polymerizing the component (d1) and, as necessary, in the presence of a solvent, and then water is added thereto until a polymerization product is emulsified.

Further, the component (D) preferably has a core-shell structure having a core layer and one or two or more shell layers covering the core layer from the viewpoint of improving adhesion to a substrate of a coating film formed using the resulting coating composition. As a method for forming the core-shell structure, multistage emulsion polymerization, in which emulsion polymerization is performed in multiple stages, is useful.

An example of the multistage emulsion polymerization includes a first stage of polymerizing at least one or more selected from the group consisting of the component (d1), the component (d2), and the component (d5) in the presence of the component (d3) and the component (d4) thereby forming seed particles; and a second stage of performing polymerization by adding a polymerization stock solution containing the component (d1) and the component (d2), and, as necessary, the component (d5) in the presence of the seed particles (two-stage polymerization method). Further, in a case where multistage emulsion polymerization including three stages or more is performed, a third stage of performing polymerization by adding a polymerization stock solution containing the component (d1) and the component (d2) and, as necessary, the component (d5). Such a method is preferable from the viewpoint of polymerization stability. The mass ratio (d2)/(d1) of the component (d2) to the component (d1) in the core layer is preferably 0.01/1 to 1/1 from the viewpoint of polymerization stability. The mass ratio (d2)/(d1) of the component (d2) to the component (d1) in an outermost layer of the shell layers is preferably 0.1/1 to 5/1, and even more preferably 0.5/1 to 4/1.

In the two-stage polymerization method, the mass ratio of a solid content mass (M1) in the polymerization stock solution used in the first stage to a solid content mass (M2) in the polymerization stock solution to be added in the second stage is preferably (M1)/(M2)=9/1 to 1/9, and more preferably 8/2 to 2/8 from the viewpoint of polymerization stability.

From the viewpoint of polymerization stability, the core-shell structure is preferably such that the particle sizes are increased by the second-stage polymerization without significantly changing the particle size distribution (volume average particle size/number average particle size) of the seed particles. The volume average particle size can be measured in the same manner as in the number average particle size. The core-shell structure can be observed, for example, by a morphological observation by a transmission electron microscope and the like and analysis by viscoelastic measurement.

In the core-shell structure, the glass transition temperature (Tg) of the core layer is preferably 0° C. or lower. When the glass transition temperature (Tg) of the core layer is within this range, as the physical properties of the resulting antifogging coating film, the flexibility at room temperature is excellent, and cracking or the like is unlikely to occur. Note that Tg herein can be measured by a differential scanning calorimeter (DSC).

In an embodiment, the number average particle size of the component (D) of the coating composition (and the coating film formed from the coating composition) is, for example, 10 nm to 800 nm. When a composition is formed by combining the component (D) having a number average particle size of 10 nm to 800 nm with the component (A) having a number average particle size of 1 nm to 400 nm, the weather resistance and antifouling properties of the resulting coating film are improved. The number average particle size of the component (D) is preferably 20 nm to 250 nm from the viewpoints of optical properties and hard coat properties of the resulting coating film. As a method of measuring the number average particle size of the component (D), the same method as that for the component (A) can be employed.

The mass ratio (A)/(D) of the component (A) to the component (D) in the coating composition (and the coating film formed from the coating composition) is preferably 50/100 to 1,000/100, and more preferably 100/100 to 300/100. By blending these components in this range, an antifogging coating film excellent in hydrophilicity, antifogging properties, optical properties, and antifouling properties can be formed. The ratio (SA)/(SB) of the surface area (SA) of all particles of the component (A) to the surface area (SB) of all particles of the component (B) is preferably in a range of 0.001 to 1,000. The surface area herein can be calculated from the particle size of each of the components (A) and (B) and the respective mass number (i.e., particle size distribution).

Component (E): Hydrolyzable Silicon Compound

The coating composition for forming the coating film according to the present invention may contain a hydrolyzable silicon compound as a component (E) in addition to the components (A) and (B). The coating composition may contain a hydrolyzable silicon compound as the component (E) in addition to the components (A), (B) and (C). The coating composition may contain a hydrolyzable silicon compound as the component (E) in addition to the components (A), (B) and (D). The coating composition may contain a hydrolyzable silicon compound as the component (E) in addition to the components (A), (B), (C), and (D).

In an embodiment, the coating composition (and the coating film formed from the coating composition) may further contain the component (E): a hydrolyzable silicon compound represented by Formula (6), Formula (7), or Formula (8) below. In this case, the mass ratio of the component (A) to the component (D) in the coating composition is, for example, A/D=50/100 to 1,000/100, and the mass ratio of the component (A) to the component (E) is, for example, E/A=5/100 to 90/100. Hereinafter, a hydrolyzable silicon-containing compound represented by Formula (6) is referred to as a component (e1), and a hydrolyzable silicon-containing compound represented by Formula (7) is referred to as a component (e2).

$$R^1{}_n SiX_{4-n} \quad (6)$$

(In Formula (6), $R^1$ represents hydrogen, or an alkyl group, an alkenyl group, an alkynyl group or an aryl group having 1 to 10 carbon atoms. A functional group such as a halogen group, a hydroxy group, a mercapto group, an amino group, a (meth)acryloyl group, an epoxy group, or an isocyanate group may be further provided on these substituents. X represents a hydrolyzable group, and n is an integer of 0 to 3. The hydrolyzable group may be a group that produces a hydroxy group via hydrolysis, and examples thereof include a halogen atom, an alkoxy group, an acyloxy group, an amino group, a phenoxy group, and an oxime group.)

$$X_3Si-R^2{}_n-SiX_3 \quad (7)$$

(In Formula (7), X represents a hydrolyzable group, $R^2$ represents an alkylene group or a phenylene group having 1 to 6 carbon atoms, and n is 0 or 1.)

Specific examples of the components (e1) and (e2) that can be used include tetramethoxysilane, tetraethoxysilane, tetra(n-propoxy)silane, tetra(i-propoxy)silane, tetra(n-butoxy)silane, tetra(i-butoxy)silane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, dimethoxysilane, diethoxysilane, methyldimethoxysilane, methyldiethoxysilane, dimethyldimethoxysilane, dimethyldiethoxysilane, bis(trimethoxysilyl)methane, bis(triethoxysilyl)methane, bis(triphenoxysilyl)methane, bis(trimethoxysilyl)ethane, bis(triethoxysilyl)ethane, bis(triphenoxysilyl)ethane, 1,3-bis(trimethoxysilyl)propane, 1,3-bis(triethoxysilyl)propane, 1,3-bis(triphenoxysilyl)propane, 1,4-bis(trimethoxysilyl)benzene, 1,4-bis(triethoxysilyl)benzene, 3-chloropropyltrimethoxysilane, 3-chloropropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-glycidoxypropyltrimethoxysilane, 3-isocyanatepropyltriethoxysilane, 3-glycidoxypropylmethyldimethoxysilane, 3-glycidoxypropylmethyldiethoxysilane, 2-(3,4-epoxycyclohexyl) ethyltrimethoxysilane, 3-trimethoxysilylpropylsuccinicanhydride, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, tetraacetoxysilane, tetrakis(trichloroacetoxy)silane, tetrakis(trifluoroacetoxy)silane, triacetoxysilane, tris(trichloroacetoxy)silane, tris(trifluoroacetoxy)silane, methyltriacetoxysilane, methyltris(trichloroacetoxy)silane, tetrachlorosilane, tetrabromosilane, tetrafluorosilane, trichlorosilane, tribromosilane, trifluorosilane, methyltrichlorosilane, methyltribromosilane, methyltrifluorosilane, tetrakis(methylethylketoxime)silane, tris(methylethylketoxime)silane, methyl tris(methylethylketoxime)silane, phenyl tris(methylethylketoxime)silane, bis(methylethylketoxime)silane, methyl bis(methylethylketoxime)silane, hexamethyldisilazane, hexamethylcyclotrisilazane, bis(dimethylamino) dimethylsilane, bis(diethyl amino)dimethyl silane, bis(dimethylamino)methyl silane, and bis(diethyl amino) methyl silane.

Further, a hydrolyzable silicon-containing compound represented by Formula (8) is referred to as a component (e3). Specific examples of the component (e3) include a partial hydrolytic condensate of tetramethoxysilane (trade name "M silicate 51" available from Tama Chemicals Co., Ltd.; trade name "MSI51" available from Colcoat Co., Ltd.; and trade name "MS51" and "MS56" available from Mitsubishi Chemical Corporation), a partial hydrolytic condensate of tetraethoxysilane (trade name "Silicate 35" and "Silicate 45" available from Tama Chemicals Co., Ltd.; and trade name "ESI40" and "ESI48" available from Colcoat Co., Ltd.), and a co-partial hydrolytic condensate of tetramethoxysilane and tetraethoxysilane (trade name "FR-3" available from Tama Chemicals Co., Ltd., and trade name "EMSi48" available from Colcoat Co., Ltd.).

$$R^3-(O-Si(OR^3)_2)_n-OR^3 \qquad (8)$$

(In Formula (8), $R^3$ represents an alkyl group having 1 to 6 carbon atoms, and n is an integer of 2 to 8.)

The hydrolyzable silicon compound (E) may be used singly or in combinations of two or more. The mass ratio of the component (A) to the component (E) in the coating composition is E/A=5/100 to 90/100, and more preferably E/A=5/100 to 70/100. When E/A is 5/100 or more, the scratch resistance of a coating film to be formed can be made sufficient, and when E/A is 90/100 or less, the strength of the coating film can be properly held, and favorable hard coat performance can be obtained.

Other Optional Components

The coating composition for forming the coating film according to the present invention may contain optional components exemplified below (those except for the component (C), (D), or (E)) in addition to the components (A) and (B). The coating composition may contain optional components exemplified below (those except for the component (D) or (E)) in addition to the components (A), (B), and (C). The coating composition may contain optional components exemplified below (those except for the component (C) or (E)) in addition to the components (A), (B), and (D). The coating composition may contain optional components exemplified below (those except for the component (C) or (D)) in addition to the components (A), (B), and (E). The coating composition may contain optional components exemplified below (those except for the component (E)) in addition to the components (A), (B), (C), and (D). The coating composition may contain optional components exemplified below (those except for the component (D)) in addition to the components (A), (B), (C), and (E). The coating composition may contain optional components exemplified below (those except for the component (C)) in addition to the components (A), (B), (D), and (E). The coating composition may contain optional components exemplified below in addition to the components (A), (B), (C), (D), and (E).

In an embodiment, the coating composition for obtaining a coating film may contain additional components that can be usually added and blended to a coating material and a molding resin depending on the application and the method to be employed and the like. Examples thereof include a solvent, a light stabilizer, a UV absorbent, a thickening agent, a leveling agent, a thixotropy agent, a defoaming agent, a freezing stabilizer, a matting agent, a crosslinking reaction catalyst, a pigment, a curing catalyst, a crosslinking agent, a filler, an antiskinning agent, a dispersant, a wetting agent, an antioxidant, a UV absorbent, a rheology controlling agent, a film-forming auxiliary, a rust preventing agent, a dye, a plasticizer, a lubricant, a reducing agent, an antiseptic agent, an antifungal agent, a deodorant, a yellowing inhibitor, an antistatic agent, and a charge controller. These additional components may be selected and blended in combination depending upon the purpose. Note that, hereinafter, the crosslinking reaction catalyst and the curing catalyst may be collectively referred to as "curing acceleration catalyst".

The solvent is not particularly limited, and an aqueous solvent is preferred from the viewpoint of handling. Examples of the aqueous solvent include water, methanol, ethanol, propanol, isopropanol, butanol, acetone, acetonitrile, tetrahydrofuran, dimethylsulfoxide, and N,N-dimethylformamide.

Examples of the surfactant include anionic surfactants such as an alkylbenzene sulfonic acid, a sodium fatty acid, an alkyl sulfate, an alkyl polyoxyethylene sulfate, and an alkyl phosphate; cationic surfactants such as an alkyl trimethyl ammonium salt, a dialkyl dimethyl ammonium salt, an alkyl benzyl dimethyl ammonium salt, an alkyl pyridinium chloride, and benzalkonium chloride; nonionic surfactants such as a polyoxyethylene-polyoxypropylene condensate, a polyoxyethylene alkyl ether, an alkyl polyglucoside, an alkyl monoglyceryl ether, a sorbitan fatty acid ester, a polyoxyethylene sorbitan fatty acid ester, lauric acid diethanolamide, oleic acid diethanolamide, stearic acid diethanolamide, a glycerin fatty acid ester, a sucrose fatty acid ester, and a polyoxyethylene alkylphenyl ether; and zwitterionic surfactants such as a lauryldialkylaminoacetic acid betaine, a stearyldialkylaminoacetic acid betaine, a dodecylaminomethyldialkylsulfopropyl betaine, a hexadecylaminomethyldialkylsulfopropyl betaine, an octadecylaminomethyl dialkylsulfopropyl betaine, cocamidopropyl betaine, cocamidopropyl hydroxysultaine, an alkyl-N-carboxymethyl-N-hydroxyethyl imidazolinium betaine, sodium lauroyl glutamate, potassium lauroyl glutamate, lauroyl methyl-β-alanine, lauryldimethylamine N-oxide, and oleyldimethylamine N-oxide. By using these surfactants in combination with the hydrophilic compound (B), the hydrophilicity, antifogging properties, and water resistance of the resulting coating film can be further improved. Among these surfactants, particularly, in the case of using a surfactant having a long chain alkyl group having 10 or more carbon atoms and/or a surfactant having a fluorine atom in the molecule, elution into water from inside of a coating film tends to be suppressed, so that it is more preferable from the viewpoint of water resistance.

Examples of the curing acceleration catalyst include, but are not particularly limited to, tin compounds such as dibutyltin dilaurate, dibutyltin diacetate, dioctyltin dilaurate, dimethyltin dineodecanoate and tin bis(2-ethyl hexanoate); zinc compounds such as zinc 2-ethyl hexanoate and zinc naphthenate; titanium compounds such as titanium 2-ethyl hexanoate and titanium diisopropoxy bis(ethylacetonato); cobalt compounds such as cobalt 2-ethyl hexanoate and cobalt naphthenate; bismuth compounds such as bismuth 2-ethyl hexanoate and bismuth naphthenate; zirconium compounds such as zirconium tetraacetylacetonate, zirconyl 2-ethyl hexanoate, and zirconyl naphthenate; aluminum compounds such as aluminum tris(acetylacetonate), aluminum tris(ethylacetoacetate), aluminum monoacetylacetonate bis(ethylacetoacetate), aluminum monoacetylacetonate bisoleylacetoacetate, and alkylacetoacetate aluminum diisopropylates including ethylacetoacetate aluminum diisopropylate; and amine compounds.

As the light stabilizer, for example, a hindered amine light stabilizer is preferably used. Among them, a radical polymerizable light stabilizer having a radical polymerizable double bond in the molecule is preferable. As the UV absorbent, for example, an organic UV absorbent can be used. As the organic UV absorbent, for example, a benzophenone UV absorbent, a benzotriazole UV absorbent, and a triazine UV absorbent can be used. Among them, a radical polymerizable UV absorbent having a radical polymerizable double bond in the molecule is preferably used. Further, a benzotriazole UV absorbent and a triazine UV absorbent, which have a high UV light absorption ability, are preferable. Note that the light stabilizer is preferably used in combination with an organic UV absorbent. Combined use of the light stabilizer and the organic UV absorbent can improve the weather resistance of a coating film formed from the coating composition. A wide variety of additive components such as the organic UV absorbent and the light stabilizer may be simply blended with the components (A) and (D), and may be co-existed in synthesizing the component (D).

These optional components can be usually used in a blended amount of 10 parts by mass or less, 5 parts by mass or less, or 3 parts by mass or less relative to the amounts of the components (A) and (B) and the optional component (C) and/or the component (D) and/or the component (E).

Substrate

The substrate is positioned as an object to which particularly excellent antifogging properties and antifogging persistence are imparted by a coating layer. Various materials such as resin, glass, and metal can be employed for the substrate. In an embodiment, the substrate is preferably formed of a resin. The substrate formed of a resin is not particularly limited, and examples thereof include organic substrates such as a synthetic resin and a natural resin.

As the synthetic resin, thermoplastic resins and curable resins (such as a thermosetting resin, a photocurable resin, and a moisture-curable resin) can be used. More specifically, examples the synthetic resin include a silicone resin, an acrylic resin, a methacrylic resin, a fluororesin, an alkyd resin, an aminoalkyd resin, a vinyl resin, a polyester resin, a styrene-butadiene resin, a polyolefin resin, a polystyrene resin, a polyketone resin, a polyamide resin, a polycarbonate resin, a polyacetal resin, a polyetheretherketone resin, a polyphenylene oxide resin, a polysulfone resin, a polyphenylene sulfone resin, a polyether resin, a polyvinyl chloride resin, a polyvinylidene chloride resin, a urea resin, a phenol resin, a melamine resin, an epoxy resin, a urethane resin, and a silicone-acrylic resin. However, the synthetic resin is not limited to these examples.

The natural resin is not particularly limited, and examples thereof include cellulose resins, isoprene resins such as natural rubber, and protein resins such as casein.

In an embodiment, although the surface of a resin plate may be subjected to a surface treatment such as a corona discharge treatment, a flame treatment, or a plasma treatment, these surface treatments are not indispensable.

The type and thickness of a substrate to be used and the thickness of a film formed by the surface treatment are not particularly limited, and can be set appropriately depending on the application.

Production of Coating Composition

In a typical embodiment, the coating composition for forming the coating film according to the present invention can be produced by a method including a step of mixing the components (A) and (B) in advance and then mixing them with water, and a step of stirring the mixture at a temperature of lower than 40° C. for 10 minutes or more. In general, when a coating composition containing water is produced, for example, a method in which each of components contained in the coating composition is separately diluted with water and then they are mixed, a method in which each of components is mixed in water, and a method in which each of components are mixed in advance and then diluted with water, are exemplified. In the present invention, the components (A) and (B) are preferably mixed in advance. By mixing the components (A) and (B) in advance, the components (A) and (B) can firmly make an interaction. A coating film obtained from the coating composition thus produced is preferable because it has excellent water resistance. By further stirring at a temperature of lower than 40° C. for 10 minutes or more, a coating composition in which the components (A) and (B) are uniformly dispersed can be formed. A coating film obtained from the coating composition thus produced is preferable because it has excellent transparency and appearance.

The coating composition which is further firmly bonded by the reaction of the component (A) with the component (B) capable of forming a covalent bond with the component (A) can be produced by a method including a step of mixing the component (A), the component (B), and water, optionally a solvent, optionally a reaction catalyst, then stirring the mixture at 40° C. or higher for 10 minutes or more, and optionally adding the component (C), and/or the component (D), and/or the component (E), and/or a curing acceleration catalyst to the mixture. Alternatively, the coating composition can be produced by a method including a step of mixing the component (A), the component (C), and/or the component (E), water, optionally a solvent, and optionally a reaction catalyst, then stirring the mixture at 40° C. or higher for 10 minutes or more, then adding the component (B), stirring the mixture at 40° C. or higher for 10 minutes or more, and optionally adding, to the mixture, the component (C), and/or the component (D), and/or the component (E), and/or a curing acceleration catalyst. A coating film obtained from the coating composition thus produced is even more preferable from the viewpoint of durability (for example, the antifogging persistence, persistence of appearance, elution resistance of a coating film, and an effect of suppressing water droplet marks in the case of exposure to a high temperature and high humidity environment).

Production of Coating Film

The coating film according to an embodiment can be, for example, formed by applying a coating composition (may be abbreviated as "aqueous dispersion"), dispersed in a solvent such as water, onto a substrate and drying the coating composition. Drying here can be performed at room temperature (for example, approximately 0° C. to 45° C.) without external heating. The viscosity at 20° C. of the aqueous dispersion may be preferably 0.1 to 100,000 mPa·s, and more preferably 1 to 10,000 mPa·s (measured with a vibration type viscometer). Examples of the coating method that can be employed include a spraying method, a flow coating method, a roll coating method, a brush coating method, a dip coating method, a spin coating method, a screen printing method, a casting method, a gravure printing method, and a flexographic printing method. A composite of a substrate and a coating film may be formed by, for example, drying the coating film on the substrate, and then, as desired, performing a heat treatment at preferably 20° C. to 500° C. and more preferably 40° C. to 250° C., UV light irradiation, or the like.

In an embodiment, a dried coating film is preferably heat treated at a temperature of 50° C. or higher and lower than 150° C. for 10 minutes to 60 minutes from the viewpoints of adhesion to a substrate, water resistance, and scratch resistance. The temperature for this heat treatment is more preferably 60° C. or higher from the viewpoints of the curing rate and adhesion of the coating film. The temperature for this heat treatment is preferably 130° C. or lower, and more preferably 120° C. or lower from the viewpoints of productivity and applicable substrate type.

Desired properties of the surface of the coating film thus formed in the elution test (coating film surface elution test and coating film total elution test) are as described above in relation to the component (B).

A coating film satisfying preferred conditions in these elution tests can be preferably used as antifogging coating films, or coating films for automotive exterior parts (for example, head lamps, particularly LED head lamps).

For automotive exterior parts such as LED head lamps, recently, there has been a demand for an antifogging coating film capable of suppressing a so-called water sagging phenomenon (generation of water droplet marks due to elution of components) in a high temperature and high humidity environment. It is found that a coating film satisfying the preferred conditions in the above-described elution test can provide an antifogging coating film satisfying such a requirement.

The thickness of the coating film is preferably 0.05 to 100 µm, and more preferably 0.1 to 10 µm. The coating film preferably has a substantially even thickness (has substantially a flat surface). The thickness of the coating film is preferably 100 µm or less in terms of transparency, and preferably 0.05 µm or more in order to exhibit functions such as weather resistance and antifouling properties. Note that, in an embodiment, the "coating film" is not necessarily required to be a continuous film, but may take forms such as a discontinuous film and an island-like dispersed film.

EXAMPLES

The present invention is described more specifically with reference to Examples and Comparative Examples. The present invention is not limited by Examples below without deviating from the gist of the invention. The subject matter of the present invention can be defined only by the scope of the appended claims and includes modifications and equivalents which will be apparent to one skilled in the art, in addition to the literal scope.

Respective physical properties were evaluated by the following methods.

<Number Average Particle Size>

A sample was diluted by appropriately adding a solvent so that the solid content in the sample is 1 to 20 mass %, and the number average particle size was measured with a wet particle size analyzer (Microtrack UPA-9230, available from Nikkiso Co., Ltd., Japan).

<Water Contact Angle>

A drop of deionized water was placed on the coating film and allowed to stand at 23° C. for 10 seconds, and thereafter, the water contact angle was measured using a contact-angle measuring device (CA-X150 contact angle meter, available from Kyowa Interface Science, Inc, Japan).

<HAZE>

The HAZE value of a sample was measured using a haze meter (NDH2000, available from Nippon Denshoku Industries Co., Ltd.) in accordance with JIS K7105.

<Film Thickness>

The film thickness was measured using a reflection spectroscopic film thickness meter (trade name "FE-3000", available from Otsuka Electronics Co., Ltd.).

The average of measurement values measured at randomly selected three points was determined as the film thickness.

<Introduction Ratio of Silane Coupling Agent to Hydroxy Group of Hydrophilic Compound (B)>

1H-NMR was measured using a 500 MHz-NMR spectrometer (JEOL-ECZ500+Super Cool available from JEOL Ltd.) and a heavy dimethylsulfoxide solvent.

In the measurement, the peak of the proton boned to a carbon atom adjacent to the hydroxy group of the hydrophilic compound (B) was used as a reference, and the rate of decrease in the peak after the reaction with the silane coupling agent is defined as the introduction ratio of the silane coupling agent to the hydroxy groups of the hydrophilic compound (B).

<Appearance of Coating Film>

The appearance of the resulting coating film was visually observed as follows. The results were evaluated as follows.

○ (good): transparent.

Δ (roughly good): partly clouded.

X (poor): entirely clouded.

<Adhesion Test (Cross-Cut Test)>

For the resulting coating film, the adhesion was evaluated as follows in a cross-cut test of 1 mm square and 100 grids by a method in accordance with JIS-K 5600-5-6.

○ (good): no peeling.

Δ (medium): proportion of the number of peeled grids is less than 50%.

X (poor): proportion of the number of peeled grids is 50% or more.

<Antifogging Properties Test>

A test piece of the resulting coating film was placed at a height of 5 cm from the water surface of a hot water bath kept at 80° C. in a manner that the surface of the coating film is faced downward, steam from the hot water bath was continuously applied to the coating film. The presence or absence of fogging after 30 seconds from the application of steam was visually evaluated as follows. Note that, when the evaluation is Δ or more, there is no problem in practical use, and it is more preferable when the evaluation is ○.

○ (good): no fogging occurs at all.
Δ (medium): slight fogging occurs immediately after application of steam.
X (poor): fogging occurs.

<Scratch Resistance>

When the surface of the coating film was rubbed one time back and forth with a Kimwipe, the state of the coating film was observed with a digital microscope and evaluated as follows.

○ (good): no scratches or peeling.
Δ (medium): no peeling, but there are scratches.
X (poor): the coating film is peeled off.

<Moisture Resistance Test 1>

The produced coating film was exposed to an environment of 85° C., 85% RH for 24 hours and then allowed to stand in an environment of 23° C., 50% RH for 1 hour. The adhesion, water contact angle, and antifogging properties for the resulting antifogging coating film were evaluated. These evaluations indicate persistence of adhesion, water contact angle, and antifogging properties of a coating film in a high temperature and high humidity environment.

<Moisture Resistance Test 2>

The produced coating film was exposed to an environment of 50° C., 95% RH for 240 hours and then allowed to stand in an environment of 23° C., 50% RH for 1 hour. The adhesion, water contact angle, and antifogging properties for the resulting antifogging coating film were evaluated. These evaluations indicate persistence of adhesion, water contact angle, and antifogging properties of a coating film in a high temperature and high humidity environment.

<Persistence of Appearance (Change in HAZE Value)>

Evaluation of the persistence of appearance was performed based on ΔHAZE serving as an indicator for the persistence of appearance of the coating film in a high temperature and high humidity environment, that is, based on a change in the HAZE value before and after each of the moisture resistance test 1 and moisture resistance test 2. Note that, when the evaluation is Δ or more, there is no problem in practical use, and it is more preferable when the evaluation is ○.

○ (good): ΔHAZE is less than 0.5.
Δ (medium): ΔHAZE is 0.5 or more and less than 1.0.
X (poor): ΔHAZE is 1.0 or more.

<Elution Resistance 1 (Coating Film Surface Elution Test)>

On the coating film, 10 μL of deionized water was placed, and the coating film was left to stand in an environment of 23° C., 50% RH for 24 hours. The height of an eluate formed on the surface of a coating film was measured using a laser microscope (available from Keyence Corporation, VK9710, magnification: 50 times). Measurement was performed at randomly selected 20 locations of the eluate within a range of 10 cm$^2$, and the maximum height was determined as a measurement value.

Note that variation of the results in each test was very small because the heights at 20 locations which are many sites of the eluate were measured in this test; however, in consideration of improvement in accuracy, the average of measurement values obtained by performing the tests three times was taken as the test result.

<Elution Resistance 2 (Coating Film Total Elution Test)>

A coating film produced on a substrate was immersed in either deionized water at 23° C. or deionized water 80° C. for 24 hours in a state of containing the substrate. The coating film was taken out from the deionized water, and the deionized water was removed under reduced pressure to recover a coating film eluate. The weight of the recovered coating film eluate was measured using an electronic balance. Removal of the deionized water under reduced pressure was performed until the recovering weight reached a steady state.

<Water Droplet Mark Test 1>

The surface of a coating film formed on a substrate was exposed to steam at a distance of 5 cm from the water surface of 80° C. hot water in an environment of 23° C., 50% RH in a range of 50 cm$^2$ for 90 seconds. Then, the coating film was allowed to vertically stand and dried at room temperature. The appearance of the coating film was visually observed to evaluate the water droplet mark.

<Water Droplet Mark Test 2>

The surface of a coating film formed on a substrate was exposed to steam at a distance of 5 cm from the water surface of 80° C. hot water in an environment of 23° C., 50% RH in a range of 50 cm$^2$ for 10 seconds. Then, the coating film was allowed to vertically stand and dried at room temperature. The above-described operation was repeated 10 times, and then the appearance of the coating film was visually observed to evaluate the water droplet mark.

In the water droplet mark test 1 and 2, the following criteria was used for evaluation. When the evaluation is Δ or more, there is no problem in practical use, it is more preferable when the evaluation is ○, and it is even more preferable when the evaluation is ⊚.

⊚ (very good): no appearance change occurs at all.
○ (good): slight interference color change is observed.
Δ (medium): water droplet marks (white sagging marks) are slightly observed.
X (poor): many water droplet marks (white sagging marks) are observed.

<Heat Resistance Test>

The produced coating film was exposed to an environment of 120° C. for 240 hours and then allowed to stand in an environment of 23° C., 50% RH for 1 hour. The adhesion, water contact angle, and antifogging properties for the resulting antifogging coating film were evaluated. These evaluations indicate persistence of adhesion, water contact angle, and antifogging properties of a coating film in a high temperature environment.

<Water Resistance Test>

The produced coating film was immersed in 40° C. hot water for 24 hours and then allowed to stand in an environment of 23° C., 50% RH for 24 hours. The adhesion, water contact angle, and antifogging properties for the resulting antifogging coating film were evaluated. These evaluations indicate persistence of adhesion, water contact angle, and antifogging properties of a coating film in a high humidity environment.

Synthesis Example 1 (Synthesis of Hydrophilic Compound (B)-1)

To a reactor equipped with a reflux condenser, a dropping vessel, a nitrogen introducing tube, a thermometer, and a stirrer, 360 g of isopropanol, 75.0 g of 2-(N-3-sulfopropyl-N,N-dimethylammonium)ethylmethacrylate, 20.0 g of butyl acrylate, and 5.0 g of 2-hydroxyethyl methacrylate were each charged and then heated to 80° C. under a nitrogen gas flow. A solution prepared by dissolving 1.5 g of 2,2-azobis (2,4-dimethyl-4-methoxy)valeronitrile (V-70 available from Wako Pure Chemical Industries, Ltd.) as an initiator in 40 g of isopropanol was added dropwise over approximately 2 hours while the temperature inside the reactor was kept at 80° C. Further, the reaction solution was continuously stirred for approximately 2 hours under the condition where the temperature inside the reactor was 80° C. and then cooled to room temperature, and isopropanol was removed under reduced pressure to obtain a hydrophilic compound (B)-1. The HLB of the hydrophilic compound (B)-1 (calculated by a Griffin method) was 15. The molecular weight of the hydrophilic compound (B)-1 was 8,200 g/mol, and the density thereof was 1.0 g/cm$^3$. The molecular weight herein is an average molecular weight based on weight (mass) in terms of polystyrene measured by GPC (in accordance with JIS K7252-1).

Synthesis Example 2 (Synthesis of Hydrophilic Compound (B)-2)

To a reactor equipped with a reflux condenser, a dropping vessel, a nitrogen introducing tube, a thermometer, and a stirrer, 100 g of polyethylene glycol monomethyl ether 4,000 (available from Tokyo Chemical Industry Co., Ltd., solid content: 100 mass %), and 6.2 g of KBE-9007 (available from Shin-Etsu Chemical Co., Ltd.) were each charged and then heated to 80° C. under a nitrogen gas flow. Thereafter, 0.11 g of dibutyltin dilaurate (available from Tokyo Chemical Industry Co., Ltd.) was added to the reaction solution, and the reaction solution was continuously stirred for approximately 6 hours under the condition where the temperature inside the reactor was 80° C. and then cooled to room temperature to obtain a hydrophilic compound (B)-2. The HLB of the hydrophilic compound (B)-2 was 18. The molecular weight of the hydrophilic compound (B)-2 was 4,400 g/mol, and the density thereof was 1.14 g/cm$^3$. The molecular weight herein is an average molecular weight based on weight (mass) in terms of polystyrene measured by GPC (in accordance with JIS K7252-1).

Synthesis Example 3 (Synthesis of Aqueous Dispersion of Polymer Particles (D))

To a reactor equipped with a reflux condenser, a dropping vessel, a thermometer, and a stirrer, 1,600 g of ion exchanged water and 4 g of dodecylbenzene sulfonic acid were charged and then heated to 80° C. with stirring. A mixed solution of 185 g of dimethyldimethoxysilane and 117 g of phenyltrimethoxysilane was added dropwise thereto over approximately 2 hours under the condition where the temperature inside the reactor was kept at 80° C., and then the reaction solution was continuously stirred for approximately 1 hour under the condition where the temperature inside the reactor was 80° C. Subsequently, a mixed solution of 86 g of butyl acrylate, 133 g of phenyltrimethoxysilane, and 1.3 g of 3-methacryloxypropyltrimethoxysilane, and a mixed solution of 137 g of N,N-diethylacrylamide, 3 g of acrylic acid, 13 g of a reactive emulsifier (trade name "ADEKA REASOAP SR-1025", available from Adeka Corporation, an aqueous solution containing 25% solid content), 40 g of a 2 mass % ammonium persulfate aqueous solution, and 1,900 g of ion exchanged water were simultaneously added dropwise over approximately 2 hours under the condition where the temperature inside the reactor was kept at 80° C. Further, the reaction solution was continuously stirred for approximately 2 hours under the condition where the temperature inside the reactor was 80° C., then cooled to room temperature, filtered with a 100 mesh metallic gauze, and then regulated with ion exchanged water so that the solid content was 10.0 mass %. Thus, an aqueous dispersion of the polymer particles (D) having a number average particle size of 85 nm was obtained.

Synthesis Example 4 (Synthesis of Hydrophilic Compound (B)-3)

To a reactor equipped with a reflux condenser, a dropping vessel, a nitrogen introducing tube, a thermometer, and a stirrer, 100 g of polyethylene glycol monomethyl ether 400 (available from Tokyo Chemical Industry Co., Ltd., solid content: 100 mass %) and 61.9 g of KBE-9007 (available from Shin-Etsu Chemical Co., Ltd.) were each charged and then heated to 80° C. under a nitrogen gas flow. The reaction solution was continuously stirred for approximately 8 hours under the condition where the temperature inside the reactor was 80° C. and then cooled to room temperature to obtain a hydrophilic compound (B)-3. The HLB of the hydrophilic compound (B)-3 was 18. The molecular weight of the hydrophilic compound (B)-3 was 600 g/mol, and the density thereof was 1.10 g/cm$^3$. The definition of the molecular weight herein is synonymous with those described in Synthesis Examples 1 and 2.

Synthesis Example 5 (Synthesis of Hydrophilic Compound (B)-4)

To a reactor equipped with a reflux condenser, a dropping vessel, a nitrogen introducing tube, a thermometer, and a stirrer, 100 g of polyethylene glycol 4,000 (available from Tokyo Chemical Industry Co., Ltd., solid content: 100 mass %) and 12.4 g of KBE-9007 (available from Shin-Etsu Chemical Co., Ltd.) were each charged and then heated to 80° C. under a nitrogen gas flow. Thereafter, 0.11 g of dibutyltin dilaurate (available from Tokyo Chemical Industry Co., Ltd.) was added to the reaction solution, and the reaction solution was continuously stirred for approximately 6 hours under the condition where the temperature inside the reactor was 80° C., and then cooled to room temperature to obtain a hydrophilic compound (B)-4. The HLB of the hydrophilic compound (B)-4 was 18. The molecular weight of the hydrophilic compound (B)-4 was 4,500 g/mol, and the density thereof was 1.13 g/cm$^3$. The definition of the molecular weight herein is synonymous with those described in Synthesis Examples 1 and 2.

Synthesis Example 6 (Synthesis of Hydrophilic Compound (B)-5)

To a reactor equipped with a reflux condenser, a dropping vessel, a nitrogen introducing tube, a thermometer, and a stirrer, 100 g of polyethylene glycol 400 (available from Tokyo Chemical Industry Co., Ltd., solid content: 100 mass %) and 123.7 g of KBE-9007 (available from Shin-Etsu Chemical Co., Ltd.) were each charged and then heated to 80° C. under a nitrogen gas flow. Thereafter, 0.22 g of dibutyltin dilaurate (available from Tokyo Chemical Industry Co., Ltd.) was added to the reaction solution, and the reaction solution was continuously stirred for approximately 6 hours under the condition where the temperature inside the reactor was 80° C., and then cooled to room temperature to obtain a hydrophilic compound (B)-5. The HLB of the hydrophilic compound (B)-5 was 17. The molecular weight of the hydrophilic compound (B)-5 was 900 g/mol, and the density thereof was 1.09 g/cm$^3$. The definition of the molecular weight herein is synonymous with those described in Synthesis Examples 1 and 2.

Synthesis Example 7 (Synthesis of Hydrophilic Compound (B)-6)

To a reactor equipped with a reflux condenser, a dropping vessel, a nitrogen introducing tube, a thermometer, and a stirrer, 100 g of polysorbate (polyoxyethylene sorbitan monolaurate, trade name "Tween-20", available from Tokyo Chemical Industry Co., Ltd., solid content: 100 mass %) and 60.5 g of KBE-9007 (available from Shin-Etsu Chemical Co., Ltd.) were each charged and then heated to 80° C. under a nitrogen gas flow. The reaction solution was continuously stirred for approximately 6 hours under the condition where the temperature inside the reactor was 80° C. and then cooled to room temperature to obtain a hydrophilic compound (B)-6. The introduction ratio of the silane coupling agent to the hydroxy group was 90%. The HLB of the hydrophilic compound (B)-6 was 15. The molecular weight of the hydrophilic compound (B)-6 was 2,000 g/mol, and the density thereof was 1.05 g/cm$^3$. The definition of the molecular weight herein is synonymous with those described in Synthesis Examples 1 and 2.

Synthesis Example 8 (Synthesis of Curing Agent (C): MEKO-KBE-9007)

To a reactor equipped with a reflux condenser, a dropping vessel, a nitrogen introducing tube, a thermometer, and a stirrer, 100 g of KBE-9007 (available from Shin-Etsu Chemical Co., Ltd.) and 35.2 g of methyl ethyl ketoxime (available from Tokyo Chemical Industry Co., Ltd.) were each charged, and then the reaction solution was continuously stirred at room temperature for approximately 6 hours under a nitrogen gas flow to obtain MEKO-KBE-9007 as a curing agent (C).

Synthesis Example 9 (Synthesis of Hydrophilic Compound (B)-7)

To a reactor equipped with a reflux condenser, a dropping vessel, a nitrogen introducing tube, a thermometer, and a stirrer, 100 g of polysorbate (polyoxyethylene sorbitan monolaurate, trade name "Tween-20", available from Tokyo Chemical Industry Co., Ltd., solid content: 100 mass %) was charged, then heated to 80° C. under a nitrogen gas flow, and stirred for 4 hours. Thereafter, 40.5 g of KBE-9007 (available from Shin-Etsu Chemical Co., Ltd.) was charged to the reactor, and the reaction solution was continuously stirred for approximately 6 hours under a nitrogen gas flow in the condition where the temperature inside the reactor was 80° C. and then cooled to room temperature to obtain a hydrophilic compound (B)-7. The introduction ratio of the silane coupling agent to the hydroxy group was 65%. The molecular weight of the hydrophilic compound (B)-7 was 1,700 g/mol. The definition of the molecular weight herein is synonymous with that described in Synthesis Example 1.

Synthesis Example 10 (Synthesis of Hydrophilic Compound (B)-8)

To a reactor equipped with a reflux condenser, a dropping vessel, a nitrogen introducing tube, a thermometer, and a stirrer, 100 g of glycerol ethoxylate (available from Sigma-Aldrich Co. LLC, solid content: 100 mass %) and 40.5 g of KBE-9007 (available from Shin-Etsu Chemical Co., Ltd.) were each charged and then heated to 80° C. under a nitrogen gas flow. Thereafter, the reaction solution was continuously stirred for approximately 6 hours under a nitrogen gas flow in the condition where the temperature inside the reactor was 80° C. and then cooled to room temperature to obtain a hydrophilic compound (B)-8. The introduction ratio of the silane coupling agent to the hydroxy group was 68%. The molecular weight of the hydrophilic compound (B)-8 was 1,500 g/mol. The definition of the molecular weight herein is synonymous with that described in Synthesis Example 1.

Synthesis Example 11 (Synthesis of Hydrophilic Compound (B)-9)

To a reactor equipped with a reflux condenser, a dropping vessel, a nitrogen introducing tube, a thermometer, and a stirrer, 100 g of glycerol ethoxylate (available from Sigma-Aldrich Co. LLC, solid content: 100 mass %) and 23.5 g of KBE-9007 (available from Shin-Etsu Chemical Co., Ltd.) were each charged and then heated to 80° C. under a nitrogen gas flow. Thereafter, the reaction solution was continuously stirred for approximately 6 hours under a nitrogen gas flow in the condition where the temperature inside the reactor was 80° C. and then cooled to room temperature to obtain a hydrophilic compound (B)-9. The introduction ratio of the silane coupling agent to the hydroxy group was 30%. The molecular weight of the hydrophilic compound (B)-9 was 1,200 g/mol. The definition of the molecular weight herein is synonymous with that described in Synthesis Example 1.

Synthesis Example 12 (Synthesis of Hydrophilic Compound (B)-10)

To a reactor equipped with a reflux condenser, a dropping vessel, a nitrogen introducing tube, a thermometer, and a stirrer, 100 g of glycerol ethoxylate (available from Sigma-Aldrich Co. LLC, solid content: 100 mass %) and 74.5 g of KBE-9007 (available from Shin-Etsu Chemical Co., Ltd.) were each charged and then heated to 80° C. under a nitrogen gas flow. Thereafter, the reaction solution was continuously stirred for approximately 6 hours under a nitrogen gas flow in the condition where the temperature inside the reactor was 80° C. and then cooled to room temperature to obtain a hydrophilic compound (B)-10. The introduction ratio of the silane coupling agent to the hydroxy group was 98%. The molecular weight of the hydrophilic compound (B)-10 was 1,700 g/mol. The definition of the molecular weight herein is synonymous with that described in Synthesis Example 1.

Synthesis Example 13 (Synthesis of Hydrophilic Compound (B)-11)

To a reactor equipped with a reflux condenser, a dropping vessel, a nitrogen introducing tube, a thermometer, and a stirrer, 1.0 g of 4arm-PEG (4arm-PEG10K, available from Sigma-Aldrich Co. LLC, solid content: 100 mass %), 0.1 g of KBE-9007 (available from Shin-Etsu Chemical Co., Ltd.), and 10 g of dehydrated dimethylsulfoxide (available from Wako Pure Chemical Industries, Ltd.) were each charged and then heated to 80° C. under a nitrogen gas flow. Thereafter, 0.001 g of dibutyltin dilaurate (available from Tokyo Chemical Industry Co., Ltd.) was added to the reaction solution, and the reaction solution was continuously stirred for approximately 6 hours under a nitrogen gas flow in the condition where the temperature inside the reactor was 80° C. Then, the reaction solution was cooled to room temperature, and the solvent was removed under reduced pressure to obtain a hydrophilic compound (B)-11. The introduction ratio of the silane coupling agent to the hydroxy group was 68%. The molecular weight of the hydrophilic compound (B)-11 was 10,500 g/mol. The definition of the molecular weight herein is synonymous with that described in Synthesis Example 1.

Synthesis Example 14 (Synthesis of Hydrophilic Compound (B)-12)

To a reactor equipped with a reflux condenser, a dropping vessel, a nitrogen introducing tube, a thermometer, and a stirrer, 5.0 g of 8arm-PEG (available from Sigma-Aldrich Co. LLC, Hyperbranched G2-PEG10K-OH, solid content: 100 mass %), 0.7 g of KBE-9007 (available from Shin-Etsu Chemical Co., Ltd.), and 50 g of dehydrated dimethylsulfoxide (available from Wako Pure Chemical Industries, Ltd.) were each charged and then heated to 80° C. under a nitrogen gas flow. Thereafter, 0.006 g of dibutyltin dilaurate (available from Tokyo Chemical Industry Co., Ltd.) was added to the reaction solution, and the reaction solution was continuously stirred for approximately 6 hours under a nitrogen gas flow in the condition where the temperature inside the reactor was 80° C. Then, the reaction solution was cooled to room temperature, and the solvent was removed under reduced pressure to obtain a hydrophilic compound (B)-12. The introduction ratio of the silane coupling agent to the hydroxy group was 65%. The molecular weight of the hydrophilic compound (B)-12 was 11,000 g/mol. The definition of the molecular weight herein is synonymous with that described in Synthesis Example 1.

Synthesis Example 15 (Synthesis of Hydrophilic Compound (B)-13)

To a reactor equipped with a reflux condenser, a dropping vessel, a nitrogen introducing tube, a thermometer, and a stirrer, 100 g of trimethylolpropane ethoxylate (available from Sigma-Aldrich Co. LLC, solid content: 100 mass %) and 40.5 g of KBE-9007 (available from Shin-Etsu Chemical Co., Ltd.) were each charged and then heated to 80° C. under a nitrogen gas flow. Thereafter, the reaction solution was continuously stirred for approximately 6 hours under a nitrogen gas flow in the condition where the temperature inside the reactor was 80° C. and then cooled to room temperature to obtain a hydrophilic compound (B)-13. The introduction ratio of the silane coupling agent to the hydroxy group was 67%. The molecular weight of the hydrophilic compound (B)-13 was 1,500 g/mol. The definition of the molecular weight herein is synonymous with that described in Synthesis Example 1.

Synthesis Example 16 (Synthesis of Hydrophilic Compound (B)-14)

To a reactor equipped with a reflux condenser, a dropping vessel, a nitrogen introducing tube, a thermometer, and a stirrer, 100 g of polyethylene glycol 2,000 (available from Tokyo Chemical Industry Co., Ltd., solid content: 100 mass %) and 14.8 g of KBE-9007 (available from Shin-Etsu Chemical Co., Ltd.) were each charged and then heated to 80° C. under a nitrogen gas flow. Thereafter, 0.11 g of dibutyltin dilaurate (available from Tokyo Chemical Industry Co., Ltd.) was added to the reaction solution, and the reaction solution was continuously stirred for approximately 6 hours under the condition where the temperature inside the reactor was 80° C. and then cooled to room temperature to obtain a hydrophilic compound (B)-14. The introduction ratio of the silane coupling agent to the hydroxy group was 55%. The molecular weight of the hydrophilic compound (B)-14 was 2,300 g/mol. The definition of the molecular weight herein is synonymous with that described in Synthesis Example 1.

Synthesis Example 17 (Synthesis of Metal Oxide (A)-1)

To a reactor equipped with a reflux condenser, a dropping vessel, a thermometer, and a stirrer, 10 g of ion exchanged water, 90 g of ethanol, 20 g of tetraethoxysilane, and 0.9 g of 28% ammonia aqueous solution were charged and then heated to 40° C. The reaction solution was continuously stirred for approximately 70 hours under the condition where the temperature inside the reactor was 40° C. and then cooled to room temperature to obtain a metal oxide (A)-1.

Synthesis Example 18 (Synthesis of Aqueous Dispersion of Metal Oxide (A)-2)

To a reactor equipped with a reflux condenser, a dropping vessel, a thermometer, and a stirrer, 700 g of ion exchanged water and 1.9 g of dodecylbenzene sulfonic acid were charged and then heated to 80° C. with stirring. A mixed solution of 46 g of propyltrimethoxysilane and 54 g of methyltrimethoxysilane was added dropwise thereto over approximately 2 hours in the condition where the temperature inside the reactor was kept at 80° C., and then the reaction solution was continuously stirred for approximately 3 hours under the condition where the temperature inside the reactor was 80° C. Thereafter, the reaction solution was cooled to room temperature, filtered with a 100 mesh metallic gauze, and then regulated with ion exchanged water so that the solid content was 5.0 mass %. Thus, an aqueous dispersion of the metal oxide (A)-2 having a number average particle size of 25 nm was obtained.

Synthesis Example 19 (Synthesis of Aqueous Dispersion of Hydrophilic Compound-Containing Metal Oxide (AB)-1)

To a reactor equipped with a reflux condenser, a dropping vessel, a thermometer, and a stirrer, 900 g of ion exchanged water and 2.5 g of dodecylbenzene sulfonic acid were charged and then heated to 80° C. with stirring. A mixed solution of 25 g of propyltrimethoxysilane, 30 g of methyltrimethoxysilane, 20 g of the hydrophilic compound ((B)-2), and 30 g of the hydrophilic compound ((B)-10) was added dropwise thereto over approximately 2 hours in the condition where the temperature inside the reactor was kept at 80° C., and then the reaction solution was continuously stirred for approximately 3 hours under the condition where the temperature inside the reactor was 80° C. Thereafter, the reaction solution was cooled to room temperature, filtered with a 100 mesh metallic gauze, and then regulated with ion exchanged water so that the solid content was 5.0 mass %. Thus, an aqueous dispersion of a hydrophilic compound-containing metal oxide (AB)-1 having a number average particle size of 90 nm was obtained.

Synthesis Example 20 (Synthesis of Aqueous Dispersion of Metal Oxide (A)-3)

To a reactor equipped with a reflux condenser, a dropping vessel, a thermometer, and a stirrer, 964 g of ion exchanged water and 1.9 g of dodecylbenzene sulfonic acid were charged and heated to 80° C. with stirring. A mixed solution of 46 g of propyltrimethoxysilane and 54 g of methyltrimethoxysilane was added thereto dropwise over approximately 2 hours under the condition where the temperature inside the reactor was kept at 80° C., and then the reaction solution was continuously stirred for approximately 1 hour under the condition where the temperature inside the reactor was 80° C. Subsequently, a mixed solution of 5.5 g of butyl acrylate, 2.8 g of phenyltrimethoxysilane, 0.5 g of 3-methacryloxypropyltrimethoxysilane, and 16.8 g of tetraethoxysilane, and a mixed solution of 11.5 g of N,N-diethylacrylamide, 0.9 g of acrylic acid, and 40 g of 2 mass % aqueous solution of ammonium persulfate were simultaneously added dropwise to the reaction solution over approximately 2 hours under the condition where the temperature inside the reactor was kept at 80° C. Further, the resulting reaction solution was continuously stirred for approximately 2 hours under the condition where the temperature inside the reactor was 80° C., then cooled to room temperature, filtered with a 100 mesh metallic gauze, and then regulated with ion exchanged water so that the solid content was 6.0 mass %. Thus, an aqueous dispersion of a metal oxide (A)-3 having a number average particle size of 40 nm was obtained.

Synthesis Example 21 (Synthesis of Polyisocyanate (C)-1)

The interior of a four-necked flask equipped with a stirrer, a thermometer, and a cooling tube was purged with nitrogen and charged with 1,000 parts by mass of HDI. Tetramethylammonium capriate as a catalyst was added to the HDI with stirring at 60° C., and at the time in which the conversion ratio reached 20%, 0.2 g of phosphoric acid was added to the reaction solution thereby terminating the reaction. Thereafter, the reaction solution was filtered, and then unreacted HDI was removed by a thin film distillation device. The viscosity (25° C.) of the resulting polyisocyanate was 2,700 mPa·s, and the concentration of the isocyanate group was 21.7 wt %.

Synthesis Example 22 (Synthesis of Polyisocyanate (C)-2)

A four-necked flask equipped with a stirrer, a thermometer, and a cooling tube was charged with 100 parts by mass of the polyisocyanate ((C)-1) obtained in Synthesis Example 21, 18.2 parts by mass of polyethylene oxide (trade name "MPG-081" available from Nippon Nyukazai Co., Ltd.), and 0.01 part by mass of a urethane-forming catalyst (trade name "Neostan U-810" available from Nitto Kasei Kogyo K.K.), and the mixture was kept at 80° C. for 2 hours under nitrogen atmosphere. Thereafter, 43.8 parts by mass of 3,5-dimethylpyrazole was added to the reaction solution, and absence of absorption specific to an isocyanate group was confirmed in an infrared spectrum (product name FT/IR-4000, available from JASCO Corporation). To this, 68.9 parts by mass of dipropylene glycol monomethyl ether was added and, the reaction solution was mixed and stirred for 30 minutes to obtain a water-dispersible blocked polyisocyanate (C)-2.

Example 1

40.0 g of water-dispersed colloidal silica (trade name "Snowtex-OXS", available from Nissan Chemical Industries, Ltd., solid content: 10 mass %) having a number average particle size of 4 nm as the metal oxide (A) and 0.2 g of polysorbate (polyoxyethylene sorbitan monolaurate, trade name "Tween-20", available from Tokyo Chemical Industry Co., Ltd., solid content: 100 mass %, density: 1.11 g/cm$^3$, average particle size: 1.5 nm) as the hydrophilic compound (B) were mixed, and then the mixture was stirred at 25° C. for 1 hour. Subsequently, 1.8 g of distilled water was mixed therein and the mixture was further stirred at 25° C. for 1 hour to obtain a coating composition having a solid content of 10%. A polycarbonate plate (available from Takiron Co., Ltd.) with a 60 mm length, 60 mm width, and 2 mm thick was entirely coated with the resulting coating composition under a condition of 800 rpm×5 sec by a spin coater and dried at 20° C. for 30 minutes. Thereafter, the coating composition was dried at 120° C. for 30 minutes to obtain a test plate. The film thickness of the resulting coating film was 400 nm. The appearance of the coating film was favorable (transparent). In addition, the water contact angle was 2°, and high hydrophilicity was exhibited. The height of an eluate on the surface of the resulting coating film was 0.1 µm or less. The resulting test piece was immersed in ion exchanged water at 23° C. for 24 hours, and then the test piece was taken out from the ion exchanged water (deionized water). The amount of the coating film eluate obtained by removing the ion exchanged water under reduced pressure (per coating film unit volume) was 3 mg/cm$^3$. For the moisture resistance test 1, the obtained test piece was placed in an environmental tester set at 85° C., 85% RH for 24 hours and then allowed to stand in an environment at 23° C., 50% RH for 1 hour. Then, the HAZE, adhesion, water contact angle, and antifogging properties were evaluated. As a result, ΔHAZE was 0.1 or less which was favorable, and adhesion, hydrophilicity (water contact angle), and antifogging properties were maintained, and moisture resistance was basically favorable. For the moisture resistance test 2, the obtained test piece was placed in an environmental tester set at 50° C., 95% RH for 240 hours and then allowed to stand in an environment at 23° C., 50% RH for 1 hour. Then, the HAZE, adhesion, water contact angle, and antifogging properties were evaluated. As a result, results comparable to those of the moisture resistance test 1 were obtained. In other words, ΔHAZE was less than 0.5 which was favorable, and adhesion, hydrophilicity (water contact angle), and antifogging properties were maintained, and moisture resistance was basically favorable. Table 1-1 shows the blended amount (part by mass) of each raw material. Table 2-1 shows respective evaluation results including initial properties.

Examples 2 to 24 and Comparative Examples 1 to 17

In Examples 2 to 24 and Comparative Examples 1 to 17, coating films were produced by the method according to Example 1 except that the types and blended amounts (part by mass) of raw materials were changed as shown in Tables 1-1 to 1-3, Table 1-9, and Table 1-10. Thus, a coating film test piece was produced, and the coating film performance was evaluated. Tables 2-1 to 2-3, Table 2-9, and Table 2-10 each show evaluation results of the coating film performance including initial properties.

Example 25

90.7 g of water-dispersed colloidal silica (trade name "Snowtex-OXS", available from Nissan Chemical Industries, Ltd., solid content: 10 mass %) having a number average particle size of 4 nm as the metal oxide (A), 1.0 g of the hydrophilic compound (B)-8 synthesized in Synthesis Example 10 (solid content: 90%) as the hydrophilic compound (B), 2.9 g of distilled water, 4.9 g of ethanol, and 0.5 g of dodecylbenzene sulfonic acid (solid content: 10%) were mixed, and then the mixture was stirred at 80° C. for 5 hours. Thereafter, the mixture was cooled to room temperature, and to this, 1.3 g of the polyisocyanate (C)-2 obtained in Synthesis Example 22, 0.03 g of an aluminum chelate compound (trade name "DX9740", available from Shin-Etsu Chemical Co., Ltd., solid content: 100%), and 5.0 g of dimethylsulfoxide were mixed. The mixture was further stirred at 25° C. for 30 minutes and regulated with distilled water so that the solid content was 10%, and thus a coating composition was obtained. A polycarbonate plate (available from Takiron Co., Ltd.) with a 60 mm length, 60 mm width, and 2 mm thick was entirely coated with the resulting coating composition under a condition of 800 rpm×5 sec by a spin coater and dried at 120° C. for 10 minutes, and thus a test plate was obtained. The coating film performance was evaluated by the method according to Example 1.

Examples 26 to 68

In Examples 26 to 68, coating films were produced by the method according to Example 25 except that the types and blended amounts (part by mass) of raw materials were changed as shown in Tables 1-4 to 1-8. Thus, a coating film test piece was produced, and the coating film performance was evaluated. Tables 2-4 to 2-8 each show evaluation results of the coating film performance including initial properties.

TABLE 1-1

| Example No. | | | Ex. 1 | Ex. 2 | Ex. 3 | Ex. 4 | Ex. 5 | Ex. 6 | Ex. 7 |
|---|---|---|---|---|---|---|---|---|---|
| Main agent | Polymer particles (D) | Synthesis Example 3 | | | | | | | |
| | Metal oxide (A) | STOXS[1] | 100 | 100 | 100 | 100 | 100 | | |
| | | STO[2] | | | | | | 100 | |
| | | STC[3] | | | | | | | 100 |
| | Hydrophilic compound (B) | Polysorbate[4] | 5 | 10 | 15 | 20 | 40 | 10 | 10 |
| | | 4arm-PEG[5] | | | | | | | |
| | | 8arm-PEG[6] | | | | | | | |
| | | 16arm-polymer[7] | | | | | | | |
| | | 32arm-polymer[8] | | | | | | | |
| | | Synthesis Example 1 (B)-1 | | | | | | | |
| | | Synthesis Example 2 (B)-2 | | | | | | | |
| | | HLB | 17 | 17 | 17 | 17 | 17 | 17 | 17 |
| | | Coverage ratio (P) 1% to 50% | 6% | 11% | 17% | 23% | 46% | 41% | 41% |
| Curing agent (C) | | Polyisocyante A[9] | | | | | | | |
| | | KBE-9007[10] | | | | | | | |
| | | NCO/OH | 0 | 0 | 0 | 0 | 0 | 0 | 0 |

TABLE 1-2

| Example No. | | | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Main agent | Polymer particles (D) | Synthesis Example 3 | | | | | | | | 10 |
| | Metal oxide (A) | STOXS[1] | 100 | 100 | 100 | 100 | 100 | 100 | 100 | 100 |
| | | STO[2] | | | | | | | | |
| | | STC[3] | | | | | | | | |
| | Hydrophilic compound (B) | Polysorbate[4] | 15 | | | | | | | |
| | | 4arm-PEG[5] | | 15 | | | | | | |
| | | 8arm-PEG[6] | | | 15 | | | | | |
| | | 16arm-polymer[7] | | | | 15 | | | | |
| | | 32arm-polymer[8] | | | | | 15 | | | |
| | | Synthesis Example 1 (B)-1 | | | | | | 15 | | |
| | | Synthesis Example 2 (B)-2 | | | | | | | 10 | 10 |
| | | HLB | 17 | 16 | 16 | 15 | 14 | 15 | 18 | 18 |
| | | Coverage ratio (P) 1% to 50% | 17% | 9% | 8% | 15% | 12% | 10% | — | — |
| Curing agent (C) | | Polyisocyanate A[9] | 10 | 45 | 23 | 2 | 2.1 | | | |
| | | KBE-9007[10] | | | | | | | 0.5 | 0.5 |
| | | NCO/OH | 0.5 | 0.5 | 0.5 | 0.5 | 0.5 | 0.5 | 0.5 | 0.5 |

TABLE 1-3

| Example No. | | | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|
| Main agent | Metal oxide (A) | STOXS[1] | 100 | 100 | 100 | 100 | 100 | | | | 100 |
| | | STO[2] | | | | | | 100 | | | |
| | | STOL[13] | | | | | | | 100 | 100 | |

TABLE 1-3-continued

| | Example No. | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|
| Hydrophilic compound (B) | Synthesis Example 2 (B)-2 | | | | | 10 | 5 | 5 | 5 | 10 |
| | Synthesis Example 4 (B)-3 | 20 | | | | | | | | |
| | Synthesis Example 5 (B)-4 | | 10 | | | | | | 1 | |
| | Synthesis Example 6 (B)-5 | | | 20 | | | | | | 0.2 |
| | Synthesis Example 7 (B)-6 | | | | 20 | 10 | | | | |
| Curing agent (C) | KBE-9007[10] | | | | | | | | | |
| | Synthesis Example 8 MEKO-KBE-9007 | 0.3 | 0.3 | 0.3 | 0.3 | 0.3 | 0.3 | 0.3 | 0.3 | 0.3 |

TABLE 1-4

| | | Example No. | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|---|
| Main agent | Polymer Particles (D) | Synthesis Example 3 Acryl LTX[17] | | | | | | | | | |
| | Metal oxide (A) | STOXS[1] | 100 | | | | | | | | |
| | | STO40[14] | | 100 | | | | | | | |
| | | STOL[13] | | | 100 | | | | | | |
| | | STOUP[15] | | | | 100 | | | | | |
| | | STAK[16] | | | | | 100 | | | | |
| | | Synthesis Example 17 (A)-1 | | | | | | 100 | | | |
| | | Synthesis Example 18 (A)-2 | | | | | | | 100 | | |
| | | Synthesis Example 19 (AB)-1 | | | | | | | | 100 | |
| | | Synthesis Example 20 (A)-3 | | | | | | | | | 100 |
| | Hydrophilic compound (B) | Synthesis Example 2 (B)-2 | | | | | | | | | |
| | | Synthesis Example 4 (B)-3 | | | | | | | | | |
| | | Synthesis Example 16 (B)-14 | | | | | | | | | |
| | | Synthesis Example 9 (B)-7 | | | | | | | | | |
| | | Synthesis Example 10 (B)-8(NCO/OH 0.7) | 10 | 10 | 10 | 10 | 10 | 10 | 10 | | 10 |
| | | Synthesis Example 11 (B)-9(NCO/OH 0.3) | | | | | | | | | |
| | | Synthesis Example 12 (B)-10(NCO/OH 1.0) | | | | | | | | | |
| | | Synthesis Example 13 (B)-11 | | | | | | | | | |
| | | Synthesis Example 14 (B)-12 | | | | | | | | | |
| | | Synthesis Example 15 (B)-13 | | | | | | | | | |
| | | Synthesis Example 19 (AB)-1 | | | | | | | | * Same component as (A) | |
| | | Silanol-modified PVA[18] | | | | | | | | | |
| Curing agent (C) | | Synthesis Example 22 (C)-2 | 10 | 10 | 10 | 10 | 10 | 10 | 10 | 10 | 10 |
| Hydrolyzable silicon compound (E) | | TEOS[19] | | | | | | | | | |
| Curing acceleration catalyst | | Aluminum chelate A[20] | 0.3 | 0.3 | 0.3 | 0.3 | 0.3 | 0.3 | 0.3 | 0.3 | 0.3 |

TABLE 1-5

|  |  |  | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|---|
| Main agent | Polymer particles (D) | Synthesis Example 3 Acryl LTX[17] |  |  |  |  |  |  |  |  |  |
|  | Metal oxide (A) | STOXS[1] |  |  |  |  |  |  |  |  |  |
|  |  | STO40[14] | 100 | 100 | 100 | 100 | 100 | 100 | 100 | 100 | 100 |
|  |  | STOL[13] |  |  |  |  |  |  |  |  |  |
|  |  | STOUP[15] |  |  |  |  |  |  |  |  |  |
|  |  | STAK[16] |  |  |  |  |  |  |  |  |  |
|  |  | Synthesis Example 17 (A)-1 |  |  |  |  |  |  |  |  |  |
|  |  | Synthesis Example 18 (A)-2 |  |  |  |  |  |  |  |  |  |
|  |  | Synthesis Example 19 (AB)-1 |  |  |  |  |  |  |  |  |  |
|  |  | Synthesis Example 20 (A)-3 |  |  |  |  |  |  |  |  |  |
|  | Hydrophilic compund (B) | Synthesis Example 2 (B)-2 | 10 |  |  |  |  |  |  |  |  |
|  |  | Synthesis Example 4 (B)-3 |  | 10 |  |  |  |  |  |  |  |
|  |  | Synthesis Example 16 (B-14) |  |  | 10 |  |  |  |  |  |  |
|  |  | Synthesis Example 9 (B)-7 |  |  |  | 10 |  |  |  |  |  |
|  |  | Synthesis Example 10 (B)-8(NCO/OH 0.7) |  |  |  |  |  |  |  |  |  |
|  |  | Synthesis Example 11 (B)-9(NCO/OH 0.3) |  |  |  |  | 10 |  |  |  |  |
|  |  | Synthesis Example 12 (B)-10(NCO/OH 1.0) |  |  |  |  |  | 10 |  |  |  |
|  |  | Synthesis Example 13 (B)-11 |  |  |  |  |  |  | 10 |  |  |
|  |  | Synthesis Example 14 (B)-12 |  |  |  |  |  |  |  | 10 |  |
|  |  | Synthesis Example 15 (B)-13 |  |  |  |  |  |  |  |  | 10 |
|  |  | Synthesis Example 19 (AB)-1 |  |  |  |  |  |  |  |  |  |
|  |  | Silanol-modified PVA[13] |  |  |  |  |  |  |  |  |  |
| Curing agent (C) |  | Synthesis Example 22 (C)-2 | 10 | 10 | 10 | 10 | 10 | 10 | 10 | 10 | 10 |
| Hydrolyzable silicon compound (E) |  | TEOS[19] |  |  |  |  |  |  |  |  |  |
| Curing acceleration catalyst |  | Aluminum chelate A[20] | 0.3 | 0.3 | 0.3 | 0.3 | 0.3 | 0.3 | 0.3 | 0.3 | 0.3 |

TABLE 1-6

|  |  |  | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|---|
| Main agent | Polymer particles (D) | Synthesis Example 3 Acryl LTX[17] |  |  |  |  |  |  |  |  |  |
|  | Metal oxide (A) | STOXS[1] |  |  |  |  |  |  |  |  |  |
|  |  | STO40[14] | 100 | 100 | 100 | 100 | 100 | 100 | 100 | 100 | 100 |
|  |  | STOL[13] |  |  |  |  |  |  |  |  |  |
|  |  | STOUP[15] |  |  |  |  |  |  |  |  |  |
|  |  | STAK[16] |  |  |  |  |  |  |  |  |  |
|  |  | Synthesis Example 17 (A)-1 |  |  |  |  |  |  |  |  |  |
|  |  | Synthesis Example 18 (A)-2 |  |  |  |  |  |  |  |  |  |
|  |  | Synthesis Example 19 (AB)-1 |  |  |  |  |  |  |  |  |  |
|  |  | Synthesis Example 20 (A)-3 |  |  |  |  |  |  |  |  |  |
|  | Hydrophilic compound (B) | Synthesis Example 2 (B)-2 |  |  |  |  |  | 8 | 8 | 8 | 8 |
|  |  | Synthesis Example 4 (B)-3 |  |  |  |  |  |  |  |  |  |

TABLE 1-6-continued

| | | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|
| | Synthesis Example 16 (B)-14 | | | | | | | | | 2 |
| | Synthesis Example 9 (B)-7 | | | | | | | | | |
| | Synthesis Example 10 (B)-8(NCO/OH 0.7) | | 1 | 20 | 50 | 80 | 2 | | | |
| | Synthesis Example 11 (B)-9(NCO/OH 0.3) | | | | | | | 2 | | |
| | Synthesis Example 12 (B)-10(NCO/OH 1.0) | | | | | | | | 2 | |
| | Synthesis Example 13 (B)-11 | | | | | | | | | |
| | Synthesis Example 14 (B)-12 | | | | | | | | | |
| | Synthesis Example 15 (B)-13 | | | | | | | | | |
| | Synthesis Example 19 (AB)-1 | | | | | | | | | |
| | Silanol-modified PVA[18] | 10 | | | | | | | | |
| Curing agent (C) | Synthesis Example 22 (C)-2 | 10 | 10 | 10 | 10 | 10 | 10 | 10 | 10 | 10 |
| Hydrolyzable silicon compound (E) | TEOS[19] | 5 | | | | | | | | |
| Curing acceleration catalyst | Aluminum chelate A[20] | 0.3 | 0.3 | 0.3 | 0.3 | 0.3 | 0.3 | 0.3 | 0.3 | 0.3 |

TABLE 1-7

| | | | Ex. 52 | Ex. 53 | Ex. 54 | Ex. 55 | Ex. 56 | Ex. 57 | Ex. 58 | Ex. 59 | Ex. 60 |
|---|---|---|---|---|---|---|---|---|---|---|---|
| Main agent | Polymer particles (D) | Synthesis Example 3 Acryl LTX[17] | | | | | | | | | |
| | Metal oxide (A) | STOXS[1] | | 50 | 50 | 30 | | | | | |
| | | STO40[14] | 100 | | | 70 | 70 | 100 | 100 | 100 | 100 |
| | | STOL[13] | | 50 | 50 | | | | | | |
| | | STOUP[15] | | | | | 30 | | | | |
| | | STAK[16] | | | | | | | | | |
| | | Synthesis Example 17 (A)-1 | | | | | | | | | |
| | | Synthesis Example 18 (A)-2 | | | | | | | | | |
| | | Synthesis Example 19 (AB)-1 | | | | | | | | | |
| | | Synthesis Example 20 (A)-3 | | | | | | | | | |
| | Hydrophilic compound (B) | Synthesis Example 2 (B)-2 | | | 8 | | | | | | |
| | | Synthesis Example 4 (B)-3 | | | | | | | | | |
| | | Synthesis Example 16 (B)-14 | 8 | | | | | | | | |
| | | Synthesis Example 9 (B)-7 | | | | | | | | | |
| | | Synthesis Example 10 (B)-8(NCO/OH 0.7) | 2 | 15 | 2 | 15 | 15 | 10 | 10 | 10 | 10 |
| | | Synthesis Example 11 (B)-9(NCO/OH 0.3) | | | | | | | | | |
| | | Synthesis Example 12 (B)-10(NCO/OH 1.0) | | | | | | | | | |
| | | Synthesis Example 13 (B)-11 | | | | | | | | | |
| | | Synthesis Example 14 (B)-12 | | | | | | | | | |
| | | Synthesis Example 15 (B)-13 | | | | | | | | | |
| | | Synthesis Example 19 (AB)-1 | | | | | | | | | |

TABLE 1-7-continued

| | | Example No. | | | | | | | | |
|---|---|---|---|---|---|---|---|---|---|---|
| | | Ex. 52 | Ex. 53 | Ex. 54 | Ex. 55 | Ex. 56 | Ex. 57 | Ex. 58 | Ex. 59 | Ex. 60 |
| | Silanol-modified PVA[18] | | | | | | | | | |
| Curing agent (C) | Synthesis Example 22 (C)-2 | 10 | 10 | 10 | 10 | 10 | 10 | 1 | 20 | 40 |
| Hydrolyzable silicon compound (E) | TEOS[19] | | | | | | | | | |
| Curing acceleration catalyst | Aluminum chelate A[20] | 0.3 | 0.3 | 0.3 | 0.3 | 0.3 | | 0.3 | 0.3 | 0.3 |

TABLE 1-8

| | | | Example No. | | | | | | | |
|---|---|---|---|---|---|---|---|---|---|---|
| | | | Ex. 61 | Ex. 62 | Ex. 63 | Ex. 64 | Ex. 65 | Ex. 66 | Ex. 67 | Ex. 68 |
| Main agent | Polymer particles (D) | Synthesis Example 3 | | | 10 | | | | | |
| | | Acryl LTX[17] | | | | 10 | | | | |
| | Metal oxide (A) | STOXS[1] | | | | | | | | |
| | | STO40[14] | 100 | 100 | 100 | 100 | 100 | | | |
| | | STOL[13] | | | | | | | | |
| | | STOUP[15] | | | | | | | | |
| | | STAK[16] | | | | | | | | |
| | | Synthesis Example 17 (A)-1 | | | | | | | | |
| | | Synthesis Example 18 (A)-2 | | | | | | 100 | | |
| | | Synthesis Example 19 (AB)-1 | | | | | | | 100 | |
| | | Synthesis Example 20 (A)-3 | | | | | | | | 100 |
| | Hydrophilic compound (B) | Synthesis Example 2 (B)-2 | | | | | | | | |
| | | Synthesis Example 4 (B)-3 | | | | | | | | |
| | | Synthesis Example 16 (B)-14 | | | | | | | | |
| | | Synthesis Example 9 (B)-7 | | | | | | | | |
| | | Synthesis Example 10 (B)-8(NCO/OH 0.7) | 10 | 10 | 10 | 10 | 10 | 10 | | 10 |
| | | Synthesis Example 11 (B)-9(NCO/OH 0.3) | | | | | | | | |
| | | Synthesis Example 12 (B)-10(NCO/OH 1.0) | | | | | | | | |
| | | Synthesis Example 13 (B)-11 | | | | | | | | |
| | | Synthesis Example 14 (B)-12 | | | | | | | | |
| | | Synthesis Example 15 (B)-13 | | | | | | | | |
| | | Synthesis Example 19 (AB)-1 | | | | | | | * Same component as (A) | |
| | | Silanol-modified PVA[18] | | | | | | | | |
| Curing agent (C) | | Synthesis Example 22 (C)-2 | 10 | 10 | 10 | 10 | 10 | 10 | 10 | 10 |
| Hydrolyzable silicon compound (E) | | TEOS[19] | | | | | 10 | | | |
| Curing acceleration catalyst | | Aluminum chelate A[20] | 0.3 | 0.3 | 0.3 | 0.3 | 0.3 | 0.3 | 0.3 | 0.3 |

TABLE 1-9

| | | Comparative Example No. | | | | | | | |
|---|---|---|---|---|---|---|---|---|---|
| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| Main agent | Polymer particles (D) Synthesis Example 4 | | | | | | | | |
| | Metal oxide (A) STOXS[1] | 100 | | | | 100 | 100 | | |
| | STO[2] | | | 100 | 100 | | | 100 | |
| | STOL[13] | | | | | | | | 100 |
| | STOUP[15] | | | | | | | | |
| | Hydrophilic compound (B) P123[11] | | | | 50 | | 100 | 30 | 10 |
| | Polysorbate[4] | | 100 | | | 114 | | | |
| | L44[12] | | | 0.2 | | | | | |
| | PE10100[21] | | | | | | | | |
| | HEC[22] | | | | | | | | |
| | Synthesis Example 1 (B)-1 | | | | | | | | |
| | HLB | — | 17 | 6 | 6 | 17 | 6 | 6 | 6 |
| | Coverage ratio (P) | 0% | — | 0.1% | 125% | 91% | 70% | 75% | 80% |

TABLE 1-10

| | | Comparative Example No. | | | | | | | | |
|---|---|---|---|---|---|---|---|---|---|---|
| | | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
| Main agent | Polymer particles (D) Synthesis Example 4 | | | | | | | 50 | 100 | |
| | Metal oxide (A) STOXS[1] | | | 100 | | | | | | |
| | STO[2] | | 100 | | 100 | 100 | 100 | 100 | | |
| | STOL[13] | 100 | | | | | | | | |
| | STOUP[15] | | | | | | | | 100 | 100 |
| | Hydrophilic compound (B) P123[11] | | 12 | | 50 | 50 | 30 | 100 | | |
| | Polysorbate[4] | | | | | | | | | |
| | L44[12] | | | | | | | | | |
| | PE10100[21] | 10 | | | | | | | | |
| | HEC[27] | | | | | | | | 8 | 8 |
| | Synthesis Example 1 (B)-1 | | | 100 | | | | | | |
| | HLB | 3 | 6 | 11 | 6 | 6 | 6 | 6 | | |
| | Coverage ratio (P) | 97% | 30% | 65% | 125% | 125% | 75% | 83% | | |
| Curing agent (C) | Polyisocyanate A[9] | | | | 20 | | | 40 | 40 | |
| | Polyisocyanate B[23] | | | | | 40 | | | | |
| Hydrolyzable silicon compound (E) | MS51[24] | | | | | | | | 24 | 24 |
| Curing acceleration catalyst | Aluminum chelate A[20] | | | | | | | | 14 | 14 |

TABLE 2-1

| | | Ex. 1 | Ex. 2 | Ex. 3 | Ex. 4 | Ex. 5 | Ex. 6 | Ex. 7 |
|---|---|---|---|---|---|---|---|---|
| Initial properties and elution resistance | Appearance | ○ | ○ | ○ | ○ | ○ | ○ | ○ |
| | Adhesion | ○ | ○ | ○ | ○ | Δ | ○ | ○ |
| | Water contact angle (°) | 2 | 2 | 3 | 5 | 18 | 3 | 5 |
| | Film thickness (nm) | 400 | 400 | 400 | 400 | 400 | 400 | 400 |
| | Scratch resistance | ○ | ○ | ○ | ○ | Δ | ○ | ○ |
| | Antifogging properties | ○ | ○ | ○ | Δ | Δ | ○ | ○ |
| | Surface eluate height (μm) | 0.1 or less | 0.1 or less | 0.13 | 0.20 | 0.40 | 0.12 | 0.13 |
| | Coating film elution level(mg/cm³) @23° C. | 3 | 6 | 9 | 13 | 25 | 14 | 17 |
| | Coating film elution level(mg/cm³) @80° C. | 3 | 7 | 11 | 14 | 30 | 15 | 18 |

TABLE 2-1-continued

|  |  | Ex. 1 | Ex. 2 | Ex. 3 | Ex. 4 | Ex. 5 | Ex. 6 | Ex. 7 |
|---|---|---|---|---|---|---|---|---|
|  | Water droplet mark test (80° C. steam, 90 seconds × 1 time) | ○ | ○ | ○ | ○ | Δ | ○ | ○ |
|  | Water droplet mark test (80° C. steam, 10 seconds × 10 times) | ○ | ○ | Δ | Δ | Δ | Δ | Δ |
| After moisture resistance test 1 | ΔHAZE | ○ | ○ | ○ | Δ | Δ | Δ | Δ |
|  | Adhesion | Δ | Δ | Δ | Δ | Δ | Δ | Δ |
|  | Water contact angle (°) | 4 | 5 | 8 | 10 | 20 | 6 | 5 |
|  | Antifogging properties | ○ | ○ | ○ | Δ | Δ | ○ | ○ |
| After moisture resistance test 2 | ΔHAZE | ○ | ○ | ○ | Δ | Δ | Δ | Δ |
|  | Adhesion | Δ | Δ | Δ | Δ | Δ | Δ | Δ |
|  | Water contact angle (°) | 7 | 8 | 18 | 20 | 30 | 15 | 9 |
|  | Antifogging properties | ○ | ○ | ○ | Δ | Δ | ○ | ○ |
| After heat resistance test | ΔHAZE | ○ | ○ | ○ | ○ | ○ | ○ | ○ |
|  | Adhesion | ○ | ○ | ○ | ○ | Δ | ○ | ○ |
|  | Water contact angle (°) | 10 | 12 | 13 | 15 | 22 | 25 | 10 |
|  | Antifogging properties | ○ | ○ | ○ | ○ | ○ | Δ | ○ |
| After water resistance test | ΔHAZE | ○ | ○ | Δ | Δ | Δ | ○ | ○ |
|  | Adhesion | Δ | Δ | Δ | Δ | Δ | Δ | Δ |
|  | Water contact angle (°) | 25 | 27 | 22 | 28 | 29 | 25 | 26 |
|  | Antifogging properties | Δ | Δ | Δ | Δ | Δ | Δ | Δ |

TABLE 2-2

|  |  | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Initial properties and elution resistance | Appearance | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 4 | 12 | 10 | 4 | 5 | 2 | 2 | 10 |
|  | Film thickness (nm) | 400 | 400 | 400 | 400 | 400 | 400 | 400 | 400 |
|  | Scratch resistance | ○ | ○ | ○ | ○ | ○ | ○ | ○ | ○ |
|  | Antifogging properties | ○ | ○ | ○ | ○ | ○ | ○ | ○ | ○ |
|  | Surface eluate height (μm) | 0.1 or less | 0.1 or less | 0.1 or less | 0.1 or less | 0.1 or less | 0.1 or less | 0.1 or less | 0.3 |
|  | Coating film elution level (mg/cm³) @23° C. | 5 | 4 | 3.5 | 2.2 | 1.5 | 7 | 0.8 | 6 |
|  | Coating film elution level (mg/cm³) @80° C. | 5 | 4 | 4 | 2.5 | 1.8 | 8 | 1 | 6 |
|  | Water droplet mark test (80° C. steam, 90 seconds × 1 time) | ○ | ○ | ○ | ○ | ○ | ○ | ⊚ | ○ |
|  | Water droplet mark test (80° C. steam, 10 seconds × 10 times) | ○ | ○ | ○ | ○ | ○ | ○ | ⊚ | ○ |
| After moisture resistance test 1 | ΔHAZE | ○ | ○ | ○ | ○ | ○ | ○ | ○ | ○ |
|  | Adhesion | ○ | ○ | ○ | ○ | ○ | ○ | Δ | ○ |
|  | Water contact angle (°) | 11 | 22 | 7 | 3 | 4 | 4 | 20 | 12 |
|  | Antifogging properties | ○ | ○ | ○ | ○ | ○ | ○ | Δ | ○ |
| After moisture resistance test 2 | ΔHAZE | ○ | ○ | ○ | ○ | ○ | ○ | ○ | ○ |
|  | Adhesion | Δ | ○ | ○ | Δ | Δ | Δ | Δ | Δ |
|  | Water contact angle (°) | 16 | 30 | 13 | 7 | 7 | 8 | 30 | 20 |
|  | Antifogging properties | ○ | Δ | ○ | ○ | ○ | ○ | Δ | Δ |
| After heat resistance test | ΔHAZE | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 10 | 25 | 15 | 10 | 13 | 10 | 10 | 30 |
|  | Antifogging properties | ○ | Δ | ○ | ○ | ○ | ○ | ○ | Δ |
| After water resistance test | ΔHAZE | ○ | ○ | ○ | ○ | ○ | ○ | ○ | ○ |
|  | Adhesion | ○ | ○ | ○ | Δ | Δ | Δ | Δ | Δ |
|  | Water contact angle (°) | 24 | 22 | 29 | 16 | 18 | 17 | 17 | 19 |
|  | Antifogging properties | Δ | Δ | Δ | ○ | ○ | ○ | ○ | ○ |

TABLE 2-3

| | | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|
| Initial properties and elution resistance | Appearance | ○ | ○ | ○ | ○ | ○ | ○ | ○ | ○ | ○ |
| | Adhesion | ○ | ○ | ○ | ○ | ○ | ○ | ○ | ○ | ○ |
| | Water contact angle (°) | 3 | 3 | 3 | 3 | 3 | 3 | 3 | 3 | 3 |
| | Film thickness (nm) | 400 | 400 | 400 | 400 | 400 | 400 | 400 | 400 | 400 |
| | Scratch resistance | ○ | ○ | ○ | ○ | ○ | ○ | ○ | ○ | ○ |
| | Antifogging properties | ○ | ○ | ○ | ○ | ○ | ○ | ○ | ○ | ○ |
| | Surface eluate height (μm) | 0.1 or less | 0.1 or less | 0.1 or less | 0.1 or less | 0.1 or less | 0.1 or less | 0.1 or less | 0.1 or less | 0.1 or less |
| | Coating film elution level(mg/cm$^3$) @23° C. | 1 | 0.8 | 0.7 | 0.7 | 0.9 | 1 | 0.8 | 1 | 1 |
| | Coating film elution level(mg/cm$^3$) @80° C. | 1 | 0.9 | 0.7 | 0.7 | 1 | 1.2 | 0.9 | 1 | 1 |
| | Water droplet mark test (80° C. steam, 90 seconds × 1 time) | ◎ | ◎ | ◎ | ◎ | ◎ | ◎ | ◎ | ◎ | ◎ |
| | Water droplet mark test (80° C. steam, 10 seconds × 10 times) | ◎ | ◎ | ◎ | ◎ | ◎ | ◎ | ◎ | ◎ | ◎ |
| After moisture resistance test 1 | ΔHAZE | ○ | ○ | ○ | ○ | ○ | ○ | ○ | ○ | ○ |
| | Adhesion | Δ | ○ | ○ | ○ | ○ | Δ | Δ | ○ | ○ |
| | Water contact angle (°) | 12 | 15 | 18 | 23 | 5 | 10 | 3 | 4 | 4 |
| | Antifogging properties | ○ | Δ | Δ | Δ | ○ | ○ | ○ | ○ | ○ |
| After moisture resistance test 2 | ΔHAZE | ○ | ○ | ○ | ○ | ○ | ○ | ○ | ○ | ○ |
| | Adhesion | Δ | ○ | ○ | ○ | ○ | Δ | Δ | ○ | ○ |
| | Water contact angle (°) | 20 | 30 | 32 | 35 | 9 | 20 | 7 | 8 | 8 |
| | Antifogging properties | Δ | Δ | Δ | Δ | ○ | Δ | ○ | ○ | ○ |
| After heat resistance test | ΔHAZE | ○ | ○ | ○ | ○ | ○ | ○ | ○ | ○ | ○ |
| | Adhesion | ○ | ○ | ○ | ○ | ○ | ○ | ○ | ○ | ○ |
| | Water contact angle (°) | 10 | 12 | 14 | 17 | 18 | 15 | 24 | 25 | 10 |
| | Antifogging properties | ○ | ○ | ○ | ○ | ○ | ○ | Δ | ○ | ○ |
| After water resistance test | ΔHAZE | ○ | ○ | ○ | ○ | ○ | ○ | ○ | ○ | ○ |
| | Adhesion | Δ | Δ | Δ | Δ | Δ | Δ | Δ | Δ | Δ |
| | Water contact angle (°) | 14 | 28 | 29 | 26 | 28 | 29 | 16 | 15 | 18 |
| | Antifogging properties | ○ | Δ | Δ | Δ | Δ | Δ | ○ | ○ | ○ |

TABLE 2-4

| | | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|
| Initial properties and elution resistance | Appearance | ○ | ○ | ○ | ○ | ○ | ○ | ○ | ○ | ○ |
| | Adhesion | ○ | ○ | ○ | ○ | ○ | ○ | ○ | ○ | ○ |
| | Water contact angle (°) | 3 | 3 | 3 | 2 | 5 | 3 | 5 | 3 | 5 |
| | Film thickness (nm) | 400 | 400 | 400 | 400 | 400 | 400 | 400 | 400 | 400 |
| | Scratch resistance | ○ | ○ | ○ | Δ | ○ | ○ | ○ | ○ | ○ |
| | Antifogging properties | ○ | ○ | ○ | ○ | ○ | ○ | ○ | ○ | ○ |
| | Surface eluate height (μm) | 0.1 or less | 0.1 or less | 0.1 or less | 0.1 or less | 0.1 or less | 0.1 or less | 0.1 or less | 0.1 or less | 0.1 or less |
| | Coating film elution level(mg/cm$^3$) @23° C. | 0.8 | 0.9 | 1.1 | 0.9 | 1.5 | 0.7 | 1.3 | 0.8 | 0.9 |
| | Coating film elution level(mg/cm$^3$) @80° C. | 0.8 | 1 | 1.2 | 0.9 | 1.7 | 0.7 | 1.5 | 0.9 | 1.1 |
| | Water droplet mark test (80°C. steam, 90 seconds × 1 time) | ◎ | ◎ | ◎ | ◎ | ○ | ◎ | ◎ | ◎ | ◎ |
| | Water droplet mark test (80° C. steam, 10 seconds × 10 times) | ◎ | ◎ | ◎ | ◎ | ○ | ◎ | ◎ | ◎ | ◎ |
| After moisture resistance test 1 | ΔHAZE | ○ | ○ | ○ | ○ | ○ | ○ | ○ | ○ | ○ |
| | Adhesion | ○ | ○ | ○ | ○ | ○ | ○ | ○ | ○ | ○ |
| | Water contact angle (°) | 20 | 5 | 5 | 10 | 15 | 10 | 6 | 5 | 10 |
| | Antifogging properties | Δ | ○ | ○ | ○ | Δ | ○ | ○ | ○ | ○ |
| After moisture resistance test 2 | ΔHAZE | ○ | ○ | ○ | ○ | ○ | ○ | ○ | ○ | ○ |
| | Adhesion | ○ | ○ | ○ | ○ | ○ | ○ | ○ | ○ | ○ |
| | Water contact angle (°) | 25 | 10 | 10 | 20 | 20 | 22 | 10 | 8 | 12 |
| | Antifogging properties | Δ | ○ | ○ | Δ | Δ | Δ | ○ | ○ | ○ |
| After heat | ΔHAZE | ○ | ○ | ○ | ○ | ○ | ○ | ○ | ○ | ○ |

TABLE 2-4-continued

|  |  | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|
| resistance test | Adhesion | ○ | ○ | ○ | ○ | ○ | ○ | ○ | ○ | ○ |
|  | Water contact angle (°) | 6 | 7 | 22 | 12 | 15 | 11 | 25 | 12 | 18 |
|  | Antifogging properties | ○ | ○ | △ | ○ | ○ | ○ | △ | ○ | ○ |
| After water resistance test | ΔHAZE | ○ | ○ | ○ | ○ | ○ | ○ | ○ | ○ | ○ |
|  | Adhesion | ○ | ○ | ○ | △ | ○ | ○ | ○ | ○ | ○ |
|  | Water contact angle (°) | 10 | 12 | 23 | 10 | 31 | 10 | 18 | 10 | 14 |
|  | Antifogging properties | ○ | ○ | △ | ○ | △ | ○ | ○ | ○ | ○ |

TABLE 2-5

|  |  | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|
| Initial properties end elution resistance | Appearance | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 2 | 3 | 3 | 3 | 3 | 5 | 3 | 2 | 2 |
|  | Film thickness (nm) | 400 | 400 | 400 | 400 | 400 | 400 | 400 | 400 | 400 |
|  | Scratch resistance | ○ | ○ | ○ | ○ | ○ | ○ | ○ | ○ | ○ |
|  | Antifogging properties | ○ | ○ | ○ | ○ | ○ | ○ | ○ | ○ | ○ |
|  | Surface eluate height (μm) | 0.1 or less | 0.1 or less | 0.1 or less | 0.1 or less | 0.1 or less | 0.1 or less | 0.1 or less | 0.1 or less | 0.1 or less |
|  | Coating film elution level(mg/cm$^3$) @23° C. | 0.9 | 0.7 | 1.1 | 0.9 | 1.5 | 0.7 | 0.7 | 0.7 | 0.9 |
|  | Coating film elution level(mg/cm$^3$) @80° C. | 1 | 0.8 | 1.2 | 1 | 1.8 | 0.8 | 0.8 | 0.7 | 1 |
|  | Water droplet mark test (80° C. steam, 90 seconds × 1 time) | ◎ | ◎ | ◎ | ◎ | ○ | ◎ | ◎ | ◎ | ◎ |
|  | Water droplet mark test (80° C. steam, 10 seconds × 10 times) | ◎ | ◎ | ◎ | ◎ | ○ | ◎ | ◎ | ◎ | ◎ |
| After moisture resistance test 1 | ΔHAZE | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 5 | 10 | 6 | 8 | 5 | 5 | 4 | 5 | 5 |
|  | Antifogging properties | ○ | ○ | ○ | ○ | ○ | ○ | ○ | ○ | ○ |
| After moisture resistance test 2 | ΔHAZE | ○ | ○ | ○ | ○ | ○ | ○ | ○ | ○ | ○ |
|  | Adhesion | △ | △ | ○ | ○ | ○ | △ | ○ | ○ | ○ |
|  | Water contact angle (°) | 7 | 20 | 10 | 10 | 7 | 7 | 5 | 5 | 10 |
|  | Antifogging properties | ○ | △ | ○ | ○ | ○ | ○ | ○ | ○ | ○ |
| After heat resistance test | ΔHAZE | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 10 | 10 | 12 | 14 | 18 | 15 | 11 | 10 | 17 |
|  | Antifogging properties | ○ | ○ | ○ | ○ | ○ | ○ | ○ | ○ | ○ |
| After water resistance test | ΔHAZE | ○ | ○ | ○ | ○ | ○ | ○ | ○ | ○ | ○ |
|  | Adhesion | △ | △ | ○ | ○ | ○ | △ | ○ | ○ | ○ |
|  | Water contact angle (°) | 12 | 15 | 11 | 17 | 15 | 25 | 5 | 6 | 10 |
|  | Antifogging properties | ○ | ○ | ○ | ○ | ○ | △ | ○ | ○ | ○ |

TABLE 2-6

|  |  | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|
| Initial properties and elution resistance | Appearance | ○ | ○ | ○ | ○ | ○ | ○ | ○ | ○ | ○ |
|  | Adhesion | ○ | △ | ○ | ○ | ○ | ○ | ○ | ○ | ○ |
|  | Water contact angle (°) | 25 | 10 | 5 | 3 | 3 | 2 | 2 | 3 | 3 |
|  | Film thickness (nm) | 400 | 400 | 400 | 400 | 400 | 400 | 400 | 400 | 400 |
|  | Scratch resistance | ○ | ○ | ○ | ○ | ○ | ○ | ○ | ○ | ○ |
|  | Antifogging properties | ○ | ○ | ○ | ○ | ○ | ○ | ○ | ○ | ○ |
|  | Surface eluate height (μm) | 0.1 or less | 0.1 or less | 0.1 or less | 0.2 | 0.3 | 0.1 or less | 0.1 or less | 0.1 or less | 0.1 or less |
|  | Coating film elution level(mg/cm$^3$) @23° C. | 0.9 | 0.7 | 1.3 | 2.4 | 5.4 | 0.8 | 1.1 | 0.7 | 1 |
|  | Coating film elution level(mg/cm$^3$) @80° C. | 1 | 0.7 | 1.6 | 2.6 | 6.0 | 0.9 | 1.3 | 0.8 | 1.1 |

TABLE 2-6-continued

|  |  | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|
|  | Water droplet mark test (80. C. steam, 90 seconds × 1 time) | ◎ | ◎ | ◎ | ○ | △ | ◎ | ◎ | ◎ | ◎ |
|  | Water droplet mark test (80° C. steam, 10 seconds × 10 times) | ◎ | ◎ | ◎ | △ | △ | ◎ | ◎ | ◎ | ◎ |
| After moisture resistance test 1 | ΔHAZE | ○ | ○ | ○ | ○ | ○ | ○ | ○ | ○ | ○ |
|  | Adhesion | ○ | △ | ○ | ○ | ○ | ○ | ○ | ○ | ○ |
|  | Water contact angle (°) | 30 | 30 | 4 | 5 | 5 | 4 | 7 | 8 | 6 |
|  | Antifogging properties | △ | △ | ○ | ○ | ○ | ○ | ○ | ○ | ○ |
| After moisture resistance test 2 | ΔHAZE | ○ | ○ | ○ | ○ | ○ | ○ | ○ | ○ | ○ |
|  | Adhesion | ○ | △ | ○ | ○ | ○ | ○ | ○ | ○ | ○ |
|  | Water contact angle (°) | 33 | 35 | 5 | 6 | 6 | 7 | 10 | 10 | 8 |
|  | Antifogging properties | △ | △ | ○ | ○ | ○ | ○ | ○ | ○ | ○ |
| After heat resistance test | ΔHAZE | ○ | ○ | ○ | ○ | ○ | ○ | ○ | ○ | ○ |
|  | Adhesion | ○ | △ | ○ | ○ | ○ | ○ | ○ | ○ | ○ |
|  | Water contact angle (°) | 30 | 23 | 10 | 15 | 19 | 10 | 11 | 10 | 12 |
|  | Antifogging properties | △ | △ | ○ | ○ | ○ | ○ | ○ | ○ | ○ |
| After water resistance test | ΔHAZE | ○ | ○ | ○ | ○ | ○ | ○ | ○ | ○ | ○ |
|  | Adhesion | ○ | △ | ○ | ○ | ○ | ○ | ○ | ○ | ○ |
|  | Water contact angle (°) | 25 | 25 | 18 | 27 | 33 | 8 | 9 | 7 | 6 |
|  | Antifogging properties | ○ | △ | ○ | △ | △ | ○ | ○ | ○ | ○ |

TABLE 2-7

|  |  | Ex. 52 | Ex. 53 | Ex. 54 | Ex. 55 | Ex. 56 | Ex. 57 | Ex. 58 | Ex. 59 | Ex. 60 |
|---|---|---|---|---|---|---|---|---|---|---|
| Initial properties and elution resistance | Appearance | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 3 | 4 | 3 | 3 | 3 | 3 | 3 | 8 | 12 |
|  | Film thickness (nm) | 400 | 400 | 400 | 400 | 400 | 400 | 400 | 400 | 400 |
|  | Scratch resistance | ○ | ○ | ○ | ○ | ○ | ○ | ○ | ○ | ○ |
|  | Antifogging properties | ○ | ○ | ○ | ○ | ○ | ○ | ○ | ○ | ○ |
|  | Surface eluate height (μm) | 0.1 or less | 0.1 or less | 0.1 or less | 0.1 or less | 0.1 or less | 0.1 or less | 0.1 or less | 0.1 or less | 0.1 or less |
|  | Coating film elution level(mg/cm³) @23° C. | 1.2 | 0.9 | 0.8 | 0.8 | 0.7 | 1.1 | 1.1 | 0.8 | 0.7 |
|  | Coating film elution level(mg/cm³) @80° C. | 1.4 | 1 | 0.9 | 1 | 0.8 | 1.4 | 1.3 | 0.9 | 0.7 |
|  | Water droplet mark test (80° C. steam, 90 seconds × 1 time) | ◎ | ◎ | ◎ | ◎ | ◎ | ◎ | ◎ | ◎ | ◎ |
|  | Water droplet mark test (80° C. steam, 10 seconds × 10 times) | ◎ | ◎ | ◎ | ◎ | ◎ | ◎ | ◎ | ◎ | ◎ |
| After moisture resistance test 1 | ΔHAZE | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 4 | 6 | 7 | 7 | 5 | 10 | 6 | 10 | 15 |
|  | Antifogging properties | ○ | ○ | ○ | ○ | ○ | ○ | ○ | ○ | ○ |
| After moisture resistance test 2 | ΔHAZE | ○ | ○ | ○ | ○ | ○ | ○ | ○ | ○ | ○ |
|  | Adhesion | ○ | ○ | ○ | ○ | ○ | ○ | △ | ○ | ○ |
|  | Water contact angle (°) | 5 | 8 | 10 | 9 | 8 | 15 | 10 | 18 | 25 |
|  | Antifogging properties | ○ | ○ | ○ | ○ | ○ | ○ | ○ | △ | △ |
| After heat resistance test | ΔHAZE | ○ | ○ | ○ | ○ | ○ | ○ | ○ | ○ | ○ |
|  | Adhesion | ○ | ○ | ○ | ○ | ○ | ○ | ○ | ○ | ○ |
|  | Water contact angle (°) | 14 | 8 | 7 | 8 | 8 | 14 | 10 | 17 | 20 |
|  | Antifoggng properties | ○ | ○ | ○ | ○ | ○ | ○ | ○ | ○ | △ |
| After water resistance test | ΔHAZE | ○ | ○ | ○ | ○ | ○ | ○ | ○ | ○ | ○ |
|  | Adhesion | ○ | ○ | ○ | ○ | ○ | ○ | △ | ○ | ○ |
|  | Water contact angle (°) | 10 | 10 | 7 | 9 | 12 | 23 | 17 | 14 | 20 |
|  | Antifogging properties | ○ | ○ | ○ | ○ | ○ | △ | ○ | ○ | △ |

TABLE 2-8

|  |  | Ex. 61 | Ex. 62 | Ex. 63 | Ex. 64 | Ex. 65 | Ex. 66 | Ex. 67 | Ex. 68 |
|---|---|---|---|---|---|---|---|---|---|
| Initial properties | Appearance | ○ | △ | ○ | ○ | ○ | ○ | ○ | ○ |
|  | Adhesion | ○ | ○ | ○ | ○ | ○ | ○ | ○ | ○ |

TABLE 2-8-continued

|  |  | Ex. 61 | Ex. 62 | Ex. 63 | Ex. 64 | Ex. 65 | Ex. 66 | Ex. 67 | Ex. 68 |
|---|---|---|---|---|---|---|---|---|---|
| and elution resistance | Water contact angle (°) | 3 | 3 | 7 | 9 | 3 | 5 | 3 | 5 |
|  | Film thickness (nm) | 1000 | 5000 | 5000 | 5000 | 400 | 5000 | 5000 | 5000 |
|  | Scratch resistance | ○ | ○ | ○ | ○ | ○ | ○ | ○ | ○ |
|  | Antifogging properties | ○ | ○ | ○ | ○ | ○ | ○ | ○ | ○ |
|  | Surface eluate height (μm) | 0.1 or less | 0.1 or less | 0.1 or less | 0.1 or less | 0.1 or less | 0.1 or less | 0.1 or less | 0.1 or less |
|  | Coating film elution level(mg/cm³) @23° C. | 0.9 | 1.1 | 1 | 0.9 | 0.7 | 1.6 | 1.1 | 1.1 |
|  | Coating film elution level(mg/cm³) @80° C. | 1 | 1.3 | 1.1 | 1.1 | 0.7 | 1.8 | 1.3 | 1.4 |
|  | Water droplet mark test (80° C. steam, 90 seconds × 1 time) | ◎ | ◎ | ◎ | ◎ | ◎ | ◎ | ◎ | ◎ |
|  | Water droplet mark test (80° C. steam, 10 seconds × 10 times) | ◎ | ◎ | ◎ | ◎ | ◎ | ◎ | ◎ | ◎ |
| After moisture resistance test 1 | ΔHAZE | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 7 | 9 | 6 | 5 | 5 | 5 | 8 | 12 |
|  | Antifogging properties | ○ | ○ | ○ | ○ | ○ | ○ | ○ | ○ |
| After moisture resistance test 2 | ΔHAZE | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 12 | 15 | 11 | 10 | 8 | 13 | 11 | 16 |
|  | Antifogging properties | ○ | ○ | ○ | ○ | ○ | ○ | ○ | ○ |
| After heat resistance test | ΔHAZE | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 11 | 16 | 15 | 14 | 7 | 28 | 18 | 20 |
|  | Antifogging properties | ○ | ○ | ○ | Δ | ○ | Δ | ○ | ○ |
| After water resistance test | ΔHAZE | ○ | ○ | ○ | ○ | ○ | ○ | ○ | ○ |
|  | Adhesion | ○ | ○ | ○ | ○ | ○ | ○ | ○ | ○ |
|  | Water contact angle (°) | 15 | 18 | 17 | 18 | 5 | 17 | 11 | 15 |
|  | Antifogging properties | ○ | ○ | ○ | ○ | ○ | ○ | ○ | ○ |

TABLE 2-9

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Initial properties and elution resistance | Appearance | — | ○ | ○ | ○ | ○ | ○ | ○ | ○ |
|  | Adhesion | — | ○ | X | ○ | ○ | ○ | ○ | ○ |
|  | Water contact angle (°) | — | 50 | 30 | 16 | 60 | 10 | 5 | 5 |
|  | Film thickness (nm) | — | 400 | 0 | 400 | 400 | 400 | 400 | 400 |
|  | Scratch resistance | — | X | Δ | Δ | Δ | Δ | Δ | Δ |
|  | Antifogging properties | — | X | X | ○ | X | ○ | ○ | ○ |
|  | Surface eluate height (μm) | — | — | 0.1 | 1.3 | 1.5 | 1.8 | 1.2 | 1.1 |
|  | Coating film elution level(mg/cm³) @23° C. | — | — (Film peeled) | 1.0 | 61 | — (Film peeled) | 80 | 51 | 45 |
|  | Coating film elution level(mg/cm³) @80° C. | — | — (Film peeled) | 1.2 | — (Film peeled) | — (Film peeled) | 91 | 60 | 57 |
|  | Water droplet mark test (80° C. steam, 90 seconds × 1 time) | — | — | ○ | X | — | X | X | X |
|  | Water droplet mark test (80° C. steam, 10 seconds × 10 times) | — | — | ○ | X | — | X | X | X |
| After moisture resistance test 1 | ΔHAZE | — | X | X | X | X | ○ | ○ | ○ |
|  | Adhesion | — | X | X | Δ | X | Δ | Δ | Δ |
|  | Water contact angle (°) | — | 55 | 85 | 20 | 45 | 18 | 22 | 10 |
|  | Antifogging properties | — | X | X | ○ | X | ○ | ○ | ○ |
| After moisture resistance test 2 | ΔHAZE | — | X | X | X | X | ○ | ○ | ○ |
|  | Adhesion | — | X | X | Δ | X | X | X | X |
|  | Water contact angle (°) | — | 57 | 87 | 25 | 50 | 18 | 22 | 10 |
|  | Antifogging properties | — | X | X | Δ | X | ○ | ○ | ○ |

TABLE 2-10

|  |  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|---|
| Initial properties and elution resistance | Appearance | ○ | ○ | ○ | ○ | ○ | ○ | ○ | ○ | ○ |
|  | Adhesion | ○ | ○ | ○ | ○ | ○ | ○ | ○ | ○ | X |
|  | Water contact angle (°) | 6 | 10 | 2 | 16 | 15 | 13 | 10 | 30 | 10 |
|  | Film thickness (nm) | 400 | 400 | 400 | 400 | 400 | 400 | 400 | 2500 | 2500 |
|  | Scratch resistance | Δ | Δ | Δ | ○ | ○ | Δ | ○ | ○ | ○ |
|  | Antifogging properties | ○ | ○ | ○ | ○ | ○ | ○ | ○ | Δ | ○ |
|  | Surface eluate height (μm) | 1.1 | 1.1 | 1.5 | 1.2 | 1.1 | 1.2 | 1.4 | 1.1 | 1.5 |
|  | Coating film elution level(mg/cm³) @23° C. | 46 | 43 | 67 | 50 | 48 | 49 | 56 | 41 | 70 |
|  | Coating film elution level(mg/cm³) @80° C. | 55 | 57 | 80 | 63 | 59 | 68 | 65 | 52 | — (Film peeled) |
|  | Water droplet mark test (80° C. steam, 90 seconds × 1 time) | X | X | X | X | X | X | X | X | X |
|  | Water droplet mark test (80° C. steam, 10 seconds × 10 times) | X | X | X | X | X | X | X | X | X |
| After moisture resistance test 1 | ΔHAZE | ○ | ○ | ○ | ○ | ○ | ○ | ○ | ○ | ○ |
|  | Adhesion | Δ | Δ | ○ | ○ | ○ | ○ | ○ | ○ | X |
|  | Water contact angle (°) | 17 | 30 | 5 | 22 | 18 | 15 | 75 | 47 | 10 |
|  | Antifogging properties | ○ | Δ | ○ | ○ | ○ | ○ | ○ | X | ○ |
| After moisture resistance test 2 | ΔHAZE | ○ | ○ | ○ | ○ | ○ | ○ | ○ | ○ | ○ |
|  | Adhesion | X | X | Δ | Δ | ○ | Δ | ○ | ○ | X |
|  | Water contact angle (°) | 17 | 30 | 5 | 22 | 18 | 15 | 25 | 50 | 10 |
|  | Antifogging properties | ○ | Δ | ○ | ○ | ○ | ○ | ○ | X | ○ |

Each reference number noted in Tables 1-1 to 1-10 means the following.

1) STOXS: Snowtex-OXS (colloidal silica), available from Nissan Chemical Industries, Ltd., solid content: 10 mass %, acid type, average particle size: 4 nm
2) STO: Snowtex-O (colloidal silica), available from Nissan Chemical Industries, Ltd., solid content: 20 mass %, acid type, average particle size: 15 nm
3) STC: Snowtex-C (colloidal silica), available from Nissan Chemical Industries, Ltd., solid content: 20 mass %, basic type, average particle size: 15 nm
4) Polysorbate: Tween-20 (polyoxyethylene sorbitan monolaurate), available from Tokyo Chemical Industry Co., Ltd., solid content: 100 mass %
5) 4arm-PEG: 4arm-PEG10K, available from Sigma-Aldrich Co. LLC, solid content: 100 mass %
6) 8arm-PEG: Hyperbranched G2-PEG10K-OH, available from Sigma-Aldrich Co. LLC, solid content: 100 mass %
7) 16-arm polymer: Hyperbranched bis-MPA polyester-16-hydroxyl, generation 2, available from Sigma-Aldrich Co. LLC, solid content: 100 mass %
8) 32arm-polymer: Hyperbranched bis-MPA polyester-32-hydroxyl, generation 3, available from Sigma-Aldrich Co. LLC, solid content: 100 mass %
9) Polyisocyanate A: WT 30-100, available from Asahi Kasei Corporation, solid content: 100 mass %
10) KBE-9007: KBE-9007 (3-isocyanatepropyltriethoxysilane), available from Shin-Etsu Chemical Co., Ltd., solid content: 100 mass %
11) P123: Pluronic P123 (nonionic surfactant which is a polyoxyethylene-polyoxypropylene condensate), available from Sigma-Aldrich Co. LLC, solid content: 100 mass %
12) L44: Pluronic L-44 (nonionic surfactant which is a polyoxyethylene-polyoxypropylene condensate), available from Adeka Corporation, solid content: 100 mass %
13) STOL: Snowtex-OL (colloidal silica), available from Nissan Chemical Industries, Ltd., solid content: 20%, acid type, average particle size: 45 nm
14) STO40: Snowtex-040 (colloidal silica), available from Nissan Chemical Industries, Ltd., solid content: 40%, acid type, average particle size: 25 nm
15) STOUP: Snowtex-OUP (colloidal silica), available from Nissan Chemical Industries, Ltd., solid content: 15%, acid type, average particle size: 40 to 70 nm
16) STAK: Snowtex-AK (colloidal silica), available from Nissan Chemical Industries, Ltd., solid content: 20%, cationic type, average particle size: 12 nm
17) Acryl LTX: E2050S, available from Asahi Kasei Corporation, solid content: 46%, average particle size: 120 nm
18) Silanol-modified PVA: R-1130, available from Kuraray Co., Ltd.
19) TEOS: Tetraethoxysilane (KBE-04), available from Shin-Etsu Chemical Co., Ltd.
20) Aluminum chelate A: DX9740, available from Shin-Etsu Chemical Co., Ltd., solid content: 100%
21) PE10100: Pluronic PE10100, available from BASF, solid content: 100%
22) HEC: Hydroxyethylcellulose, available from Tokyo Chemical Industry Co., Ltd., 4,500 mPa·s to 6,500 mPa·s (2% aqueous solution at 25° C.)
23) Polyisocyanate B: WM44-L70G, available from Asahi Kasei Corporation
24) MS51: Siloxane oligomer, available from Mitsubishi Chemical Corporation In Comparative Example 1 in which a hydrophilic compound was not used, evaluation of respective physical properties of the coating film was not performed because formation of the coating film on the substrate was difficult.

INDUSTRIAL APPLICABILITY

The coating film according to the present invention is excellent in appearance, hydrophilicity, and antifogging properties, can retain antifogging properties, appearance, and adhesion for a long period of time even when exposed to a harsh environment such as high temperature and high humidity, and has excellent elution resistance. Accordingly, the coating film of the present invention can be particularly suitably used as an antifogging coating film that requires high antifogging properties and designabilities. Further, the coating film of the present invention can be used, for example, as a coating film for automotive parts, such as vehicle lights including headlamps and rear lamps of automobiles (particularly, low heat generation lamps such as LED lamps, and laser lamps); lenses for vehicle-mounted cameras; and window glass, for the application that requires antifogging durability, persistence of appearance, and elution resistance in an environment of high humidity. Further, the coating film of the present invention can be suitably used for parts such as internal parts of various equipment and parts installed at high places, which cannot be easily taken out for removal of fogging or liquid droplets. Further, the coating film of the present invention can be suitably used as an antifogging film for mirrors, building materials (window glass, external walls, and the like), sign boards, traffic signs, displays, camera lenses, goggles, and spectacle lenses. All of the above-described features and advantages of the coating film of the present invention are also applied to these antifogging coating films, coating films for automotive parts, and coating films for internal parts.

The invention claimed is:

1. A coating film comprising a metal oxide (A), and a hydrophilic compound (B), wherein a height of an eluate in a coating film surface elution test is 1.0 µm or less,
   the coating film surface elution test is carried out by placing 10 µL of deionized water on the coating film, allowing the coating film to stand in a 23° C., 50% RH environment for 24 hours, measuring heights of the eluate at 20 locations selected randomly within a 10 cm$^2$ range on a surface of the coating film, and determining a maximum height, and
   a water contact angle measured after subjecting the coating film to a moisture resistance test, in which the coating film is exposed to an 85° C., 85% RH environment for 24 hours and then allowed to stand in a 23° C., 50% RH environment for 1 hour, is less than 40°.

2. The coating film according to claim 1, wherein an elution level per coating film unit volume in a coating film total elution test is 40 mg/cm$^3$ or less, and the coating film total elution test is carried out by immersing the coating film in deionized water at 23° C. for 24 hours and measuring a weight of an eluate of the coating film recovered from the deionized water.

3. The coating film according to claim 1, wherein an elution level per coating film unit volume in a coating film total elution test is 40 mg/cm$^3$ or less, and the coating film total elution test is carried out by immersing the coating film in deionized water at 80° C. for 24 hours and measuring a weight of an eluate of the coating film recovered from the deionized water.

4. The coating film according to claim 1, wherein a value of a water contact angle is less than 40°.

5. The coating film according to claim 1, wherein the metal oxide (A) has a hydroxy group.

6. The coating film according to claim 1, wherein the metal oxide (A) is silica.

7. The coating film according to claim 1, wherein the hydrophilic compound (B) is bonded to a surface of the metal oxide via a non-covalent bond and/or a covalent bond.

8. The coating film according to claim 1, further comprising an isocyanate compound (C).

9. The coating film according to claim 1, wherein the hydrophilic compound (B) is at least one selected from the group consisting of a nonionic compound, an anionic compound, and a zwitterionic compound.

10. The coating film according to claim 1, wherein the hydrophilic compound (B) has a carbon-oxygen bond in the molecule.

11. The coating film according to claim 1, wherein the hydrophilic compound (B) has an alkylene glycol moiety in the molecule.

12. The coating film according to claim 1, wherein the hydrophilic compound (B) is bonded to each other via a urethane bond and/or a siloxane bond.

13. The coating film according to claim 1, wherein the isocyanate compound (C) is a water-dispersible isocyanate compound.

14. The coating film according to claim 1, wherein the isocyanate compound (C) has an alkoxysilane moiety and/or a siloxane moiety in the molecule.

15. The coating film according to claim 1, wherein the isocyanate compound (C) is a blocked isocyanate.

16. The coating film according to claim 1, further comprising polymer particles (D).

17. The coating film according to claim 1, wherein ΔHAZE is less than 1.0, the ΔHAZE being a difference between a HAZE of the coating film after being subjected to a moisture resistance test in which the coating film is exposed to an environment of 85° C., 85% RH for 24 hours and then allowed to stand in an environment of 23° C., 50% RH for 1 hour, and a HAZE of the coating film before the moisture resistance test.

18. The coating film according to claim 1, wherein the coating film is used as an antifogging coating film.

19. The coating film according to claim 1, wherein the coating film is used as a coating film for an automotive exterior part.

20. The coating film according to claim 1, wherein the coating film is used as a coating film for a lamp cover.

21. A coating composition for producing the coating film according to claim 1, wherein the metal oxide (A) is constituted by an alkoxysilane and/or a hydrolysate or a condensate of alkoxysilane.

22. The coating composition according to claim 18, wherein the hydrophilic compound (B) has three or more functional groups capable of reacting with an isocyanate group in the molecule.

23. The coating composition according to claim 21, wherein an HLB value of the hydrophilic compound (B) determined by a Griffin method is 10 or more.

24. A coating composition for producing the coating film according to claim 1, wherein the metal oxide (A) is silicone particles and/or acrylic silicone particles.

25. A coating composition for producing the coating film according to claim 1, wherein the hydrophilic compound (B) contains an alkoxysilane and/or a silanol group in the molecule.

26. A coating composition for producing the coating film according to claim 1, wherein the hydrophilic compound (B) has a polyalkylene oxide chain in the molecule and contains a primary aliphatic hydroxy group at one end of the polyalkylene oxide chain and an alkoxysilane and/or a silanol group at the other end.

27. A coating composition for producing the coating film according to claim 1, the coating composition comprising a metal oxide (A), a hydrophilic compound (B), and optionally an isocyanate compound (C) and/or polymer particles (D) and/or water.

28. A laminate comprising a resin substrate and/or a glass substrate, and the coating film according to claim 1.

29. Use of the coating film according to claim 1 for imparting antifogging properties to a resin substrate and/or a glass substrate.

\* \* \* \* \*